United States Patent
Suzuki et al.

(10) Patent No.: US 7,847,887 B2
(45) Date of Patent: Dec. 7, 2010

(54) PROTECTIVE FILM FOR POLARIZING PLATE, POLARIZING PLATE, AND LIQUID CRYSTAL DISPLAY DEVICE

(75) Inventors: Masaaki Suzuki, Kanagawa (JP); Tokuju Oikawa, Kanagawa (JP); Katsumi Inoue, Kanagawa (JP); Shuntarou Ibuki, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 435 days.

(21) Appl. No.: 12/058,005

(22) Filed: Mar. 28, 2008

(65) Prior Publication Data

US 2008/0239211 A1 Oct. 2, 2008

(30) Foreign Application Priority Data

Mar. 29, 2007 (JP) .............................. 2007-089697

(51) Int. Cl.
  *G02F 1/1335* (2006.01)
  *G02B 5/30* (2006.01)
(52) U.S. Cl. ......................................... 349/96; 359/485
(58) Field of Classification Search .................. 349/96; 359/485

See application file for complete search history.

(56) References Cited

U.S. PATENT DOCUMENTS 6,958,394 B2 * 10/2005 Saito ............................ 536/58
2005/0266258 A1 * 12/2005 Saito .......................... 428/532

FOREIGN PATENT DOCUMENTS

| JP | 62-161103 A | | 7/1987 |
| JP | 10-101907 A | | 4/1998 |
| JP | 2001-215331 A | | 8/2001 |
| JP | 2001215331 A | * | 8/2001 |
| JP | 2001-343526 A | | 12/2001 |
| JP | 2002-90546 A | | 3/2002 |
| JP | 2002-301788 A | | 10/2002 |
| JP | 2002301788 A | * | 10/2002 |

* cited by examiner

*Primary Examiner*—Mike Qi
(74) *Attorney, Agent, or Firm*—Buchanan Ingersoll & Rooney PC

(57) ABSTRACT

To provide a protective film for a polarizing plate that shows a water vapor transmission rate ($WVTR_{40}$) of 30 g/m²·day or less at 60° C. and a relative humidity of 40%, a water vapor transmission rate ($WVTR_{95}$) 80 g/m²·day or more and 300 g/m²·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, 2.0 or more.

11 Claims, No Drawings

PROTECTIVE FILM FOR POLARIZING PLATE, POLARIZING PLATE, AND LIQUID CRYSTAL DISPLAY DEVICE

BACKGROUND OF THE INVENTION

1. Field of the Invention

The present invention relates to a protective film having a coat layer for a polarizing plate for the purpose of realizing a low water vapor transmission rate, a polarizing plate using the protective film and a liquid crystal display device using the polarizing plate.

2. Description of the Related Art

Liquid crystal display devices (hereinafter referred to simply as LCDs) have recently been replacing CRTs for their thinness, lightness and low power consuming. There is an increasing demand for polarizing plates along with propagation of LCDs. The field of application of LCDs is also expanding from conventional small products such as desktop electric calculators to larger products including automobile instruments, PC monitors and television sets.

A polarizing plate is generally formed by bonding a protective film for a polarizing plate (hereinafter referred to as protective film or protective layer) to one or both of the opposite surfaces of a polarizer having a polarizing ability, with an adhesive layer interposed between the polarizing plate and the polarizer.

Polyvinyl alcohol (also referred to as PVA hereinafter) is mainly used as material of a polarizer. A polarizer is formed by monoaxial stretching of a PVA film followed by dying with iodine or bi-color dye (alternatively by first dying the PVA film with such a dye followed by monoaxial stretching), and then allowing the stretched PVA film to crosslink by means of a boron compound.

Cellulose triacetate (also referred to as TAC hereinafter) is mainly used to form the protective film because it is optically transparent and exhibits less birefringence, has a smooth surface, and offers excellent adhesion relative to a polarizer made of PVA by saponification treatment.

When cellulose triacetate is used for the protective layer, the image being displayed can become uneven after a long use due to changes in the size of the polarizer caused by variations of temperature and relative humidity and hence improvements have been and being required for protective layers.

On the other hand, since liquid crystal display devices are often operated for a long time, the polarizing plate is required to show a prolonged durability that makes it free from degradation of image quality of the LCD after a long-term use in an environment where both the temperature and the relative humidity vary significantly. Particularly, it is required to withstand the increased intensity of light emitted from the back light and the temperature rise due to the back light that are being observed as a result of the recent improvement in the luminance of liquid crystal display device.

In short, the polarizing plate is required to show a satisfactory durability under harsh conditions including high temperatures and high relative humidities as the scope of application of liquid crystal display device expands.

Proposals have been made to solve the problem of uneven display images after a long-term use under conditions where the temperature and the relative humidity vary significantly. They include those of using a film showing a low water vapor transmission rate of a protective film for a polarizing plate (see, for example, Japanese Patent Application Laid-Open (JP-A) No. 10-101907) and a proposal of arranging a layer showing a low water vapor transmission rate on cellulose acetate (see, for example, JP-A Nos. 62-161103, 2001-215331, 2002-301788, 2002-90546, and 2001-343526).

However, none of the above-cited patent documents fully describe water vapor transmission rate. In other words, the above-cited proposals are not satisfactory for overcoming uneven displays that arise in environments where the temperature and the relative humidity vary remarkably.

Additionally, it has been established that the water vapor transmission rate range within which the problem of light leakage that arises when the display device is exposed to a high humidity condition is overcome is different from the water vapor transmission rate range within which the problem of light leakage that arises when the display device is exposed to a low humidity condition is overcome, and that when the water vapor transmission rate of the protective layer is overly reduced in an attempt to overcome the two light leakage problems at the same time, the load of drying process during the polarizing plate processing operation increases and thereby reduces productivity.

BRIEF SUMMARY OF THE INVENTION

It is therefore an object of the present invention to solve the problems pertinent in the art and to provide a protective film for a polarizing plate that can be manufactured at a high productivity.

Another object of the present invention is to provide a polarizing plate whose load of drying is light in the processing operation.

Still another object of the present invention is to provide a liquid crystal display device that can maintain the quality of the displayed image to a high level for a long time both in a high humidity environment and in a low humidity environment.

The inventors of the present application made intensive efforts for achieving the above objects and found that the objects can be achieved by using a protective film for a polarizing plate showing a water vapor transmission rate ($WVTR_{40}$) of 30 g/m$^2$·day or less at 60° C. and a relative humidity of 40%, a water vapor transmission rate ($WVTR_{95}$) of 80 g/m$^2$·day or more and 300 g/m$^2$·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, is 2.0 or more.

The present invention is based on the above-described finding by the inventors of the present invention. It is defined as a protective film for a polarizing plate showing a water vapor transmission rate ($WVTR_{40}$) of 30 g/m$^2$·day or less at 60° C. and a relative humidity of 40%, a water vapor transmission rate ($WVTR_{95}$) of 80 g/m$^2$·day or more and 300 g/m$^2$·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, is 2.0 or more.

According to the present invention, there is also provided a polarizing plate including a polarizer and a protective film for the polarizing plate arranged at least at a side of the polarizer, the protective film for the polarizing plate showing a water vapor transmission rate ($WVTR_{40}$) of 30 g/m$^2$·day or less at 60° C. and a relative humidity of 40%, a water vapor transmission rate ($WVTR_{95}$) of 80 g/m$^2$·day or more and 300 g/m$^2$·day or less at 60° C. and a relative humidity of 95% and a value obtained by dividing the difference between $WVTR_{95}$ and $WVTR_{40}$ by the water vapor transmission rate ($WVTR_{60}$)

at 60° C. and a relative humidity of 60%, or ($WVTR_{95}$-$WVTR_{40}$)/$WVTR_{60}$, 2.0 or more.

According to the present invention, there is also provided a liquid crystal display device including a liquid crystal cell and a polarizing plate having a polarizer and a protective film for the polarizing plate arranged at least at a side of the polarizer, the protective film for the polarizing plate showing a water vapor transmission rate ($WVTR_{40}$) of 30 g/m²·day or less at 60° C. and a relative humidity of 40%, a water vapor transmission rate ($WVTR_{95}$) of 80 g/m²·day or more and 300 g/m²·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, is 2.0 or more.

DETAILED DESCRIPTION OF THE INVENTION

Now, a protective film for a polarizing plate, a polarizing plate and a liquid crystal display device according to the present invention will be described in greater detail.

In the following description of the preferred embodiments of the invention, any numerical range expressed by using "to" includes the values respectively preceding and succeeding "to" as the lower limit value and the upper limit value.

In the following description of the preferred embodiments of the invention, expressions such as "45°", "parallel" and "orthogonal" mean that the angles expressed by those words can be accompanied by an error range of less than ±5°. The error between the angle in the rigorous sense of the word and the actual angle is preferably less than 4°, more preferably less than 3°. With regard to angles, "+" refers to an angle as viewed clockwise while "−" refers to an angle as viewed counterclockwise. The expression of "slow axis" refers to the direction that maximizes the refractive index. The expression of "visible region" refers to the wavelength range of 380 nm to 780 nm. The wavelength for gauging the refractive index refers to a value in the visible light range ($\lambda$=550 nm) unless specifically noted otherwise.

In the following description of the preferred embodiments of the invention, the expression of "polarizing plate" may be an oblong polarizing plate or a polarizing plate cut to the size with which the polarizing plate is to be incorporated into a liquid crystal display device. The expression of "cut" as used herein includes "punched" and "cut out".

In the following description of the preferred embodiments of the invention, the expression of "polarization film" is discriminated from "polarizing plate", although a "polarizing plate" refers to a laminated body having a transparent protective film arranged at least at a side of a "polarization film" to protect the latter.

(Protective Film for Polarizing Plate)

A protective film for a polarizing plate according to the present invention shows a water vapor transmission rate ($WVTR_{40}$) of 30 g/m²·day or less at 60° C. and a relative humidity of 40%, a water vapor transmission rate ($WVTR_{95}$) of between 80 g/m²·day and 300 g/m²·day at 60° and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, is 2.0 or more.

For a protective film for a polarizing plate according to the present invention, the $WVTR_{40}$ is preferably 10 g/m²·day or less and the $WVTR_{95}$ is preferably 80 g/m²·day or more and 200 g/m²·day or less.

The effect of improving the light leakage that arises in a low humidity environment is not sufficient when $WVTR_{40}$ is higher than 30 g/m²·day, whereas the effect of improving the light leakage that arises in a high humidity environment is not sufficient when $WVTR_{95}$ is higher than 300 g/m²·day.

The polarizing plate processing feasibility is reduced when $WVTR_{95}$ is lower than 80 g/m²·day.

<Water Vapor Transmission Rate>

Now, water vapor transmission rate will be described in detail below.

The methods described in "Physical Properties of Polymers II" (Polymer Experiment Course 4; Kyoritsu Shuppan), pp. 285-294: Measurement of Vapor Transmission (mass method, thermometer method, vapor pressure method, adsorption rate method) can be applied to the measurement of the water vapor transmission rate for the purpose of the present invention. Each of the film samples 70 mm in diameter was moisturized at 60° C. and 95% RH for 24 hours and the moisture content per unit surface area (g/m²) was computed from the difference of mass between before and after the moisturizing according to JIS Z-0208.

During the measurement, an operation of taking out the cup put into a constant-temperature constant-humidity vessel, measuring the weight and putting it back at appropriate time intervals was repeated and the mass increase per unit time was determined between two consecutive measurements until the mass increase ratio settled down to a constant level 5% or less. A blank cup containing no hygroscopic agent was weighed to eliminate the influence of moisture absorption by the sample and the water vapor transmission rate was corrected by using the weighed value.

When the water vapor transmission rate of a protective film for a polarizing plate having at least a coat layer formed on a transparent base film is measured for the purpose of the present invention, the sample was placed in the cup with the coat layer located closer to the cup than the transparent base film and the water vapor transmission rate was measured from the side opposite to the coat layer relative to the transparent base film.

When a coat layer is arranged at the opposite sides of the transparent support, the water vapor transmission rate was measured from the two sides and the lower value was adopted.

<Physical Properties of Protective Film for Polarizing Plate>

While any protective film for a polarizing plate that satisfies the above requirements of water vapor transmission rate and shows a transmissivity 80% or more can be used for the purpose of the present invention, a protective film for a polarizing plate according to the present invention is preferably formed by arranging at least a coat layer on a transparent support.

A protective film for a polarizing plate according to the present invention is preferably substantially colorless.

The expression of "substantially colorless" means that when expressed by the L*, a*, b* colorimetric system, the absolute values of a* and b* are 3.0 or less. The absolute values are preferably 2.5 or less, more preferably 2 or less. A substantially colorless protective film is desirable because the polarizing plate having such a protective film shows a neutral grey color tone and does not give rise to any problem for a color display.

(Polarizing Plate)

A polarizing plate according to the present invention has a polarizer and a protective film for the polarizing plate arranged at least at one of the surfaces of the polarizing plate.

A polarizing plate according to the present invention may have a protective film for a polarizing plate and an optical compensation film arranged respectively on the opposite surfaces of its polarizer as a protective film. Alternatively, a base film having an optical compensation film arranged as an optical compensation layer on one of the surfaces of the base film may be used. Still alternatively, an optical compensation film may be bonded onto the opposte side protective film by means of adhesive.

<Polarizer>

While the material of the polarizer is preferably formed by using polyvinyl alcohol (PVA) and dichroic molecules, a polyvinylene based polarizer may alternatively be formed by dehydrating and dechlorinating PVA or polyvinyl chloride to generate a polyene structure and orientating the latter as described in JP-A No. 11-248937.

While PVA is a polymer material that can be obtained by saponifying polyvinyl acetate, it may contain an ingredient that can be copolymerized with an unsaturated carboxylic acid, an unsaturated sulfonic acid, an olefin or a vinyl ether. A modified PVA containing an acetoacetyl group, a sulfonic acid group, a carboxyl group, an oxyalkylene group or the like may be used.

For the purpose of the present invention, the ratio of saponification of PVA is not subjected to any particular limitations and an appropriate degree may be selected according to the purpose. For example, the ratio of saponification is preferably 80 mol % to 100 mol %, more preferably 90 mol % to 100 mol % from the viewpoint of solubility.

For the purpose of the present invention, the degree of polymerization of PVA is not subjected to any particular limitations and an appropriate degree may be selected according to the purpose. However, the degree of polymerization is preferably 1,000 to 10,000, more preferably 1,500 to 5,000.

For the purpose of the present invention, the extent of syndiotacticity of PVA is not subjected to any particular limitations and an appropriate extent may be selected according to the purpose. While it is preferably 55% or more for improving the durability as described in Japanese Patent (JP-B) No. 2978219, a range of 45% to 52.5% may also preferably be employed as described in JP-B No. 3317494. A polarizer is preferably formed by turning PVA into a film and subsequently introducing dichroic molecules.

A method of manufacturing a PVA film by flow-casting a solution prepared by dissolving a PVA resin into water or an organic solvent is generally preferably employed. The concentration of the polyvinyl alcohol resin in the solution is normally 5 mass % to 20 mass %. A 10 $\mu$m to 200 $\mu$m thick PVA film can be manufactured by flow-casting the solution for film formation.

The methods of manufacturing a PVA film as described in JP-B No. 3342516, JP-A Nos. 09-328593, 2001-302817 and 2002-144401 may be utilized to manufacture a PVA film for the purpose of the present invention.

For the purpose of the present invention, the degree of crystallization of PVA film is not subjected to any particular limitations and an appropriate degree may be selected according to the purpose. For example, a PVA film showing an average degree of crystallization (Xc) of 50 mass % to 75 mass % as described in JP-B No. 3251073 may be used. Alternatively, a PVA film showing a degree of crystallization of 38% or less as described in JP-A No. 2002-236214 may be used to reduce the intra-surface dispersion of hue.

The PVA film preferably shows a low birefringence ($\Delta$n). For the purpose of the present invention, a PVA film showing a birefringence of $1.0 \times 10^{-3}$ or less as described in JP-B No. 3342516 may preferably be used. However, a birefringence that is 0.02 or more and 0.01 or less as described in JP-A No. 2002-228835 may be used in order to achieve a high degree of polarization while avoiding cutting in the process of stretching PVA film. Alternatively, a value 0.0003 or more and 0.01 or less may be selected for (nx+ny)/2−nz as described in JP-A No. 2002-060505.

For the purpose of the present invention, the intra-planar retardation Re of PVA film is preferably 0 nm or more and 100 nm or less, more preferably 0 nm or more and 50 nm or less.

The retardation Rth in the direction of the film thickness of PVA film is preferably 0 nm or more and 500 nm or less, preferably 0 nm or more and 300 nm or less.

Otherwise, a PVA film showing a ratio of 1,2-glycol bond 1.5 mo % or less as described in JP-B No. 3021494, a PVA film containing optical foreign objects 5 $\mu$m or more by 500 or less per 100 $cm^2$ as described in JP-A No. 2001-316492, a PVA film showing a hydrothermal cutting temperature spot of 1.5° C. or less as described in JP-A No. 2002-030163 or a PVA film formed from a solution prepared by mixing a plasticizing agent as described in JP-A No. 06-289225 by 15 mass % or more per 1 to 100 parts by mass of tri- to hexavalent polyhydric alcohol such as glycerin may preferably be used for a polarizing plate according to the present invention.

The film thickness of PVA film before stretching is not subjected to any particular limitations and an appropriate thickness may be selected according to the purpose. However, preferably a thickness of 1 $\mu$m to 1 mm, more preferably a thickness of 20 $\mu$m to 200 $\mu$m, may be selected from the viewpoint of storage stability of film and homogeneity of stretching.

A thin PVA film in which a stress of 10N or less is generated when stretched in water to a length 4 times to 6 times as long as the original length as described in JP-A No. 2002-236212 may be employed.

Iodine ions of a higher degree such as $I_3^-$ or $I_5^-$ or a dichroic dye may preferably be used for dichroic molecules. The use of iodine ions of a higher degree is particularly preferable for the purpose of the present invention. Iodine ions of a higher degree can be generated by immersing a PVA film in a liquid that is prepared by dissolving iodine into an aqueous solution of potassium iodide and/or an aqueous solution of boric acid and causing iodine to be adsorbed and oriented by the PVA film as described in "Applications of Polarizing plates", edited by Ryo Nagata, CMC Publishing and "Industrial Materials", Vol 28, No. 7, pp. 39 to 45.

When a dichroic dye is employed for dichroic molecules, an azo pigment is preferable. Of azo pigments, bisazo pigments and trisazo pigments are more preferable. The dichroic dye is preferably water soluble. For this reason, a hydrophilic substituent such as a sulfonic acid group, an amino group or a hydroxyl group is introduced into dichroic molecules, and preferably used as a free acid or a salt selected from salts of alkali metals, ammonium and amines.

Specific examples of dichroic dyes include benzidine dyes such as C. I. Direct Red 37, Congo Red (C. I. direct Red 28), C. I. Direct Violet 12, C. I. Direct Blue 90, C. I. Direct Blue 22, C. I. Direct Blue 1, C. I. Direct Blue 151, C. I. Direct Green 1 and so on, diphenyl urea dyes such as C. I. Direct Yellow 44, C. I. Direct Red 23, C. I. Direct Red 79 and so on, stilbene dyes such as C. I. Direct Yellow 12 and so on, dinaphthylamine dyes such as C. I. Direct Red 31 and so on and J acid dyes such as C. I. Direct Red 81, C. I. Direct Violet 9, C. I. Direct Blue 78 and so on.

Other specific examples of dichroic dyes that can suitably be used for the purpose of the present invention include, C. I. Direct Yellow 8, C. I. Direct Yellow 28, C. I. Direct Yellow 86, C. I. Direct Yellow 87, C. I. Direct Yellow 142, C. I. Direct Orange 26, C. I. Direct Orange 39, C. I. Direct Orange 72, C. I. Direct Orange 106, C. I. Direct Orange 107, C. I. Direct Red 2, C. I. Direct Red 39, C. I. Direct Red 83, C. I. Direct Red 89, C. I. Direct Red 240, C. I. Direct Red 242, C. I. Direct Red 247, C. I. Direct Violet 48, C. I. Direct Violet 51, C. I. Direct Violet 98, C. I. Direct Blue 15, C. I. Direct Blue 67, C. I. Direct Blue 71, C. I. Direct Blue 98, C. I. Direct Blue 168, C. I. Direct Blue 202, C. I. Direct Blue 236, C. I. Direct Blue 249, C. I. Direct Blue 270, C. I. Direct Green 59, C. I. Direct Green 85, C. I. Direct Brown 44, C. I. Direct Brown 106, C. I. Direct Brown 195, C. I. Direct Brown 210, C. I. Direct Brown 223, C. I. Direct Brown 224, C. I. Direct Black 1, C. I. Direct Black 17, C. I. Direct Black 19 and C. I. Direct Black 54. Additional preferable examples of dichroic dyes include those described in JP-A Nos. 62-70802, 01-161202, 01-172906, 01-172907, 01-183602, 01-248105, 01-265205 and 07-261024.

Two or more dichroic dyes may be compounded to manufacture dichroic molecules having any of various hues. When one or more dichroic dyes are used, the adsorption thickness may be 4 μm or more as described in JP-A No. 2002-082222.

The content ratio of dichroic molecules in a PVA film according to the present invention is adjusted to be between 0.01 mass % and 5 mass % relative to the polyvinyl alcohol copolymer that forms the matrix of the film in view of that the polarization degree is low when the content ratio is too low, whereas the single plate transmittance falls when the content ratio is too high.

The preferable thickness of the polarizer is preferably 5 μm to 40 μm, more preferably 10 μm to 30 μm. As described in JP-A No. 2002-174727, it is preferable to confine the ratio of the thickness (A) of the polarizer to the thickness (B) of the protective film, which will be described hereinafter, to a range of $0.01 \leq A/B \leq 0.8$.

<First Protective Film>

<<Transparent Support (Base Layer)>>

The transparent support (which may also be referred to as transparent base film or base layer hereinafter) to be used for a protective film for a polarizing plate according to the present invention is not subjected to any particular limitations and may be appropriately selected from known transparent base films.

Preferable examples of transparent resins for forming such a film include cellulose acylate resins, resins containing a lactone-ring-containing polymer, polyester resins such as polyethyleneterephtalate and polyethylenenaphthalate, polycarbonate resins, styrene resins such as syndiotatctic polystyrene and polyarylate resins, with cellulose acylate resins, resins containing lactone-ring-containing polymers, polyester resins and polycarbonate resins being more preferable and cellulose acylate resins being most preferable.

[Thickness of Transparent Support]

The thickness of the transparent base film is preferably 30 μm to 120 μm, more preferably 40 μm to 80 μm. The problem of a reduced film strength can hardly arise when the thickness of the transparent base film is 30 μm or more and the problem of an excessive mass that is disadvantageous when used in a large television set of 20 inches or more can hardly take place when the thickness of the transparent base film is 120 μm or less.

[Cellulose Acylate Based Film]

The use of a cellulose acylate based film is preferable for the base layer of the first protective film because it is optically uniform and advantageous for a secondary process when preparing a polarizing plate and has a smooth surface.

An aliphatic carboxylic acid ester or an aromatic carboxylic acid ester with 2 to 22 carbon atoms or so that is a cellulose ester of a lower fatty acid is particularly preferable for the cellulose acylate to be used for the first protective film.

A lower fatty acid in the expression of cellulose ester of a lower fatty acid refers to a fatty acid with 6 or less carbon atoms. Examples of such preferable esters include cellulose acetate, cellulose propionate, cellulose butyrate and celluloseacetatephthalate as well as mixtures of esters of fatty acids such as celluloseacetatepropionate and celluloseacetatebutylate described in JP-A Nos. 10-45804 and 08-231761 and U.S. Pat. No. 2,319,052 and cellulose esters of aromatic carboxylic acids described in JP-A Nos. 2002-179701, 2002-265639 and 2002-265638.

Of the esters listed above, cellulose esters of lower fatty acids that are particularly preferable for the purpose of the present invention are cellulose triacetate and celluloseacetatepropionate, which will be described hereinafter. Those cellulose esters may be combined to form a mixture.

The degree of substitution (DS) of cellulose acylate refers to the ratio at which the three hydroxyl groups found in each cellulose-forming unit (β1→4-glycoside bonded glucose) are acylated.

The degree of substitution can be computationally determined by measuring the quantity of bonded fatty acid per unit mass of the cellulose-forming unit. A measurement method conforming to ASTM-D817-91 can be used for the purpose of the present invention.

The cellulose acylate can make the humidity dependency of retardation and the size stability compatible by appropriately balancing the hydrophobicity of acyl group and the hydrophilicity of hydroxyl group.

In other words, the humidity dependency of retardation increases when the alkyl chain in the acyl group is too short in average and/or the hydroxyl group ratio is too high.

On the other hand, Tg falls to degrade the size stability when the alkyl chain in the acyl group is too long in average and/or the hydroxyl group ratio is too high.

Therefore, when cellulose triacetate is employed for the purpose of the present invention, it preferably shows a degree of acetylation of 2.83 or more and 2.91 or less and has three or more carbon atoms but does not have any other acyl group. More preferably, the degree of acetylation is 2.84 or more and 2.89 or less.

Preferable cellulose esters other than cellulose triacetate are those having an acyl group with 2 to 4 carbon atoms as a substituent and satisfy both the requirements of the formulas (a) and (b) shown below at the same time:

$$2.6 \leq X+Y \leq 2.9 \quad \text{formula (a) and}$$

$$0 \leq X \leq 2.5 \quad \text{formula (b),}$$

where X is the degree of substitution with acetyl groups and Y is the degree of substitution with propionyl groups.

Among cellulose esters that satisfy the requirements of the formulas (a) and (b) above at the same time, celluloseacetatepropionate with $1.9 \leq X \leq 2.5$ and $0.1 \leq Y \leq 0.9$ (total degree of substitution with acyl groups =X+Y) are preferable. The moieties that are not substituted by acyl groups are found as ordinary hydroxyl groups. Such compounds can be synthesized by any known appropriate method.

[Resin Containing Lactone-Ring-Containing Polymer]

A resin film containing a lactone-ring-containing polymer to be used for the transparent support can be prepared by any of the methods described in JP-A Nos. 2006-96960, 2000-230016, 2001-151814, 2002-120326 and 2002-254544.

While the resin containing a lactone-ring-containing polymer contains a lacton-ring-containing polymer as principal ingredient, it may additionally contain one or more polymers other than the lactone-ring-containing polymer.

Examples of polymers other than lactone-ring-containing polymers that can be used for the purpose of the present invention include olefin polymers such as polyethylene, polypropylene, ethylene-propylene copolymer and poly(4-methyl-1-pentene), halogen-containing polymers such as vinyl chloride resin and chlorinated vinyl resin, acryl polymers such as methyl polymethacrylate, styrene polymers such as polystyrene, styrene-methyl methacrylate copolymer and styrene-acrylonitril copolymer, acrylonitrile-butadiene-styrene block copolymer, polyesters such as polyethyleneterephthalate, polybutyleneterephthalate and polyethylenenaphtalate, polyamides such as nylon 6, nylon 66 and nylon 610, polyacetals, polycarbonates, polyphenyleneoxides, polyphenylenesulfides, polyether-ether ketones, polysalfones, polyethersalfones, polyoxybenzylenes, polyaimideimides, rubber like polymers such as ABS resin and ASA resin prepared by compounding polybutadiene rubber or acryl rubber.

The method of manufacturing a lactone-ring-containing polymer is not subjected to any particular limitations and an appropriate method may be selected according to the purpose. However, a method of manufacturing a lactone-ring-containing polymer by which a polymer having hydroxyl groups and ester groups in a molecular chain is obtained by way of a polymerization process and subsequently a lacton-ring-containing polymer is obtained by heat treatment of the obtained polymer in order to introduce a lactone-ring structure into the copolymer by way of a lactone-ring condensation process may preferably be used.

[Polyester Resins]

The polyester resin is not subjected to any specific structural limitations.

Examples of polyester resins include polyethyleneterephthalate, polyethylenenaphtalate, polybutyleneterephthalate and polybutylenephthalate.

Of these, the use of polyethyleneterephthalate is preferable from the viewpoint of cost and mechanical strength. Particularly, a resin obtained by condensation/polymerization using an aromatic dicarboxylic acid and an aliphatic glycol is preferable.

Examples of aromatic dicarboxylic acids include isophthalic acid and 2,6-naphthalane dicarboxylic acid in addition to terephthalic acid. Alternatively, lower alkyl esters (anhydrides, ester-formable derivatives such as lower alkyl esters) may be used in place of an aromatic dicarboxylic acid.

Examples of aliphatic glycols include ethylene glycol, propylene glycol, butanediol, neopenthyl glycol, 1,4-cyclohexanedimethanol, diethylene glycol and p-xylylene glycol. Of these, the use of polyethyleneterephthalate obtained by way of a reaction of terephthalic acid and ethylene glycol as principal ingredient is preferable.

That polyethyleneterephthalate is a principal ingredient refers to a copolymer where the repeating unit of polyethyleneterephthalate is 80 mol % or more or, when blended, the content ratio of polyethyleneterephthalate is 80 mass % or more.

Polyesters that can be used for the purpose of the present invention may be such that the terminal hydroxyl group and/or the carboxylic group thereof are blocked by means of a mono-functional compound such as benzoic acid, benzoyl-benzoic acid, benzyloxybenzoic acid or methoxypolyalkyleneglycol or they are modified within a range where a liner copolymer is substantially obtained by means of a small quantity of tri- or tetrafunctional ester forming compound such as glycerin or pentaerythritol.

The polyester to be used as transparent support may be copolymerized with a bisphenol compound or a compound having a naphthalene ring or a cyclohexane ring for the purpose of improving the thermal resistance of the film.

The polyester to be used as transparent support preferably has a glass transition temperature (Tg) of 80° C. or more, and more preferably 90° C. or more. The size stability of the obtained film is not satisfactory in a hot and highly humid environment when the glass transition temperature is less than 80° C.

The polyester film is preferably formed by biaxial stretching. The method to be used for obtaining the polyester film is not subjected to any particular limitations and any of the known methods may be used for the purpose of the present invention. For example, a method as described below may be used. Note that, in the following description of the method, the longitudinal direction refers to the film forming direction and the transversal direction refers to the direction orthogonal to the film forming direction.

Firstly, the starting polyester is molded into pellets, which are then dried by hot air or in vacuum. Subsequently, they are molten and extruded to form a sheet of polyester by means of a T die, which sheet is then made to tightly adhere to a cooling drum typically by means of application of electrostatic force in order to cool and solidify the sheet. In this way, an unstretched sheet is obtained.

Subsequently, the obtained unstretched sheet is heated by means of a plurality of roll groups and/or an infrared heater to a temperature range from the glass transition temperature (Tg) of polyester to Tg+100° C. in order to longitudinally stretch the sheet in a single stage or multistage stretching process.

Thereafter, the obtained longitudinally stretched polyester film is transversally stretched and is then heat-set within the temperature range of Tg to Tm (melting point).

The heat-set film is then normally cooled to a temperature level below Tg and the clip-held parts at the opposite ends of the film are cut before it is taken up by a roller. At this time, the film is preferably subjected to a relaxation process where it is transversally and/or longitudinally relaxed by 0.1% to 10% within a temperature range of the final heat curing temperature or less and Tg or more.

The means to be used for the cooling process and the relaxation process are not limited to any particular limitations and any of the known methods may be used, although the film is preferably gradually cooled by way of a plurality of temperature ranges while it is subjected to the processes from the viewpoint of improving the size stability of the film.

The heat curing conditions, the conditions of the cooling process and those of the relaxation process can vary depending on the polyester of the film. Therefore, it is preferable to observe the physical properties of the obtained stretched film and determine the conditions so as to make the film show desired characteristics.

In the course of manufacturing the film, one or more functional layers such as an anti-static layer, a smoothing layer, an adhesive layer and/or a barrier layer may be formed by application of one or more agents. If necessary, the film may be subjected to any of various surface treatment processes such as a corona discharge treatment process, an atmospheric pressure plasma treatment process and/or a chemical solution treatment process.

[Polycarbonate Resin]

Polycarbonate resin to be used for the transparent support is a polyester of carbonic acid and glycol or divalent phenyl, which may be an aromatic polycarbonate having carbonic acid and 2,2'-bis(4-hydroxyphenyl)-propane (popularly referred to as bisphenol-A) as structural unit, although the present invention is by no means limited thereto. Other examples include homo and co-polymeric polycarbonates having as monomer component at least a divalent phenol selected from 1,1-bis(4-hydroxyphenyl)-alkylcycloalkanes, 1,1-bis(3-substituted-4-hydroxyphenyl)-alkylcycloalkanes, 1,1-bis(3,5-substituted-4-hydroxyphenyl)-alkylcycloalkanes, 9,9-bis(4-hydroxyphenyl)fluorenes, mixtures of any of such homo and co-polymeric polycarbonates and a polycarbonate having a divalent phenol selected from the above and bisphenol A as monomer component and copolymeric polycarbonates having a divalent phenol selected from the above and bisphenol A as monomer component.

Specific examples of 1,1-bis(4-hydroxyphenyl)-alkylcycloalkanes include 1-bis(4-hydroxyphenyl)-3,3,5-trimethylcyclohexane, 1,1-bis(4-hydroxyphenyl)-3,3-dimethyl-5,5-dimethylcyclohexane, 1,1-bis(4-hydroxyphenyl)-3,3-dimethyl-5-methylcyclopentane.

Specific examples of 1,1-bis(3-substituted-4-hydroxyphenyl)-alkylcycloalkanes include 1,1-bis(4-hydroxyphenyl)-alkylcycloalkanes substituted by an alkyl group having 1 to 12 carbon atoms or a halogen group such as 1,1-bis(3-methyl-4-hydroxyphenyl)-3,3,5-trimethylcyclohexane, 1,1-bis(3-ethyl-4-hydroxyphenyl)-3,3-dimethyl-5,5-dimethylcyclohexane, 1,1-bis(3-chloro-4-hydroxyphenyl)-3,3-dimethyl-4-methylcyclohexane and 1,1-bis(3-bromo-4-hydroxyphenyl)-3,3-dimethyl-5-methylcyclopentane.

Specific examples of 1,1-bis(3,5-substituted-4-hydroxyphenyl)-alkylcycloalkanes include 1,1-bis(-4-hydroxyphenyl)-alkylcycloalkanes substituted by an alkyl group having 1 to 12 carbon atoms or a halogen group such as 1,1-bis(3-methyl-4-hydroxyphenyl)-3,3,5-trimethylcyclohexane, 1,1-bis(3,5-dichloro-4-hydroxyphenyl)-3,3-dimethyl-5-methylcyclohexane, 1,1-bis(3-ethyl-5-methyl-4-hydroxyphenyl)-3,3,5-trimethylcyclohexane, 1,1-bis(3,5-dimethyl-4-hydroxyphenyl)-3,3,5-trimethylcyclohexane and 1,1-bis(3,5-dimethyl-4-hydroxyphenyl)-3,3-dimethyl-5-methylcyclopentane.

Specific examples of 9,9-bis(4-hydroxyphenyl)fluorenes include 9,9-bis(4-hydroxyphenyl)fluorine, 9,9-bis(3-methyl-4-hydroxyphenyl)fluorine, and 9,9-bis(3-ethyl-4-hydroxyphenyl)fluorine.

Other bisphenols that can be used for the purpose of the present invention include 2,2'-bis(4-hydroxyphenyl)propane (bisphenol-A)-4,4'(α-methylbenzylidene)bisphenol, bis(4-hydroxyphenyl)methane, 2,2'-bis(4-hydroxyphenyl)butane, 3,3'-bis(4-hydroxyphenyl)pentane, 4,4'-bis(4-hydroxyphenyl)heptane, 4,4'-bis(4-hydroxyphenyl)2,5-dimethylheptane, bis(4-hydroxyphenyl)methylphenylmethane, bis(4-hydroxyphenyl)diphenylmethane, 2,2'-bis(4-hydroxyphenyl)octane, bis(4-hydroxyphenyl)octane, bis(4-hydroxyphenyl)-4-fluorophenylmethane, 2,2'-bis(3-fluoro-4-hydroxyphenyl)propane, bis(3,5-dimethyl-4-hydroxyphenyl)methane, 2,2'-bis(3,5-dimethyl-4-hydroxyphenyl)propane, bis(3,5-dimethyl-4-hydroxyphenyl)phenylethane and bis(3-methyl-4-hydroxyphenyl)diphenylmethane. Any of the above listed compounds may be used alone or alternatively a mixture of two or more of them may be used.

The polycarbonate contains polyester carbonate formed by using an aliphatic or aromatic dicarboxylic acid at a small ratio as comonomer of the acid component in addition to the bisphenol component.

Examples of aromatic dicarboxylic acids include terephthalic acid, isophthalic acid, p-xylene glycol, bis(4-hydroxyphenyl)-methane, 1,1'-bis(4-hydroxyphenyl)-ethane, 1,1'-bis(4-hydroxyphenyl)-butane and 2,2'-bis(4-hydroxyphenyl)-butane, of which terephthalic acid and isophthalic acid are preferable.

The molecular weight of the polycarbonate is preferably 2,000 to 100,000 in terms of viscosity averages molecular weight, more preferably 5,000 to 70,000 in terms of viscosity average molecular weight, and most preferably 7,000 to 50,000 in terms of viscosity average molecular weight.

The specific viscosity of the polycarbonate is preferably 0.07 to 2.70, more preferably 0.15 to 1.80, and most preferably 0.20 to 1.30 as observed at 20° C. as a methylene chloride solution of a concentration of 0.7 g/dl. The produced film is inappropriate when the viscosity average molecular weight is less than 2,000 because the film is fragile with such a molecular weight. The film is poorly processible and hence not desirable when the viscosity average molecular weight is 100,000 or more.

If necessary, an ultraviolet absorber may be added to the polycarbonate resin as in the case of polyester resin. Additionally, it may be subjected to a drying process and/or an adhesion facilitating process in order to intensify the adhesiveness relative to the polarizer.

While, methods that can be used for manufacturing a film from the polycarbonate resin include the solution-cast method, the melt extrusion method and the calendar method, a method that provides a uniform thickness and is free from optical defects such as gel, dust, fisheye and scratch is preferable.

[Polystyrene Resin]

While the polystyrene resin may be of a syndiotactic structure, of an isotactic structure or of an atactic structure. The syndiotactic structure is particularly good because it shows a high dynamic strength and a small thermal contraction coefficient.

Now, polystyrene resins will be described below in terms of sydiotactic structure.

Syndiotactic-polystyrene polymers have a three-dimensional structure where phenyl groups and derivatives thereof are located alternately at the opposite sides as side chains relative to the main chain formed by carbon-carbon bonds. The tacticity is generally quantified by means of the nuclear magnetic resonance method using carbon isotopes ($^{13}$C-NMR method) because it provides a high degree of accuracy.

The tacticity observed by the $^{13}$C-NMR method can be expressed by the ratio of the plurality of consecutive component units, using terms of diad for two consecutive component units, triad for three consecutive component units, pentad for five consecutive units and so on.

The styrene copolymer having a syndiotactic structure preferably shows a tacticity of 75% or more and 100% or less, more preferably a tacticity of 85% or more and 100% or less, in terms of racemic diads. It shows a tacticity of 30% or more and 100% or less, more preferably 50% or more and 100% or less, in terms of racemic pentads.

Specific examples of styrene copolymers having a syndiotactic structure include polystyrenes, poly(alkyl styrene)s, poly(halogenated styrene)s, poly(halogenated alkyl styrene)s, poly(alkoxy styrene)s and poly(vinyl benzoate ester)s that are tactic.

Examples of poly(alkyl styrene)s include poly(methyl styrene), poly(ethyl styrene), poly(propyl styrene), poly(butyl styrene), poly(phenyl styrene), poly(vinyl naphthalene), poly(vinyl styrene) and poly(acenaphthene).

Specific examples of poly(halogenated styrene)s include poly(chlorostyrene), poly(bromostyrene) and poly(fluorostyrene).

Specific examples of poly(alkoxy styrene)s include poly(methoxy styrene) and poly(ethoxy styrene).

Of the above, poly(styrene)s and poly(methyl styrene)s are more preferable and poly(styrene)s are most preferable.

Syndiotactic-polystyrene polymers may be homopolymers as listed above or copolymers.

Comonomer components of copolymers include, in addition to the above listed monomers for forming styrene polymers, olefin monomers such as ethylene, propylene, butene, hexene and octene, diene monomers such as butadiene and isoprene, cyclic olefin monomers, cyclic diene monomers and polar vinyl monomers such as methyl methacrylate, maleic acid anhydride and acrylonitrile.

Of the above-listed styrenes, those obtained by copolymerization of styrene as a main ingredient with an alkyl styrene, styrene hydroxide or styrene halide are preferable. More preferable styrenes include p-methyl styrene, m-methyl styrene, p-tertiary butyl styrene, p-chlorostyrene, m-chlorostyrene, p-fluorostyrene and styrene hydroxide, of which p-methyl styrene is most preferable.

The ratio at which the styrene is added is preferably 0 mass % or more and 30 mass % or less, more preferably 1 mass % or more and 20 mass % or less, preferably 3 mass % or more and 10 mass % or less. The rate of crystallization is retarded and the generation of spherocrystal is suppressed as a result of copolymerization. Then, the obtained syndiotactic-polystyrene based film is highly transparent and shows a high folding endurance.

The syndiotactic-polystyrene polymer may be blended with other polymers.

Preferable polymers that can be used for such blending include styrene polymers having a syndiotactic structure as described above and styrene polymers having an atactic structure from the viewpoint of phase solubility.

A particularly preferable blending recipe for such blending is to use a polystyrene having a syndiotactic structure as principal component and blend it with a homopolymer having a syndiotactic structure or an atactic structure formed by using p-methyl styrene, m-methyl styrene, p-tertiary butyl styrene, p-chlorostyrene, m-chlorostyrene, p-fluorostyrene or styrene hydroxide as component and/or a copolymer having a syndiotactic structure or an atactic structure formed by using at least one of such monomers and styrene.

It is particularly preferable to blend p-methyl styrene having a syndiotactic structure or a copolymer of p-methyl styrene having a syndiotactic structure and styrene with a polystyrene having a syndiotactic structure.

That ratio at which the polymer is added to form a blend is preferably 0 mass % or more and 30 mass % or less, more preferably 1 mass % or more and 20 mass % or less, and most preferably 3 mass % or more and 10 mass % or less, of the total quantity of the polymer. The rate of crystallization is retarded and the generation of spherocrystal is suppressed as a result of such blending. Then, the obtained syndiotactic-polystyrene based film is highly transparent and shows a high folding endurance.

Preferable compositions of polymers that satisfy the above requirements are listed below. In the following, "syn", "atc" and "iso" respectively stand for syndiotactic, atactic and isotactic.

(1) Homopolymers
P-1: syn-poly(styrene)
P-2: syn-poly(p-methyl styrene)
P-3: syn-poly(p-chloro styrene)
P-4: syn-poly(styrene hydroxide)
P-5: iso-poly(styrene)
P-6: atc-poly(styrene)

(2) Copolymers and Mass Ratios
P-7: syn-poly(styrene/p-methyl styrene), (95/5)
P-8: syn-poly(styrene/p-methyl styrene), (85/15)
P-9: syn-poly(styrene/p-chlorostyrene) (95/5)
P-10: syn-poly(styrene/p-chlorostyrene) (85/15)
P-11: syn-poly(styrene/styrene hydroxide) (95/5)
P-12: syn-poly(styrene/styrene hydroxide) (85/15)
P-13: syn-poly(styrene/styrene hydroxide/p-methyl styrene) (95/5/5)

(3) Polymer Blends and Mass Ratios
P-14: snd-poly(styrene)+syn-poly(p-methyl styrene) (95/5)
P-15: snd-poly(styrene)+syn-poly(p-methyl styrene) (85/15)
P-16: snd-poly(styrene)+syn-poly(p-chlorostyrene) (95/5)
P-17: snd-poly(styrene)+syn-poly(p-chlorostyrene) (85/15)
P-18: snd-poly(styrene)+syn-poly(styrene hydroxide) (95/5)
P-19: snd-poly(styrene)+syn-poly(styrene hydroxide) (85/15)
P-20: snd-poly(styrene)+atc-poly(styrene) (95/5)
P-21: snd-poly(styrene)+atc-poly(styrene) (85/15)
P-22: snd-poly(styrene)+iso-poly(styrene) (95/5)
P-23: snd-poly(styrene)+iso-poly(styrene) (85/15)
P-24: snd-poly(styrene)+atc-poly(p-methyl styrene) (95/5)
P-25: snd-poly(styrene)+atc-poly(p-methyl styrene) (85/15)
P-26: snd-poly(styrene)+atc-poly(styrene hydroxide) (95/5)
P-27: snd-poly(styrene)+atc-poly(styrene hydroxide) (85/15)
P-28: snd-poly(styrene)+atc-poly(styrene)+syn-poly(p-styrene) (95/5/5)
P-29: snd-poly(styrene)+syn-poly(p-methyl styrene+styrene copolymer) (mol ratio=10:90) (70/30)
P-30: snd-poly(styrene)+syn-poly(p-methyl styrene+styrene copolymer) (mol ratio=10:90) (50/50)
P-31: snd-poly(styrene)+syn-poly(p-methyl styrene+styrene copolymer) (mol ratio=5:95) (70/30)
P-32: snd-poly(styrene)+syn-poly(p-methyl styrene+styrene copolymer) (mol ratio=30:70) (90/10)

These styrene copolymers preferably have a mass average molecular weight of 100,000 or more and 800,000 or less, more preferably 200,000 or more and 600,000 or less.

Additionally, their molecule weight distributions are preferably such that the value of mass average molecular weight (Mw)/number average molecular weight (Mn) is 1.5 or more and 5 or less, and more preferably 2 or more and 4 or less. Such a syndiotactic-polystyrene polymer can be manufactured typically by polymerization of a styrene monomer (a monomer corresponding to the component of the styrene polymer) in the presence or absence of inert hydrocarbon solvent, using a titanium compound and a condensation product of water and trialkyl aluminium as catalyst (see JP-A No. 62-187708).

Alternatively, as disclosed in JP-A No. 04-249504, it can be manufactured by polymerization using a titanium compound and a compound formed by cations and anions produced by a plurality of groups bonded to an element as catalyst.

Fine inorganic particles of silica, talc, titania, almina, calcium carbonate, calcium oxide, calcium chloride or a mixture of any of them, fine organic particles of cross-linked polystyrene or cross-linked polymethylmethacrylate or the like, an antioxidant, an antistatic agent and or a pigment may be added to an extent that is not contradictory to the object of the present invention.

The residual styrene monomer in the styrene polymer or the composition containing it is preferably 7,000 ppm or less in order to prevent the monomer from depositing in the formed film.

Then, a film is formed by using the styrene polymer or the composition containing it as material. A melt film-forming process or a solution film forming process may be used for forming the film.

The point of film formation as described below is vital for achieving the intra-planar retardation, the retardation in the direction of the film thickness, the thermal contraction coefficient, the all light transmitting effect and the folding endurance defined for the purpose of the present invention. Namely, it is important to prepare a film that is uniform both in the intra-planar direction and in the direction of the film thickness and non-oriented. When a melt film-forming process is employed, the starting material is molten by heating, extruded, cooled and solidified to produce a film.

For melt extrusion, the starting material is molten preferably at 250° C. to 330° C., and more preferably at 270° C. to 320° C. Either a monoaxial extruder or a biaxial extruder may be used. Subsequently, a mesh filter is preferably employed to crush and remove secondary aggregated particles and also remove dust and foreign objects.

Thereafter, a film is molded on an extrusion/cooling drum by way of a T-die that is heated preferably to 250° C. to 330° C., and more preferably to 270° C. to 320° C.

For the purpose of the present invention, the temperature of the lower lip is made higher than that of the upper lip of the T-die preferably in a range 2° C. or more and 30° C. or less, and more preferably in a range 3° C. or more and 20° C. or less.

This is because, while the lower lip side contacts the cooling drum and is quickly cooled, the upper lip side shows a slow cooling rate because it is located at the air side. The cooling rates of the two sides can be balanced and the temperature distribution can be made uniform in the direction of the film thickness by raising the temperature of the lower lip side in advance.

<<Coat Layer>>

[First Coat Layer]

-Coat Layer Containing Vinyl Alcohol Polymer-

A resin layer containing a vinyl alcohol polymer is preferably arranged on the transparent support as the first coat layer in order to provide a protective film for a polarizing plate according to the present invention with the required water vapor transmission rate characteristic.

While a resin layer containing a vinyl alcohol polymer shows an excellent water vapor transmitting effect in a low humidity condition because molecular chains are tightly put together in it by hydrogen bonds, it is known that molecular chains are plasticized in it to become to show a poor water vapor transmitting effect in a high humidity condition.

Examples of vinyl alcohol-polymers include homopolymers such as polyvinyl alcohol and copolymers such as ethylene-vinyl alcohol copolymer. The vinyl alcohol-polymers may be used alone or in combination.

For the purpose of the present invention, the ratio of saponification of a vinyl alcohol polymer can be selected appropriately within a range of 80 mol % or more, preferably a range of 95 mol % or more. The degree of polymerization of a vinyl alcohol polymer is preferably 100 to 5,000, more preferably 200 to 4,000, and most preferably 300 to 3,000 from the viewpoint of water vapor transmission rate and ease of coating.

-Thickness of First Coat Layer-

The thickness of the first coat layer is preferably 1.0 μm to 10 μm, more preferably 2 μm to 8 μm, and most preferably 3 μm to 7 μm. The effect of improving light leakage is not satisfactory and hence not preferable when the thickness of the first coat layer is less than 1 μm, whereas the fragility of the coat layer is worsened and hence not preferable when the thickness of the first coat layer exceeds 10 μm.

-Layered Inorganic Compound-

A layered inorganic compound is preferably dispersed in the resin layer in order to improve the water vapor transmitting effect. For the purpose of the present invention, a layered inorganic compound refers to an inorganic compound having a structure where unit crystal layers are laid one on the other and that shows a swelling or cleaving property as the solvent is coordinated or absorbed among the layers.

Such inorganic compounds include hydrous silicates that show a swelling property. Examples of such inorganic compounds include smectite group clay minerals (mon+morillonite, beidellite, nontronite, saponite, hectorite, sauconite, stevensite, etc.), vermiculite group clay minerals (vermiculite, etc.), kaolin type minerals (halloysite, kaolinite, endellite, dickite, etc.), phylosilicates (talc, pyrophylite, mica, margarite, white mica, bronze mica, tetrasilylic mica, teniolite, etc.), serpentine group minerals (antigorite, etc.), chlorite group minerals (chlorite, cookite, nantite, etc.). Such swelling layered inorganic compounds may be natural or synthetic.

Such layered inorganic compounds may be subjected to an organizing process. A layered inorganic compound can be turned into an organic compound by making it contain a compound having onium ions. More specifically, a layered inorganic compound can be turned into an organic compound by adding an organizing agent having organic onium ions to it. While organic onium ions are not subjected to any particular limitations, examples of organic onium ions include primary—quaternary ammonium ions of monoalkyls, secondary—tertiary ammonium ions of dialkyls, ammonium ions of tertiary—quaternary ammonium ions of trialkyls and tetraalkyl ammonium ions. The alkyl chain length is preferably of 4 to 30 carbon atoms long, more preferably of 6 to 20 carbon atoms long, and most preferably that of 8 to 18 carbon atoms long. Examples other than alkyl chains include primary—quaternary ammonium ions of polyethylene glycol chains having ethylene oxide as component unit (or ammonium ions of monoethylene glycol, diethylene glycol, triethylene glycol tetraethylene glycol). Still other examples include primary—quaternary ammonium ions of higher fatty acids, primary—quaternary ammonium ions of esters of higher fatty acids and primary—quaternary ammonium ions of higher alcohols or, ammonium ions having such molecular chains in combination. Further examples include secondary—quaternary ammonium ions of compounds obtained by adding any of such molecular chains to fatty acids.

Further, such layered inorganic compounds may be used alone or in combination.

A welling layered inorganic compound that is subjected to a micro granulation process is preferable because a gas barrier property and a tight contact between the base layer and the gas barrier layer are made compatible by such an inorganic compound. When a swelling layered inorganic compound is subjected to a micro granulation process, the particles of the compound normally show a plate-shaped or flat profile, where the contour of the flat profile is not subjected to any particular limitations in plan views. In other words, the particles may have any contours.

After the micro granulation process, the average size (the average diameter of the profiles of the particles in a plan view as observed by the light scattering method) of the particles of the swelling layered inorganic compound is preferably 0.1 μm to 10 μm, more preferably 0.5 μm to 8 μm, and most preferably 0.8 μm to 6 μm. The effect of reducing the water vapor transmission rate is not sufficient when the particle size is smaller than the above range, whereas both the haze value and the surface roughness value disadvantageously increase when the average particle size is larger than the above range.

The concentration of the layered inorganic compound is preferably 3 mass % to 60 mass %, more preferably 3 mass % to 50 mass %, and most preferably 3 mass % to 40 mass %. The effect of reducing the water vapor transmission rate is insufficient when the concentration falls below the above range, whereas the haze value and the fragility disadvantageously increase when the concentration exceeds the above range.

The average particle size refers to a particle radius that appears most abundantly within the particle radius distribution as measured by an ordinary particle size distribution analyzer, e.g., a light scattering type particle size distribution analyzer (Microtrack UPA: tradename, available from Nikkiso).

When the layered inorganic compound is dispersed within a binder in a condition where the inter-layers are neatly cleaved, it prolongs the diffusion route length of water molecules or clusters to reduce the water vapor transmission rate.

Therefore, a dispersion process for achieving a condition where each inter-layer of the layered inorganic compound is neatly cleaved is very important.

The dispersion process is preferably conducted for a plurality of times in a solution under high pressure. The processing pressure is preferably 10 MPa or more, more preferably 20 MPa or more.

The solvent to be used for the dispersion process is not subjected to any particular limitations and an appropriate solvent may be used according to the purpose. Examples of solvents that can be used for unorganized layered inorganic compounds include water and water-soluble solvents (lower alcohols such as methanol, ethanol, and isopropyl alcohol, and acetone etc.), of which water is particularly preferable.

A mixture solvent of water and alcohol may also preferably be used in order to provide an anti-foaming effect. An anti-foaming agent selected from silicon emulsion, a PEO-PPO block polymer, octyl alcohol, methanol and so on may also preferably be used. Methods that can be used for a high pressure dispersion process include one with which the swelling layered inorganic compound is immersed in a solvent to swell and subsequently stirred and dispersed under high pressure by a high pressure homogenizer. While the method for regulating the coating solution is not subjected to any particular limitations, a technique of uniformly dissolving the binder component of the coat layer into a solvent and subsequently uniformly dispersing the layered particles to mix it with the solvent may effectively be used.

After the preparation of the solution, it is preferably filtered by means of a filter having a mesh size larger than the largest particle size of the layered inorganic compound.

For the purpose of the present invention, a cross-linking agent for PVA polymers can be added to the PVA polymer and the layered inorganic compound as an ingredient of the resin composition in order to improve the water-resistance of the adhesive layer. The cross-linking agent is not subjected to any particular limitations and any known cross-linking agent can advantageously be used for the purpose of the present invention. Examples of such cross-linking agents include phenol resins, melamine resins, urea resins, polyamide polyurea, dimethylol urea, dimethylol melamine, polyhydric epoxy compounds, dialdehyde compounds, polyvalent isocyanate resins, aziridine compounds, polyamideamineepichlorohydrin compounds, activated vinyl compounds, dicarbonate compounds, hydrazine-group-containing compounds, colloidal silica, zirconium salts, polyvalent metal salts, boric acid, phosphoric acid, polyacrylic acid, dicarboxylic acid, adipic acid anhydride, succinic acid anhydride and titanium compounds such as tetraisopropyltitanate and diisopropoxy-bis (acetylacetone)titanate. A coupling agent such as 3-glycidopropylmethoxysilane and/or a radical generating agent such as peroxide may also be used.

Of the above-listed cross-linking agents, activated vinyl compounds, dicarbonate compounds, colloidal silica, zirconium salts, polyvalent metal salts, boric acid, phosphoric acid, polyacrylic acid, dicarboxylic acid, adipic acid anhydride, succinic acid anhydride and titanium compounds such as tetraisopropyltitanate and diisopropoxy-bis(acetylacetone)titanate may most suitably be used because they are excellent in terms of balancing viscosity with adhesion strength.

The added amount of the cross-linking agent (cross-linking agent/(PVA polymer+cross-linking agent) is preferably 0.5 mass % or more, more preferably 1 mass % or less, and most preferably 2 mass % or more. The effect of adding the cross-linking agent is not expressed when the mass ratio of the cross-linking agent is less than 0.5 mass % relative to the total mass of the PVA polymer and the cross-linking agent. The mass ratio of the cross-linking agent relative to the total mass of the PVA polymer and the cross-linking agent is preferably 50 mass % or less, preferably 40 mass % or less, and most preferably 30 mass % or less. The transparency and the water-resistance of the adhesive layer that is formed by the resin composition tend to fall when the mass ratio of the cross-linking agent exceeds 50 mass %.

While the technique for regulating the coating solution is not subjected to any particular limitations, a technique of adding the layered inorganic compound that has been dispersed in a solvent in advance to the solution dissolving the vinyl alcohol polymer and subsequently dispersing it under high pressure or a technique of pouring the vinyl alcohol polymer into the dispersion of the layered inorganic compound and subsequently dissolving the vinyl alcohol polymer may effectively be used. The method of forming the film layer of the water-dispersing resin and the water-swelling layered inorganic compound is not subjected to any particular limitations. A technique of forming a film layer on a cellulose acylate substrate from of an aqueous dispersion of the water-dispersing resin and the water-swelling layered inorganic compound by means of a coating method selected from the direct gravure coating method, the reverse gravure coating method, the dye coating method, the comma coating method and so on may be used. The thickness of the coat layer is preferably within a range of 1 μm to 10 μm, and more preferably within a range of 2 μm to 8 μm.

The transparent support is preferably subjected to a surface treatment process such as a saponification process or a corona treatment and a process for providing an adhesion facilitating layer on the substrate from the viewpoint of tight adhesion of the resin layer and the cellulose acylate substrate.

[Second Coat Layer]

Another coat layer may be arranged in addition to the above described coat layer that contains a vinyl alcohol polymer as principal component in order to reduce the water vapor transmission rate under high humidity and satisfy the requirements of water vapor transmission rate as defined for the purpose of the present invention. The coat layer other than the coat layer that contains a vinyl alcohol polymer as principal component may be a layer containing a polymer having repetitive units derived from a chlorine-containing vinyl monomer, a coat film containing a compound of alkoxy silane, a compound having a functional group that reacts with a hydroxyl group or an alkoxy group and/or a silane coupling agent or a coat film containing silica formed from a coating composition containing polysilazane as combined with the first coat layer. Most preferably, the first coat layer is combined with a layer containing a polymer having repetitive units derived from a chlorine-containing vinyl monomer in view of the water vapor transmission rate. The method of laminating the first and second coat layers one on the other and the order of arranging the two coat layers are not subjected to any particular limitations. The first coat layer and the second coat layer may be arranged at the opposite sides of the transparent support.

-Resin Layer Containing a Polymer Having Repetitive Units Derived from a Chlorine-Containing Vinyl Monomer- Popular chlorine-containing vinyl monomers include vinyl chloride and vinylidene chloride. A chlorine-containing polymer can be obtained by copolymerizing vinyl chloride or vinytlidene chloride monomers with monomers that can be copolymerized with vinyl chloride or vinylidene chloride monomers.

Chlorine-containing polymers that can be used for the purpose of the present invention include those described in JP-A Nos. 53-58553, 55-43185, 57-139109, 57-139136, 60-235818, 61-108650, 62-256871, 62-280207 and 63-256665.

The content ratio of chlorine-containing vinyl monomers in a chlorine-containing polymer is preferably 50 mass % to 99 mass %, more preferably 60 mass % to 98 mass %, and most preferably 70 mass % to 97 mass %. A problem of degradation of the water vapor transmitting effect and other problems arise when the content ratio of chlorine-containing vinyl monomers is 50% or more, whereas the chlorine-containing polymer can advantageously be dissolved in various solvents when the content ratio is 99% or less.

Chlorine-containing polymers are available from Asahi Kasei Chemicals and Kureha Chemical Industry. Chlorine-containing polymers available from Asahi Kasei Chemicals include the following: "Saran Resin R241C", "Saran Resin F216", "Saran Resin R204", "Saran Latex L502", "Saran Latex 1L529B", "Saran Latex L536B", "Saran Latex L544D", "Saran Latex L549B", "Saran Latex L551B", "Saran Latex L557", "Saran Latex L561A", "Saran Latex L116A", "Saran Latex L411A", "Saran Latex L120", "Saran Latex L123D", "Saran Latex L106C", "Saran Latex L131A", "Saran Latex L111", "Saran Latex L232A" and "Saran Latex L321B", of which Saran Resin F216 and Saran Resin R204 advantageously be used because they are soluble to ketone type solvents (methyl ethyl ketone, cyclohexanone, etc.).

-Thickness of Second Coat Layer-

The thickness of the second coat layer is preferably 0.3 µm to 5 µm, more preferably 0.5 µm to 4 µm, and most preferably 0.7 µm to 3 µm. The effect of lessening the problem of light leakage is not satisfactory when the thickness of the second coat layer is less than 0.3 µm because the effect of reducing the water vapor transmission rate is not sufficient.

On the other hand, a problem of yellowed film and/or other problems arise when the thickness of the second coat layer exceeds 5 µm.

For the purpose of the present invention, tetrahydrofuran may advantageously be used as principal solvent when the chlorine-containing polymers are vinylidenen chloride.

It is preferable to select a copolymer of vinylidene chloride because of the high solubility relative to toluene and ketone solvents it provides. The use of a toluene or ketone solvent instead of tetrahydrofuran is more preferable. The use of methyl ethyl ketone or cyclohexanone is most preferable.

Any of the above-listed solvents may preferably be added within the range where the solute can be dissolved in tetrahydrofuran. When tetrahydrofuran is used, it is preferable to add a reducing substance such as p-cresol, resorcin, hydroquinone or a ferrous salt to the coating solution by 0.01 mass % to 1 mass % from the viewpoint of light stability. Such an additive can preferably be used because it provides an effect of preventing the coat layers from being colored.

Water is preferably used as principal solvent when the chlorine-containing polymer is supplied as latex dispersion. A surfactant and/or a thickener may preferably be added when a latex dispersion is used.

When a coat layer containing a chlorine-containing polymer is formed on a transparent base film by coating, it is preferable to add silica powder such Sylysia (tradename, available from Fuji Silysia Chemical), Mizukasil (tradename, available from Mizusawa Industrial Chemicals) or Nipseal (tradename, available from Tosoh Silica Corporation) to the chlorine-containing polymer by 0.2 parts to 1.0 part or add a wax emultion such as paraffin wax (available from Nippon Seiro), behenic acid (available from NOF Corporation) or stearic acid (available from NOF Corporation) to the chlorine-containing polymer by 0.2 parts to 5.0 parts. A modified wax as described in paragraphs [0012] to [0016] of JP-A No. 09-143419 may also preferably be used.

Since chlorine-containing polymers are decomposed by heat, light and ultraviolet rays to become colored, it is preferable to add stearate of lead, zinc or barium, a silver salt or magnesium oxide as stabilizer. An antioxidant as described in paragraphs [0013] to [0020] of JP-A No. 2004-359819 may alternatively be used.

An isocyanate adhesive agent such as Coronate L (tradename, available from Nippon Polyurethane Industry) or Takenate A-3 (tradename, available from Takeda Pharmaceutical Company Ltd.) may preferably be added to the chlorine-containing polymer by 0.1 parts to 1.0 part in order to improve the tight adhesion of the coat layer that contains the chlorine-containing polymer and the transparent base film and other layers.

-Coat Layer Formed by Silica Coat Film-

It is necessary to arrange a silica coat film at least at a side of the transparent base film that is made of cellulose acylate and make the denseness and the flexibility thereof compatible in order to achieve the target water vapor transmission rate and make it practically durable as protective film.

Therefore, the use of only a silica film that is a hydrolysate produced by hydrolyzing and condensing alkoxy silane, adding a catalyst and water thereto, is not suited for the purpose of the present invention because the flexibility thereof is insufficient. Thus, a coat film containing a compound of alkoxy silane, a compound having a functional group that reacts with a hydroxyl group or an alkoxyl group and/or a silane coupling agent is preferably used for the purpose of the present invention. A coat film containing a compound of alkoxy silane, a compound having a functional group that reacts with a hydroxyl group or an alkoxyl group and a silane coupling agent is particularly preferable for the purpose of the present invention.

-Compound Formed of Alkoxy Silane-

A compound formed of alkoxy silane to be used for the purpose of the present invention is typically expressed by the general formula (1) shown below:

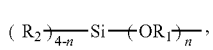   general formula (1)

where $R_1$ represents a hydrogen atom, an alkyl group or an acyl group, $R_2$ represents a hydrogen atom, an alkyl group or an aromatic group and n represents a number of 2 to 4.

When $R_1$ in the above general formula (1) is an alkyl group, it is selected from a methyl group, an ethyl group, a propyl group and a butyl group as well as other groups. When $R_1$ is an acyl group, it is selected from an acetyl group, a propionyl group as well as other groups. Of the above-listed groups, a methyl group, an ethyl group and a propyl group are preferable and an ethyl group is more preferable. The value of n is preferably 2 to 4, more preferably 3 and 4, and most preferably 4.

Therefore, tetraalkoxysilanes are preferable, of which tetramethoxysilane, tetraethoxysilane and tetrapropoxysilane are more preferable and tetraethoxysilane is most preferable. When n is 2 or 3, the alkyl group represented by $R_2$ may be an alkyl group having 1 to 18 carbon atoms, preferably an alkyl group having 1 to 5 carbon atoms. When an aromatic group is selected, a phenyl group is preferable among others.

-Compound Having Functional Group Reacting with Hydroxyl Group or Alkoxyl Group- A compound having a functional group that reacts with a hydroxyl group or an alkoxyl group is used for the purpose of the present invention. More specifically, a monomer, an oligomer or a polymer having a functional group that reacts with a hydroxyl group or an alkoxyl group is preferable, although any compound having a functional group that reacts with a hydroxyl group or an alkoxyl group can be used without any particular limitations.

Examples of such compounds include hydroxyl group-containing monomers, hydroxyl group-containing oligomers and hydroxyl group-containing polymers used in thermosetting resins, ionizing radiation curable resins or moisture curable resins selected from acryl resins, polyester resins, epoxy resins, urethane resins and melamine resins; among them hydroxyl group-containing polymers are preferable and vinyl alcohol-polymers such as homopolymers of polyvinyl alcohol (PVA) and ethylene-vinyl alcohol copolymers (EVOH) are more preferable, with homopolymers of polyvinyl alcohol (PVA) being most preferable.

It is also possible to use any vinyl alcohol polymer that is partly modified by a carbonyl group or the like or any copolymer containing diacetoneacrylamide units as part thereof. Various vinyl alcohol polymers may be used alone or in combination.

The ratio of saponification of the vinyl alcohol copolymer that is preferably used as a compound having a functional group that reacts with a hydroxyl group or an alkoxyl group can be selected from a range of 80 mol % or more, preferably 96 mol % or more, most preferably 98 mol % or more. The degree of polymerization of the vinyl alcohol polymer is preferably 200 to 5,000, more preferably 400 to 5,000, and most preferably 500 to 3,000 from the viewpoint of water vapor transmission rate and ease of coating.

-Silane Coupling Agent-

A silane coupling agent is employed for the purpose of the present invention. While the silan coupling agent is not subjected to any particular limitations so long as it is a compound having alkoxy silane at the opposite ends, it preferably has a vinyl group, an epoxy group, an acryl or methacryl group, an amine group, a mercapto group, a hydroxyl group, an isocyanate group, a carboxyl group and/or an acid anhydride group, and more preferably an epoxy group, an amine group and an acryl or methacryl group.

Preferable silane coupling agents having a vinyl group include vinyltrichlorosilane, vinyltrimethoxysilane, vinyltriethoxysilane, vinyl-tris(β-methoxyethoxy)silane.

Preferable silane coupling agents having an epoxy group include β-(3,4-epoxycyclohexyl)ethyltrimethoxysilane, β-(3,4-epoxycyclohexyl)ethyltriethoxysilane, γ-glycidoxypropyltrimethoxysilane, γ-glycidoxypropylmethyldiethoxysilane, and γ-glycidoxypropyltriethoxysilane.

Preferable silane coupling agents having an acryl or methacryl group include γ-methacryloxypropylmethyldimethoxysilane, γ-methacryloxypropyltrimethoxysilane, γ-methacryloxypropylmethyldiethoxysilane and γ-methacryloxypropyltriethoxysilane.

Preferable silane coupling agents having an amine group include N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane and N-phenyl-γ-aminopropyltrimethoxysilane.

Preferable silane coupling agents having a mercapto group include γ-mercaptopropyltrimethoxysilane and γ-mercaptopropyltriethoxysilane.

Preferable silane coupling agents having an isocyanate group include γ-isocyanatepropyltrimethoxysilane and γ-isocyanatepropyltriethoxysilane.

Since a silane coupling agent may be used with a compound having a functional group that reacts with a hydroxyl group or an alkoxyl group according to the present invention, it is preferable to use a silane coupling agent having an epoxy group for the purpose of cross-linking with a compound having a functional group that reacts with a hydroxyl group or an alkoxyl group.

Additionally, since a silane coupling agent is used with a compound having an alkoxy silane, it is preferable to use a silane coupling agent having an amine group from the viewpoint of raising the reaction rate of dehydration/polymerization/condensation of alkoxy silane.

For the purpose of the present invention, a layer having a hard coat effect is preferably arranged on the coat layer. Then, the use of a silane coupling agent having an acryl or methacryl group is particularly preferable to improve the interlayer tight adhesion relative to the layer having a hard coat effect.

In another preferable aspect of realizing the present invention, it is preferable to use a silane coupling agent having alkoxy silane at the opposite ends.

A silane coupling agent having alkoxy silane at the opposite ends is desirable because it can be cross-linked with a compound of alkoxy silane. Examples of such compounds include an organic chain-containing silane monomer having functional groups at both ends as described in JP-A No. 2000-326448.

A hydrolysate of a silane coupling agent or a partial condensation product of a silane coupling agent is preferably used for the purpose of the present invention. Thus, for the purpose of the present invention, a silane coupling agent may be a hydrolysate of a silane coupling agent or a partial condensation product of a hydrolysate of a silane coupling agent.

While a silane coupling agent having an epoxy group, an amine group or an acryl or methacryl group may be used alone, it is preferable to use two or more of such silane coupling agents in combination. A combined use of three such silane coupling agents is particularly preferable. It is highly preferable to use a tertiary amine that is soluble in an organic solvent as polymerization/condensation catalyst for raising the reaction rate in combination with two different silane coupling agents: one having an epoxy group and one having an acryl or methacryl group.

Now it is assumed that the content ratios of a compound formed of alkoxy silane, a compound having a functional group that reacts with a hydroxyl group or an alkoxy group, and a silane coupling agent are respectively defined as a mass %, b mass % and c mass % (where the content ratio of the compound of alkoxy silane is determined from the computed value after the polarization/condensation in which the condensation is realized ideally). When two of them including the compound formed of alkoxy silane and the compound having a functional group that reacts with a hydroxyl group or an alkoxy group are used, a/b is preferably 10/90 to 90/10, more preferably 20/80 to 80/20, and most preferably 40/60 to 80/20. When two of them including the compound of alkoxy silane and the silane coupling agent are used, a/b is preferably 40/60 to 95/5, and more preferably 50/50 to 90/10.

When all the three of them including the compound formed of alkoxy silane, the compound having a functional group that reacts with a hydroxyl group or an alkoxy group and the silane coupling agent are used, a/(b+c) is preferably 10/90 to 90/10, more preferably 20/80 to 80/20, most preferably 40/60 to 80/20. In such a case, b/c is preferably 10/90 to 90/10, more preferably 20/80 to 80/20, and most preferably 40/60 to 80/20.

-Other Components-

For the purpose of the present invention, a catalyst and water are used to promote the polarization/condensation reaction of the compound of alkoxy silane.

Curing catalysts that can be used for the purpose of the present invention include acids such as hydrochloric acid, nitric acid, acetic acid, oxalic acid, maleic acid and fumaric acid, tertiary amines such as N—N-dimethylbenzylamine, tripropylamine, tributylamine and tripentylamine, organic metals and metal alkoxydes.

The ratio of the added curing catalyst is preferably 1 mass % to 10 mass %, and more preferably 1 mass % to 5 mass %, relative to 100 parts by mass of the compound of alkoxy silane.

As for the addition of water, it is desirable to add water to a quantity or more the quantity that theoretically hydrolyzes the partial hdyrolysate by 100%. Water is preferably added by a quantity corresponding to 110% to 300%, and more preferably by a quantity corresponding to 120% to 200%.

For the purpose of the present invention, the coat layer may be made to contain an ultraviolet absorber.

When a silane coupling agent having an acryl or methacryl group is employed, it is preferable that it contains a photo initiator as described under the heading of hard coat hereinafter by 0.5 mass % to 5 mass % relative to the content of the silane coupling agent.

-Coating Solvent-

It is preferable to use a compound or a mixture of two or more compounds selected from water, methyl alcohol, ethyl alcohol, isopropyl alcohol, n-butanol, isobutanol and octanol as solvent for the coating composition for forming a silica coat film as the above-described coat layer. It is desirable to adjust the quantity of the solvent so as to make the solid concentration equal to 15 mass % to 60 mass %.

-Polysilazane-

Another preferable material of the silica coat film for the coat layer is a set coating composition containing a polysilazane. Polysilazanes that can preferably be used include those described in paragraphs 0097 through 0104 of JP-A No. 11-240103. While a polysilazane may be used alone, it may be used to replace the compound of alkoxy silane.

[Method of Laminating Coat Layer]

The combination of a transparent support and a coat layer and the method of laminating a coat layer are not limited to any particular limitations so long as they satisfy the requirement of the range of water vapor transmission rate defined according to the present invention. However, the requirement of the range of water vapor transmission rate defined according to the present invention can be satisfied when a transparent support made of polyester resin, polycarbonate resin, styrene resin, polyarylate resin, cycloolefin resin or the like that shows a relatively low water vapor transmission rate at 60° C. and 95% RH is used in combination with a coat layer typically made of vinyl alcohol resin that shows an excellent low water vapor transmission rate in a low humidity environment.

When, on the other hand, a transparent support typically made of cellulose acylate film that shows a relatively high water vapor transmission rate at 60° C. and 95% RH is used, it is preferable to provide at least a coat layer that reduces the water vapor transmission rate in a high humidity environment in addition to a vinyl alcohol resin layer.

The method and the order of laminating a plurality of different coat layers are not subjected to any particular limitations and appropriate ones can be selected. For example such layers may be arranged at the opposite sides of the transparent support or a plurality of layers may be laid one on the other by way of different adhesive layers. An adhesion facilitating layer is preferably arranged particularly, when a coat layer of vinyl alcohol resin and a coat layer of a chlorine-containing polymer are to be laid one on the other. A layer of a mixture of saran latex and vinyl alcohol resin is preferably used as adhesion facilitating layer for a coat layer of vinyl alcohol resin and a coat layer of a chlorine-containing polymer.

[Haze of Coat Layer]

The haze of the coat layer is preferably 5% or less, more preferably 3% or less, and most preferably 1% or less.

The ratio of the surface haze to the internal haze is not subjected to any particular limitations and an appropriate value may be selected according to the application. However, for instance, the surface haze is preferably 1% or less.

[Surface Roughness of Coat Layer]

The arithmetic mean roughness Ra of the surface of the coat layer is preferably 0.2 or less and the square root coaseness Rq thereof is preferably 0.2 or less, while the ten points average roughness is preferably 1.5 or less.

If necessary, one or more additives as a thermal stabilizer, a light stabilizer and/or a lubricant can be used for the coat layer of a protective film for a polarizing plate according to the present invention.

<<Hard Coat Layer>>

The first protective film is preferably provided with a layer operating as a hard coat (to be also referred to as hard coat layer hereinafter) on one of the opposite surfaces of the transparent base film in order to provide the protective film with physical strength.

The surface for applying a layer operating as a hard coat is not subjected to any particular limitations. However, such a layer is preferably applied directly to the base layer (applied through the base layer on the opposite side of the coat layer) from the viewpoint of coating aptitude.

More preferably, a low refractive index layer is arranged on the hard coat layer. Most preferably, a medium refractive index layer and a high refractive index layer are arranged between the hard coat layer and the low refractive index layer to form an anti-reflection film. The hard coat layer may be formed by laminating two or more component layers.

For the purpose of the present invention, the refractive index of the hard coat layer is preferably 1.48 to 2.00, more preferably 1.49 to 1.90, and most preferably 1.50 to 1.80 from the viewpoint of optical design for producing an anti-reflection film.

Since at least a low refractive index layer is arranged on the hard coat layer for the purpose of the present invention, the anti-reflection effect is degraded when the refractive index is smaller than the above range, whereas the tint of reflected light tends to become to strong when the refractive index is greater than the above range.

The thickness of the hard coat layer is preferably about 0.5 µm to 50 µm, more preferably 1 µm to 20 µm, much more preferably 2 µm to 15 µm, and most preferably 3 µm to 10 µm, from the viewpoint of providing the film with a sufficient degree of durability and impact resistance.

The strength of the hard coat layer is preferably H or more, more preferably 2H or more, and most preferably 3H or more, as a result of a pencil hardness test.

Particularly, it is preferable that the abrasion rate of a test piece in the taber-abrasion test according to JIS K5400 be as small as possible after the test if compared with before the test.

The hard coat layer is preferably formed by way of a cross-linking reaction or a polymerizing reaction of an ionizing radiation curable compound. For example, it can be formed by applying a coating composition containing an ionizing radiation curable multi-functional monomer or multi-functional oligomer onto a transparent base film and causing the multi-functional monomer or the multi-functional oligomer to realize a cross-linking reaction or a polymerizing reaction.

Ionizing radiation curable multi-functional monomers and multi-functional oligomers are preferably photo-, electron-beam- and radiation-polymerizing functional groups, and more preferably Photopolymerizable functional groups.

Photopolymerizable functional groups include unsaturated polymerizing functional groups such as a (meth)acryloyl group, a vinyl group, a styryl group and an allyl group, of which a (meth)acryloyl group is preferable for the purpose of the present invention.

A cross-linking functional group may be introduced into the binder in place of or in addition to the monomer having an unsaturated polymerizing group.

Examples of cross-linking functional groups that can be used for the purpose of the present invention include an isocyanate group, an epoxy group, an aziridine group, an oxazoline group, an aldehyde group, a carbonyl group, a hydrazine group, a carboxyl group, a methylol group and an active methylene group.

Metal alkoxides such as vinyl sulfonic acid, acids anhydrides, cyanoacrylate derivatives, melamine, etherified methylol, esters, urethane and tetramethoxy silane can be utilized as monomers having a cross-linking structure.

Functional groups that show a cross-linking property as a result of a decomposition reaction such as block isocyanate groups can also be used for the purpose of the present invention.

In short, for the purpose of the present invention, a cross-linking functional group may become reactive when decomposed instead of being instantly reactive.

Any binder having a cross-linking functional group can form a cross-linking structure when heated after application.

The hard coat layer may contain matte particles such as particles of an inorganic compound or resin particles showing an average particle size of 1.0 µm to 10.0 µm, preferably 1.5 µm to 7.0 µm for the purpose of providing the layer with an internal scattering property.

A high refractive index monomer or inorganic particles or both can be added to the binder of the hard coat layer for the purpose of controlling the refractive index of the hard coat layer. Inorganic particles provide an effect of suppressing the curing contraction due to the cross-linking reaction in addition to the effect of controlling the refractive index.

For the purpose of the present invention, the polymer generated as a result of polymerization of the multi-functional monomer and/or the high refractive index monomer, including the inorganic particles dispersed therein, after the formation of the hard coat layer is referred to as binder.

The haze of the hard coat layer varies depending on the functions with which the anti-reflection film is provided.

The lower the haze value, the better the haze value when the hard coat layer is not provided with a light scattering function in the inside and on the surface to maintain the sharpness of image and suppress the surface reflectance. More specifically, the haze value is preferably 10% or less, more preferably 5% or less, and most preferably 2% or less.

On the other hand, the surface haze is preferably 5% to 15%, and more preferably 5% to 10%, when the hard coat layer is provided with an anti-glare function of surface scattering of the hard coat layer in addition to the function of suppressing the surface reflectance.

The internal haze value (the total haze value less the surface haze value) is preferably 10% to 90%, more preferably 15% to 70%, and most preferably 20% to 50% when the pattern of the liquid crystal panel, unevenness of color and luminance and glare are minimized by internal scattering of the hard coat layer and/or when the hard coat layer is provided with a function of expanding the view angle by scattering.

As for the asperity profile of the surface of the hard coat layer, the center line mean roughness (Ra) is preferably 0.10 µm or less, more preferably 0.09 µm or less, and most preferably 0.08 µm or less among the characteristics showing the surface roughness in order to obtain a clear surface for the purpose of maintaining the sharpness of image.

As for the film, the surface asperities of the hard coat layer are dominant for the surface asperities of the film. Therefore, the center line mean roughness of the anti-reflection film can be held to the above-defined range by adjusting the center line mean roughness of the hard coat layer.

For the purpose of maintaining the sharpness of image, it is desirable to adjust the sharpness of transmitted image in addition to adjusting the undulated profile of the surface. The transmitted image sharpness of a clear anti-reflection film is preferably 60% or more.

The transmitted image sharpness degree is generally an index that indicates the extent of out of focus of the projected image after being transmitted through the film. The image transmitted through the film is sharp and clear when the sharpness degree is high. The transmitted image sharpness degree is preferably 70% or more, and more preferably 80% or more.

When a protective film for a polarizing plate according to the present invention is arranged on the surface of a liquid crystal display device, reflected images can be projected onto the surface of the liquid crystal display device from the surrounding to lower the visibility of the displayed image. The surface of the hard coat layer is preferably provided with asperities to produce an effect of scattering light at the surface (anti-glare effect).

The hard coat layer is preferably made to operate as light scattering layer by making the surface and/or the inside thereof have a light scattering effect (the hard coat layer may be referred to as anti-glare layer when the surface thereof is made to have a light scattering effect).

[Solvent for Hard Coat Layer]

The hard coat layer is in many cases applied onto the coat layer by wet coating so that the solvent to be used for the coating composition is particularly important. The requirements that the solvent need to satisfy include that it can sufficiently dissolve various solutes including the light transmitting resin, that it does not dissolve light transmitting fine particles and that it hardly gives rise to uneven coating and uneven drying in the coating and drying processes.

Other preferable characteristics include that the solubility of the underlayer is not too high (in order to prevent degradation of surface smoothness and occurrence of problems such as whitening) and that conversely the coat layer is dissolved and swollen to a minimal extent (in order to secure tight adhesion).

While a single solvent may be used, two or more solvents may preferably be combined so as to regulate the solubility and the degree of swelling of the coat layer, the solubility and the drying characteristic of the composing materials, the aggregation of particles and so on. When the principal solvent can poorly swell the coat layer, the tight adhesion of the hard coat layer and the coat layer can be improved without sacrificing the other performances and the surface profile by adding a highly swelling solvent to the principal solvent to a small extent.

Specific examples of solvents that can be used for the purpose of the present invention include various ketones (methyl ethyl ketone, acetone, methyl isobutyl ketone, cyclohexanone, etc.) and various cellosolves (ethyl cellosolve, butyl cellosolve, propyleneglycolmonomethylether, etc.).

Other solvents that can preferably be used include various alcohols (propylene glycol, ethylene glycol, ethanol, methanol, isopropyl alcohol, 1-butanol, 2-butanol, etc.) and toluene.

For the purpose of the present invention, it is preferable to use a solvent that can dissolve and swell the coat layer when the hard coat layer is directly applied onto the coat layer. Particularly, when the coat layer is made of vinylidene chloride, it is preferable to add tetrahydrofuran. It is also preferable to select a copolymer with vinylidene chloride for the coat layer to make it soluble to toluene and ketone solvents. In other words, it is preferable not to use tetrahydrofuran but to use toluene or a ketone solvent. It is also preferable to select and use a solvent that can dissolve the both solutes including the coat layer and the hard coat layer for the coating solution for the coat layer and the coating solution for the hard coat layer in order to remarkably improve the adhesion of the coat layer and the hard coat layer.

[Low Refractive Index Layer]

When a protective film for a polarizing plate according to the present invention is used on the surface of an image display device, it is preferable to form a low refractive index layer on the surface of the hard coat layer as a method for preventing reflections. Now, low refractive index layers that can preferably be used for the purpose of the present invention will be described below.

A low refractive index layer to be used for the purpose of the present invention is preferably formed by applying a thermosetting and/or photocurable composition containing principally a fluorine compound that contains fluorine atoms within a range of 35 mass % to 80 mass % and a cross-linking or polymerizing function group.

The refractive index of the low refractive index layer of the anti-glare anti-reflection film is preferably 1.45 or less, preferably 1.30 or more and 1.40 or less, most preferably 1.33 or more and 1.37 or less.

Additionally, it is preferable that the low refractive index layer satisfies the requirement defined by the formula (1) shown below from the viewpoint of reducing the reflectance:

$$(m/4) \times 0.7 < n1 \times d1 < (m/4) \times 1.3 \qquad \text{formula (1)},$$

where m is a positive odd number, n1 is the refractive index of the low refractive index layer and d1 is the film thickness (nm) of the low refractive index layer. $\lambda$ is the wavelength that is a value within the range of 500 nm to 550 nm.

Satisfying the requirement of the formula (1) means that there exists m (positive odd number, normally 1) that satisfies the requirement of the formula (1) within the above range of wavelength.

The low refractive index layer is a cured film that is formed by coating, drying and curing a curable composition containing a fluorine-containing compound as principal ingredient.

The curable composition to be used for forming a low refractive index layer preferably contains at least two, more preferably all the three of (A) a fluorine-containing compound, (B) fine inorganic particles and (C) an organosilane compound.

Preferable fluorine-containing compounds include fluorine-containing polymers showing a low refractive index and fluorine-containing sol and gel materials.

Fluorine-containing polymers and fluorine-containing sol and gel materials are preferably those that are cross-linked by heat or ionizing radiation and the coefficient of kinetic friction and the contact angle relative to water of the surface of the formed low refractive index layer are 0.03 to 0.30 and 85° to 120°, respectively.

-Fluorine-containing Polymers for Low Refractive Index Layer-

Now, materials that can be used for forming the low refractive index layer will be described below.

The fluorine-containing polymer to be used for the purpose of the present invention is preferably such a polymer that, when it is turned to a cured coat, the coefficient of kinetic friction, the contact angle relative to the water and the pure water sliding down angle of the surface of the coat are 0.03 to 0.20, 90° to 120° and 70° or less, respectively, and it is cross-linked by heat or ionizing radiation particularly from the viewpoint of applying and curing while a rolled film is being carried by a web to raise the productivity.

When an anti-glare film or an anti-glare/anti-reflection film is arranged on an image display device, it can be easily peeled off after applying a seal or a memo sheet when the peeling force is low relative to commercially available adhesive tapes. Therefore, the peeling force of such a film is preferably 500 gf (4.9N) or less, more preferably 300 gf (2.9N) or less, most preferably 100 gf (0.98N) or less. Additionally, since such a film is liable to be scarred when the surface hardness is high as observed by a micro hardness meter, the surface hardness is preferably 0.3 GPa or more, and more preferably 0.5 GPa or more.

The fluorine-containing polymer to be used for the low refractive index layer preferably contains fluorine atoms within a range of 35 mass % to 80 mass % and also a cross-linking or polymerizing functional group. Examples of such polymers include hydrolysates and dehydration condensation products of perfluoroalkyl-group-containing silane compounds [e.g., (heptadecafluoro-1,1,2,2-tetrahydrodecyl)triethoxysilane] and fluorine-containing copolymers having fluorine-containing monomer units and cross-linking reaction units as component units. Such fluorine-containing copolymers preferably have a main chain formed only by carbon atoms. In other words, they preferably have neither an oxygen atom nor a nitrogen atom in the main chain skeleton.

Specific examples of fluorine-containing monomer units include fluoroolefins (e.g., fluoroethylene, vinylidene fluoride, tetrafluoroethylene, perfluorooctylethylene, hexafluoropropylene, perfluoro-2,2-dimethyl-1,3-dioxol, etc.), partially or totally fluorinated alkylester derivatives of (meth)acrylic acid (e.g., biscoat 6F (tradename, available from Osaka Organic Chemical Industry) and M-2020 (tradename, available from Daikin), etc.) and totally or partially fluorinated vinylethers, of which perfluoroolefins are preferable and hexafluoropropylene is more preferable from the viewpoint of refractive index, solubility, transparency and availability.

Specific examples of cross-linking reaction units include component units that can be obtained by polymerization of monomers having a self-cross-linking functional group in the molecule in advance such as glycidyl(meth)acrylate and glycidylvinylether and component units formed by introducing a cross-linking reaction type group such as a (meth)acryloyl group into a component unit obtained by polymerizing monomers having a carboxyl group, a hydroxyl group, an amino group or a sulfo group [e.g., (meth)acrylic acid, methylol (meth)acrylate, hydroxyalkyl(meth)acrylate, arylacrylate, hydroxyethylvinylether, hydroxybutylvinylether, maleic acid, crotonic acid, etc.] by means of a polymer reaction (typically be means of a technique of causing acrylyl chloride to act on a hydroxy group).

From the viewpoint of the solubility to the solvent and the transparency of the coat, monomers not containing a fluorine atom may be copolymerized and other polymerization units may be introduced in addition to the fluorine-containing monomer and the cross-linking reaction units.

Monomer units that can be used for the purpose of the present invention are not subjected to any particular limitations. Examples of monomer units include olefins [ethylene, propylene, isoprene, vinyl chloride, vinylidene chloride, etc.], acrylates [methyl acrylate, ethyl acrylate, 2-ethylhexyl acrylate, etc.], methacrylates [methyl methacrylate, ethyl methacrylate, butyl methacrylate, ethyleneglycol dimethacrylate, etc.], styrene derivatives [styrene, divinylbenzene, vinyltoluene, α-methylstyrene, etc.], vinyl ethers [methyl vinyl ether, ethyl vinyl ether, cyclohexyl vinyl ether, etc.], vinyl esters [vinyl acetate, vinyl propionate, vinyl cinnamate, etc.], acryl amides [N-tert-butylacrylamide, N-hexylacrylamide, etc.], methacryl amides and acrylonitrile derivatives.

Fluorine-containing polymers may be used with a curing agent as disclosed in JP-A Nos. 10-25388 and 10-147739.

Particularly useful fluorine-containing polymers for the purpose of the present invention are random copolymers of perfluoroolefins and vinyl ethers or vinyl esters.

Particularly, it is preferable for such polymers to have a group capable of realizing a cross-linking reaction alone [a radical reacting group such as a (meth)acryloyl group or a ring-opening polymerizing group such as an epoxy group or an oxetanyl group].

The polymerization units that contain a cross-linking reaction group preferably take 5 mol % to 70 mol %, and more preferably 30 mol % to 60 mol % of the total polymerization units.

The fluorine-containing polymer to be used for the low refractive index layer is preferably a copolymer expressed by the general formula (2) shown below.

general formula (2)

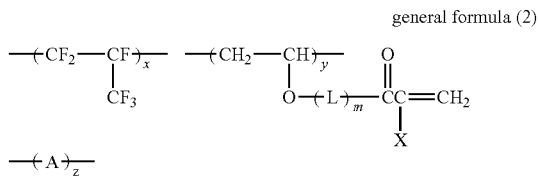

In the general formula (2), L represents a linking group having preferably 1 to 10 carbon atoms, more preferably 1 to 6 carbon atoms, and most preferably 2 to 4 carbon atoms. It may be a straight chain or have a branched structure and/or a ring structure. It may have a hetero atom selected from O, N and S.

Examples of L structure include *—(CH$_2$)$_2$—O—**, *—(CH$_2$)$_2$—NH—**, *—(CH$_2$)$_4$—O—**, *—(CH$_2$)$_6$—O—**, *—(CH$_2$)$_2$—(CH$_2$)$_2$—**, *—CONH—(CH)$_3$—O—**, *—CH$_2$CH(OH)CH$_2$—O—** and *—CH$_2$CH$_2$OCONH(CH?)$_3$—O—** (where * represents the linking site of the polymer main chain side and ** represents the linking site of the (meth)acryloyl group side, while m represents 0 or 1.

In the general formula (2), X represents a hydrogen atom or a methyl group, although it preferably is a hydrogen atom from the viewpoint of curing reactivity.

In the general formula (2), A represents a repetitive unit derived from an arbitrarily selected vinyl monomer that is not subjected to any particular limitations so long as it is a component of a monomer that can be copolymerized with hexafluoropropylene. It may be selected from the viewpoint of tight adhesion to the base, Tg (contributing to the coat hardness) of the polymer, solubility to the solvent, transparency, slipperiness, anti-dust, anti-stain and so on. It may be formed by a single vinyl monomer or a plurality of vinyl monomers according to the purpose.

Examples of vinyl monomers include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether, vinyl esters such as vinyl acetate, vinyl propionate and vinyl butylate, (meth)acrylates such as methyl(meth) acrylate, ethyl(meth)acrylate, hydroxyl (meth)acrylate, glycidyl methacrylate, aryl(meth)acrylate and (meth)acryloyloxypropyltrimethoxysilane, styrene, styrene derivatives such as p-hydroxymethylstyrene, unsaturated carboxylic acids such as crotonic acid, maleic acid and itaconic acid and their derivatives, of which vinyl ether derivatives and vinyl ester derivatives are preferable and vinyl ether derivatives are more preferable.

In the general formula (2), x, y and z represent the mol % of the respective components that are respectively preferably $30 \leq x \leq 60$, $5 \leq y \leq 70$ and $0 \leq z \leq 65$, more preferably $35 \leq x \leq 55$, $30 \leq y \leq 60$ and $0 \leq z \leq 20$ and most preferably $40 \leq x \leq 55$, $40 \leq y \leq 55$ and $0 \leq z \leq 10$. Note, however, $x+y+z=100$.

The copolymer to be used for the purpose of the present invention is preferably expressed by the general formula (3) shown below.

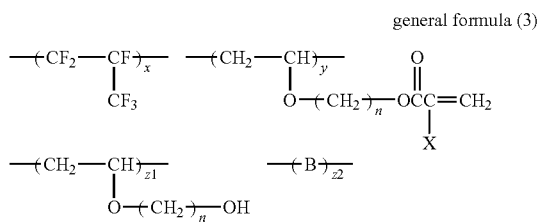

general formula (3)

In the general formula (3), X has the same meaning as X in the general formula (2) and the preferable range of the general formula (3) is the same as the general formula (2).

In the general formula (3), n represents an integer $2 \leq n \leq 10$, that is preferably $2 \leq n \leq 6$, and more preferably $2 \leq n \leq 4$.

In the general formula (3), B represents a repetitive unit derived from an arbitrarily selected vinyl monomer. It may be formed by a single vinyl monomer or a plurality of vinyl monomers. Examples cited above for A in the general formula (2) are also applicable to B in the general formula (3).

In the general formula (3), x, y, z1 and z2 represent the mol % of the respective components. In the general formula (3), x and y are respectively preferably $30 \leq x \leq 60$ and $5 \leq y \leq 70$, more preferably $35 \leq x \leq 55$ and $30 \leq y \leq 60$, and most preferably $40 \leq x \leq 55$, $40 \leq y \leq 55$. In the general formula (3), z1 and z2 are respectively preferably $0 \leq z1 \leq 65$ and $0 \leq z2 \leq 65$, more preferably $0 \leq z1 \leq 30$ and $0 \leq z2 \leq 10$, and most preferably $0 \leq z1 \leq 10$, $0 \leq z2 \leq 5$. Note, however, $x+y+z1+z2=100$.

Copolymers expressed by the general formula (2) or the general formula (3) can be synthesized by introducing a (meth)acryloyl group into a copolymer typically containing a hexafluoropropylene component and a hydroxyalkylvinylether component by means of one of the above described techniques. The reprecipitation solvent to be used is preferably selected from isopropanol, hexane, methanol, etc.

Specific preferable examples that are expressed by the general formula (2) or the general formula (3) include those described in [0035] to [0047] in JP-A No. 2004-45462 and can be synthesized by the technique described in the above Patent Document.

-Fine Inorganic Particles for Low Refractive Index Layer-

The adding ratio of fine inorganic particles is preferably 1 mg/m² to 100 mg/m², more preferably 5 mg/m² to 80 mg/m², and most preferably 10 mg/m² to 60 mg/m². The effect of improving the abrasion resistance is reduced when the ratio falls below the above range, whereas microscopic asperities are formed on the surface of the low refractive index layer to degrade the appearance in terms of steadiness of black and the integral reflectance when the ratio exceeds the above range. Therefore, it is desirable to observe the above-defined range.

Since the fine inorganic particles are to be contained in the low refractive index layer, they preferably show a low refractive index. Examples of such fine inorganic particles include those of magnesium fluoride and those of silicon oxide (silica), of which fine particles of silica are preferable from the viewpoint of refractive index, dispersion stability and cost.

The average particle size of the fine inorganic particles is 10% or more and 100% or less, preferably 30% or more and 100% or less, more preferably 35% or more and 80% or less, most preferably 40% or more and 60% or less of the thickness of the low refractive index layer. In other words, when the thickness of the low refractive index layer is 100 nm, the particle size of the fine silica particles is preferably 30 nm or more and 100 nm or less, more preferably 35 nm or more and 80 nm or less, most preferably 40 nm or more and 60 nm or less.

The effect of abrasion resistance is reduced when the particle size of the fine inorganic particles is too small, whereas microscopic asperities are formed on the surface of the low refractive index layer to degrade the appearance in terms of steadiness of black and the integral reflectance when the particle size of the fine inorganic particles is too large. Therefore, it is desirable to observe the above-defined range. The fine inorganic particles may be crystalline or amorphous and may be independently dispersed particles or aggregated particles so long as the requirement of particle size is satisfied. While the fine inorganic particles preferably have a spherical profile, they may alternatively have an indeterminate profile.

The average particle size of the fine inorganic particles is measured by means of Coulter Counter.

The fine inorganic particles preferably have a hollow structure in order to further reduce the risk of a rise of the refractive index. The refractive index of the fine inorganic particles is preferably 1.17 to 1.40, more preferably 1.17 to 1.35, and most preferably 1.17 to 1.30. The expression of refractive index as used herein refers to the refractive index of the whole particles and not the refractive index of only the inorganic shells when the fine inorganic particles have a hollow structure. If the half diameter of the cavity in the particle is "a" and the half diameter of the shell of the particle is "b", the void ratio "x" of the particle is expressed by the formula (2) shown below.

$$x=(4\pi a^3/3)/((4\pi b^3/3) \times 100 \qquad \text{formula (2)}$$

The void ratio x is preferably 10% to 60%, more preferably 20% to 60%, and most preferably 30% to 60%.

If it is tried to reduce the refractive index of hollow fine inorganic particles and increase the void ratio further, the thickness of the shells is reduced to by turn reduce the strength of the particles. Particles showing a refractive index lower than 1.17 cannot exist from the viewpoint of abrasion resistance.

The refractive index of fine inorganic particles can be measured by means of an Abbe refractometer (available from Atago).

At least one type of fine inorganic particles having an average particle size less than 25% of the thickness of the low refractive index layer (to be referred to as "small sized fine inorganic particles" hereinafter) may be used with fine inorganic particles whose particle size is within the above-defined range (to be referred to as "large sized fine inorganic particles" hereinafter) in combination.

Since small sized fine inorganic particles can exist in the gaps of large sized fine inorganic particles, they can operate as retention agents for retaining large sized fine inorganic particles.

When the thickness of the low refractive index layer is 100 nm, the average particle size of the small sized fine inorganic particles is preferably 1 nm or more and 20 nm or less, more preferably 5 nm or more and 15 nm or less, and most preferably 10 nm or more and 15 nm or less. The use of such fine inorganic particles is preferable from the viewpoint of material cost and the effect of the retention agent.

As pointed out above, fine inorganic particles whose average particle size is 30% to 100% of the thickness of the low refractive index layer and who have a hollow structure and show a refractive index of 1.17 to 1.40 are particularly preferably be used for the purpose of the present invention.

The fine inorganic particles may be subjected to a physical surface treatment such as a plasma discharge process or a corona discharge process or a chemical surface treatment using a surfactant or a coupling agent in order to establish dispersion stability in the dispersion liquid or the coating solution and/or enhance the affinity for and the bonding effect relative to the binder component. The use of a coupling agent is particularly preferable.

An alkoxy metal compound is preferably used as coupling agent (e.g., titanium coupling agent, silane coupling agent). A treatment using a silane coupling agent is particularly effective.

While the coupling agent is used in advance in a surface treatment as surface treatment agent for the fine inorganic particles of the low refractive index layer before preparing the coating solution, although it may preferably be further contained in the layer as an additive when preparing the coating solution.

The fine inorganic particles are preferably dispersed in an medium before the surface treatment from the viewpoint of lessening the load of the surface treatment.

-Organosilane Compound for Low Refractive Index Layer-

Now, (C) the organosilane compound will be described below. The curable composition preferably contains at least an organosilane compound, a hydrolysate of an organosilane compound, a partial condensation product of a hydrolysate of an organosilane compound (the obtained reaction solution is also referred as "sol component" hereinafter) from the viewpoint of abrasion resistance, compatibility of anti-reflection ability and abrasion resistance in particular.

The above component operates as binder for the low refractive index layer when the curable composition is applied and condensed by a drying and heating process to form a cured product. Additionally, since a protective film for a polarizing plate according to the present invention preferably contains a fluorine-containing polymer as fluorine compound, a binder is having a three-dimensional structure is formed by irradiation of active rays of light.

The organosilane compound is preferably expressed by the general formula (4) shown below.

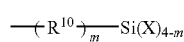

general formula (4)

In the general formula (4), $R^{10}$ represents a substituted or non-substituted alkyl group or a substituted or non-substituted aryl group. Examples of alkyl groups that can be used for the purpose of the present invention include a methyl group, an ethyl group, a propyl group, an isopropyl group, a hexyl group, a decyl group and a hexadecyl group.

The number of carbon atoms of the alkyl group is preferably 1 to 30, more preferably 1 to 16, and most preferably 1 to 6. Examples of aryl groups that can be used for the purpose of the present invention include a phenyl group and a naphthyl group, of which a phenyl group is preferable.

In the general formula (4), X represents a hydroxyl group or a hydrolysable group. Preferable examples of such groups include alkoxy groups (preferably alkoxy groups having 1 to 5 carbon atoms, e.g., a methoxy group, an ethoxy group, etc.), halogen atoms (e.g., Cl, Br, I, etc.) and $R^2COO$ (where $R^2$ is preferably a hydrogen atom or an alkyl group having 1 to 5 carbon atoms such as $CH_3COO$, $C_2H_5COO$, etc.), of which an alkoxy group is preferable and a methoxy group or an ethoxy group is more preferable.

In the general formula (4), m represents an integer of 1 to 3, of which 1 or 2 is preferable and 1 is more preferable.

When a plurality of $R^{10}$s or Xs exist, the $R^{10}$s or Xs may be the same or different from each other.

While the substituent contained in $R^{10}$ is not subjected to any particular limitations, examples of such substituents include halogen atoms (fluorine, chlorine, bromine, etc.), hydroxyl groups, mercapto groups, carboxyl groups, epoxy groups, alkyl groups (a methyl group, an ethyl group, an i-propyl group, a propyl group, a t-butyl group, etc.), aryl groups (a phenyl group, a naphtyl group, etc.), aromatic hetro ring groups (a furyl group, a pyrazolyl group, a pyridyl group, etc.), alkoxy groups (a methoxy group, an ethoxy group, an i-propoxy group, a hexyloxy group, etc.), aryloxy groups (a phenoxy group, etc.), alkylthio groups (a methylthio group, an ethylthio group, etc.), arylthio groups (a phenylthio group), alkenyl groups (a vinyl group, a 1-propenyl group, etc.), acyloxy groups (an acetoxy group, an acryloyloxy group, a methacryloyloxy group, etc.), alkoxycarbonyl groups (a methoxycarbonyl group, an ethoxycarbonyl group, etc.), aryloxycarbonyl groups (a phenoxycarbonyl group, etc.), carbamoyl groups (a carbamoyl group, an N-thiocarbamoyl group, N,N-dimethylcarbamoyl group, N-methyl-N-octylcarbamoyl group, etc.) and acylamino groups (an acetylamino group, a benzoylamino group, an acrylamino group, a methacrylamino group, etc.). The substituent may be substituted further.

When there is a plurality of $R^{10}$s. At least one of them is a substituted alkyl group or a substituted aryl group.

Of the organosilane compounds expressed by the general formula (4), an organosilane compound having a vinyl-polymerizing substituent expressed by the general formula (5) shown below is preferable.

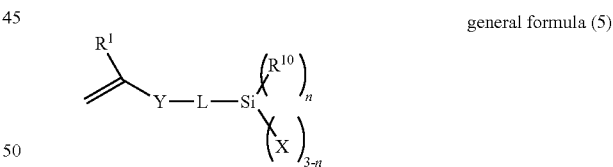

general formula (5)

In the general formula (5), $R^1$ represents a hydrogen atom, a methyl group, a methoxy group, an alkoxycarbonyl group, a cyano group, a fluorine atom or a chlorine atom. Examples of alkoxycarbonyl groups that can be used for the general formula (5) include a methoxycarbonyl group and an ethoxycarbonyl group. Of the above listed, a hydrogen atom, a methyl group, a methoxy group, a methoxycarbonyl group, a cyano group, a fluorine atom or a chlorine atom is preferable, of which a hydrogen atom, a methyl group, a methoxycarbonyl group, a fluorine atom or a chlorine atom is more preferable and a hydrogen atom or a methyl group is most preferable.

In the general formula (5), Y represents a single bond, *—COO—**, *—CONH—** or *—O—**, of which a single bond, *—COO—** or *—CONH—** is preferable, a single bond or *—COO—** is more preferable and *—COO—** is most preferable. In the above expressions, * represents the site of being bonded to =C(R¹)— and ** represents the site of being bonded to L.

In the general formula (5), L represents a divalent link chain. Specific examples of such chains include a substituted or non-substituted alkylene group, a substituted or non-substituted arylene group, a substituted or non-substituted alkylene group having a linking group in the inside (e.g., an ether, an ester, an amide or the like) and a substituted or non-substituted arylene group having a linking group in the inside. Of these, a substituted or non-substituted alkylene group, a substituted or non-substituted arylene group or an alkylene group having a linking group in the inside is preferable, a non-substituted alkylene group, a non-substituted arylene group or an alkylene group having an ether or ester linking group in the inside is more preferable and a non-substituted alkylene group or an alkylene group having an ether or ester linking group in the inside is most preferable. Examples of such substituents include a halogen atom, a hydroxyl group, a mercapto group, a carboxyl group, an epoxy group, an alkyl group and an aryl group. The substituent may be substituted further.

In the general formula (5), n represents 0 or 1. When a plurality of Xs exist, the Xs may be the same or different from each other. Preferably, n is 0.

In the general formula (5), $R^{10}$ has the same meaning as $R^{10}$ in the general formula (4). $R^{10}$ is preferably a substituted or a non-substituted alkyl group or a non-substituted aryl group, and more preferably a non-substituted alkyl group or a non-substituted aryl group.

In the general formula (5), X has the same meaning as X in the general formula (4). It is preferably a halogen atom, a hydroxyl group or a non-substituted alkoxy group, more preferably a chlorine atom, a hydroxyl group or a non-substituted alkoxy group having 1 to 6 carbon atoms, particularly more preferably a hydroxyl group or an alkoxy group having 1 to 3 carbon atoms and most preferably a methoxy group.

Two or more compounds expressed by the general formula (4) and the general formula (5) may be used in combination. The following is a non-exclusive list of specific examples of compounds expressed by the general formula (4) and the general formula (5).

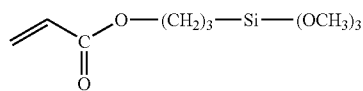

M-1

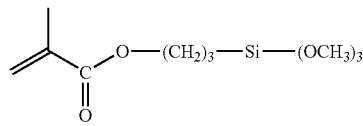

M-2

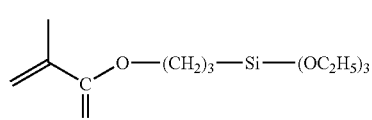

M-3

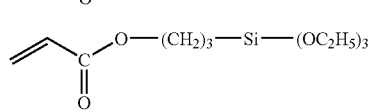

M-4

-continued

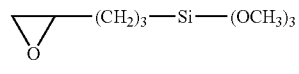

M-5

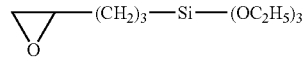

M-6

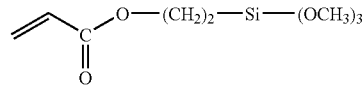

M-7

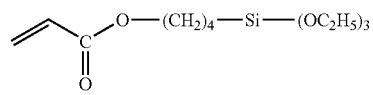

M-8

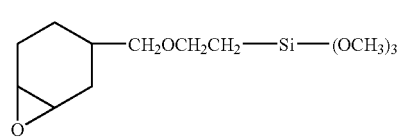

M-9

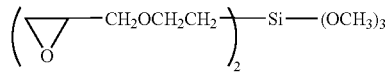

M-10

Of (M-1) to (M-10) listed above, (M-1), (M-2) and (M-5) are particularly preferable.

A hydrolysates and/or a partial condensation product of an organosilane compound are generally manufactured by treating the organosilane compound in the presence of a catalyst.

Catalysts that can be used for the purpose of treating an organosilane compound include inorganic acids such as hydrochloric acid, sulfuric acid and nitric acid, organic acids such as oxalic acid, acetic acid, formic acid, methanesulfonic acid and toluenesulfonic acid, inorganic salts such as sodium hydroxide, potassium hydroxide and ammonia, organic salts such as triethylamine and pyridine, metal alkoxydes such as triisopropoxyaliminum and tetrabutoxyzirconium and metal chelate compounds with central metal such as Zr, Ti or Al.

For the purpose of the present invention, it is preferable to use a metal chelate compound or an acidic catalyst selected from inorganic and organic acids. Hydrochloric acid and sulfuric acid are preferable among inorganic acids, while organic acids showing an acid dissociation constant (pKa value (25° C.)) of 4.5 or less in water are preferable. Of these, hydrochloric acid, sulfuric acid and organic acids showing an acid dissociation constant of 3.0 or less in water are more preferable and hydrochloric acid, sulfuric acid and organic acid showing an acid dissociation constant of 2.5 or less in water are more preferable and organic acid showing an acid dissociation constant of 2.5 or less in water is most preferable. Specifically, methanesulfonic acid, oxalic acid, phthalic acid and malonic acid are preferable and oxalic acid is most preferable.

Any metal chelate compound can be used without particular limitations so long as it has an alcohol expressed by $R^3OH$ (where $R^3$ represents an alkyl group having 1 to 10 carbon atoms) and a compound expressed by $R^4COCH_2COR^5$ (where $R^4$ represents an alkyl group having 1 to 10 carbon atoms and $R^5$ represents an alkyl group having 1 to 10 carbon atoms or an alkoxy group having 1 to 10 carbon atoms) as ligands and a metal selected from Zr, Ti and Al as central metal. Two or more metal chelate compounds may be used in combination so long as they are within the scope of the above definition.

The metal chelate compound that is used for the purpose of the present invention is preferably selected from a group of compounds, each of which is expressed by one of general formulas $Zr(OR^3)p1(R^4COCHCOR^5)p2$, $Ti(OR^3)q1(R^4COCHCOR^5)q2$ and $Al(OR^3)r1(R^4COCHCOR^5)r2$. Such a metal chelate compound has an effect of accelerating the condensation reaction of the hdyrolysate and/or the partial condensation product of the organosilane compound.

$R^3$ and $R^4$ in the metal chelate compound may be the same or different from each other. They are selected from alkyl groups having 1 caron atom to 10 carbon atoms specifically including an ethyl group, an n-propyl group, an i-propyl group, an n-butyl group, a sec-butyl group, a t-butyl group, an n-pentyl group and phenyl group. $R^5$ in the metal chelate compound is selected from alkyl groups having 1 to 10 carbon atoms as pointed out above and alkoxy groups having 1 to 10 carbon atoms such as a methoxy group, an ethoxy group, an n-propoxy group, an i-propoxy group, an n-butoxy group, a sec-butoxy group and a t-butoxy group. P1, p2, q1, q2, r1 and r2 in the metal chelate compound represent integers that meet the requirements of p1+p2=4, q1+q2=4 and r1+r2=3.

Specific examples of such metal chelate compounds include zirconium chelate compounds such as tri-n-butoxyethylacetoacetatezirconium, di-n-butoxybis(ethylacetoacetate)zirconium, n-butoxytris(ethylacetoacetate)zirconium and tetrakis(n-propylacetoacetate)zirconium, tetrakis(ethylacetoacetate)zirconium, titanium chelate compounds such as diisopropoxy-bis(acetoacetate)titanium, diisopropoxy-bis(acetylacetate)titanium and diisopropoxy-bis(acetylacetone)titanium and aluminum chelate compounds such as diisopropoxyethylacetoacetatealuminium, diisopropoxyacetylacetonataluminium, isopropoxybis(ethylacetoacetate)aluminium, isopropoxybis(acetylacetonat)aluminium, tris(ethylacetoacetate)aluminium, tris(acetylacetonat)aluminum and monoacetylacetonat-bis(ethylacetoacetate)aluminum.

Of the above-listed metal chelate compounds, tri-n-butoxyethylacetoacetatezirconium, diisopropoxy-bis(acetylacetone)titanium, diisopropoxyethylacetoacetatealuminium and tris(ethylacetoacetate)aluminium are preferable. These metal chelate compounds may be used alone or in combination. A partial hydrolysate of any of these metal chelate compounds can also be used for the purpose of the present invention.

For the purpose of the present invention, a β-diketone compound and/or a β-keto ester compound are preferably added to the curable composition. This will be described further below.

For the purpose of the present invention, a β-diketone compound and/or a β-keto ester compound expressed by general formula $R^4COCH_2COR^5$ are used. They operate as stability enhancer for the curable composition.

In the above general formula, $R^4$ represents an alkyl group having 1 to 10 carbon atoms and $R^5$ represents an alkyl group having 1 to 10 carbon atoms or an alkoxy group having 1 to 10 carbon atoms. The inventors of the present invention believe that, as they are coordinated with the metal atom or atoms in the metal chelate compound or compounds (zirconium, titanium and/or aluminum compounds), whichever appropriate, they suppress the effect of the metal chelate compounds of accelerating the condensation reaction of the hydrolysate and/or the partial condensation product of the organosilane compound to enhance the storage stability of the obtained composition. $R^4$ and $R^5$ in the β-diketone compound and the β-keto ester compound are the same as those in the metal chelate compound or compounds.

Specific examples of β-diketone compounds and the β-keto ester compounds that can be used for the purpose of the present invention include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexane-dione, 2,4-heptane-dione, 3,5-heptane-dione, 2,4-octane-dione, 2,4-nonane-dione and 5-methyl-hexane-dione, of which ethyl acetoacetate and acetylacetone are preferable and acetyleacetone is most preferable. The above-listed β-diketone compounds and the β-keto ester compounds may be used alone or in combination. The β-diketone compound and/or the β-keto ester compound is used preferably by 2 mols or more, more preferably by 3 mols to 20 mols relative to 1 mol of the metal chelate compound. A good storage stability can be obtained within the above cited range.

The content ratio of the organosilane compound is preferably 0.1 mass % to 50 mss %, more preferably 0.5 mass % to 20 mass %, and most preferably 1 mass % to 10 mss % of the total solid of the low refractive index layer.

While the organosilane compound may be directly added to the curable composition (coating solution for the anti-glare layer and the low refractive index layer), it is preferable to process the organosilane compound in the presence of a catalyst in advance to prepare a hydrolysate and/or a partial condensation product of the organosilane compound and then prepare the curable composition, using the obtained reaction solution (sol). Thus, for the purpose of the present invention, a composition containing a hydrolysate and/or a partial condensation product of the organosilane compound and the metal chelate compound is prepared first and the coating solution for at least either the anti-glare layer or the low refractive index layer is made to contain the solution prepared by adding the β-diketone compound and/or the β-keto ester compound to the composition before applying the coating solution.

For the purpose of the present invention, it is preferable that both the anti-glare layer and the low refractive index layer are formed of a cured film formed by applying and curing a curable coating composition containing a hydrolysate and/or a partial condensation product of the organosilane compound expressed by the general formula (4).

The content ratio of the sol of the organosilane compound relative to the fluorine-containing polymer of the low refractive index layer is preferably 5 mass % to 100 mass %, more preferably 5 mass % to 40 mass %, particularly more preferably 8 mass % to 35 mass %, and most preferably 10 mass % to 30 mass %. It is difficult to produce the effect of the present invention when the content ratio is too low, whereas the refractive index undesirably rises and the profile and the surface smoothness of the obtained film become poor when the content ratio is too high.

An inorganic filler may be added to the curable composition in addition to the above-described fine inorganic particles within a range that does not interfere with the intended effect of the present invention. Fine inorganic particles described above for the anti-glare layer are preferable as the inorganic filler. It is preferable to add indium, tin or antimony that can be provided with electro-conductivity within a range that does not significantly affect the refractive index.

-Sol Gel Materials-

Any of various sol gel materials can be used as the material of the low refractive index layer. Such sol gel materials include metal alkolates (alkolates of silane, titanium, aluminum, zirconium, etc.), organo alkoxy metal compounds and their hydrolysates. Of these, alkoxysilane, organoalkoxysilane and their hydrolysates are preferable. Examples of such compounds include tetraalkoxysilanes (tetramethoxysilane, tetraethoxysilane, etc.), alkyltrialkoxysilanes (methyltrialkoxysilane, ethyltrialkoxysilane, etc.), aryltrialkoxysilanes (phenyltrimethoxysilane, etc.), dialkyldialkoxysilanes and diaryldialkoxysilanes. Other preferable compounds include organoalkoxysilanes (vinyltrialkoxysilanes, methylvinyldialkoxysilanes, γ-glyccidyloxypropyltrialkoxysilanes, γ-glycidyloxypropylmethyldialkoxysilanes, β-(3,4-epoxydicyclohexyl)ethyltrialkoxysilanes, γ-methacryloyloxypropyltrialkoxysilane, γ-aminopropyltrialkoxysilanes, γ-mercaptopropyltrialkoxysilanes, γ-chloropropyltrialkoxysilanes, etc.), perfluoroalkyl-group-containing silane compounds (e.g., heptadecafluoro-1,1,2,2-tetradecyl)triethoxysilane, 3,3,3-tirfluoropropyltrimethoxysilane, etc.). Particularly, the use of a fluorine-containing silane compound is preferable from the viewpoint of lowering the refractive index of the layer and providing it with a water repelling/oil repelling effect. Such a compound may preferably be contained as (A) a fluorine-containing compound.

-Other Substances Contained in Curable Composition for Low Refractive Index Layer- The curable composition is prepared by adding, if necessary, various additives, a radical polarization initiator, a cationic polarization initiator to (A) a fluorine-containing compound, (B) fine inorganic particles and (C) an organosilane compound and dissolving them to an appropriate solvent. While the concentration of the solid component may be selected appropriately according to the purpose, it is generally preferably 0.01 mass % to 60 mass %, more preferably 0.5 mass % to 50 mass %, and most preferably 1 mass % to 20 mass %.

Form the viewpoint of interfacial tight adhesion of the low refractive index layer and the immediately underlying layer, a curing agent selected from multifunctional epoxy compounds, polyisocyanate compounds, aminoplasts, polybasic acids and anhydrates thereof may be added to a small extent. When any of these substances is added, the ratio of the additive relative to the total solid content of the low refractive index layer is preferably 30 mass % or less, preferably 20 mass % or less, most preferably 10 mass % or less.

An anti-stain agent and/or a slip promoting agent of a known silicon compound or a known fluorine compound may be appropriately added for the purpose of providing an anti-stain effect, a waterproof effect, a chemical resistance effect and a slipping effect as well as other effects. When adding such additives, they are added preferably within a range of 0.01 mass % to 20 mass %, more preferably within a range of 0.05 mass % to 10 mass %, and most preferably within a range of 0.1 mass % to 5 mass %.

Examples of preferable silicon compounds include those having a plurality of dimethylsilyloxy units as repetitive units and those having one or more substituents at an end and/or at a side chain. Compounds containing dmethylsilyloxy as repetitive units may also contain one or more other structural units in the compound chain. When the compound contains a plurality of substituents, they may be the same of different from each other. Examples of preferable substituents include acryloyl groups, methacryloyl groups, vinyl groups, aryl groups, cinnamoyl groups, epoxy groups, oxetanyl groups, hydroxyl groups, fluoroalkyl groups, polyoxyalkylene groups, carboxyl groups and amino groups. While the molecular weight is not subjected to any particular limitations, it is preferably 100,000 or less, more preferably 50,000 or less, and most preferably 3,000 to 30,000. While silicon atom content ratio of the silicon compound is not subjected to any particular limiations, it is preferably 18.0 mass % or more, more preferably 25.0 mass % to 37.8 mass %, and most preferably 30.0 mass % to 37.0 mass %.

Examples of preferable silicon compounds non-limitatively include X-22-174DX, X-22-2426, X-22-164B, X-22-164C, X-22-170DX, X-22-176D and X-22-1821 (tradenames, available from Shin-Etsu Chemical), FM-0725, FM-7725, FM-4421, FM-5521, FM-6621 and FM-1121 (tradenames, available from Chisso Corporation) and DMS-U22, RMS-033, RMS-083, UMS-182, DMS-H21, DMS-H31, HMS-301, FMS121, FMS123, FMS131, FMS141 and FMS221 (tradenames, available from Gelest).

A compound having a fluoroalkyl group is preferably used as a fluorine compound. The fluoroalkyl group has preferably 1 to 20 carbon atoms, and more preferably 1 to 10 carbon atoms. It may be a straight chain (such as $-CF_2CF_3$, $-CH_2(CF_2)_4H$, $-CH_2(CF_2)_8CF_3$, $-CH_2CH_2(CF_2)_4H$, or the like), a branched structure (such as $-CH(CF_3)_2$, $-CH_2CF(CF_3)_2$, $-CH(CH_3)CF_2CF_3$, $-CH(CH_3)(CF_2)_5CF_2H$ or the like) or an alicyclic structure (preferably having a five-membered ring or a six-membered ring, e.g, a perfluorocyclohexyl group, a perfluorocyclopentyl group or an alkyl group substituted by either of them, etc.) and may have an ether bond (e.g., $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$, etc.). A molecule may contain a plurality of fluoroalkyl groups.

The fluorine compound preferably has a substituent that operates effectively for the bond formation and the compatibility with the low refractive index layer. Preferably, there are more than two such substituents that may be the same or different from each other. Examples of preferable substituents include acryloyl group, methacryloyl groups, vinyl group, aryl group, cinnamoyl group, epoxy group, oxetanyl group, hydroxyl group, polyoxydialkylene group, carboxyl group and amino group. The fluorine compound may be a polymer or an oligomer formed with a polymer that does not contain any fluorine atom. The molecular weight is not subjected to any particular limitations. While the fluorine atom content ratio in the fluorine compound is not subjected to any particular limitations, it is preferably 20 mass % or more, more preferably 30 mass % to 70 mass %, and more preferably 40 mass % to 70 mass %. Examples of preferable fluorine compounds include R-2020, M-2020, R-3833 and M-3833 (tradenames) available from Daikin, Megaface F-171, F-172 and F-179A and Defensa MCF-300 (tradenames) available from Dainippon Ink & Chemicals.

The molecular structure of the (A) fluorine-containing compound in the curable composition for the low refractive index layer preferably includes the molecular structure of a silicon compound or a fluorine compounds that can be appropriately added for the purpose of providing an anti-stain effect, a waterproof effect, a chemical resistance effect and a slipping effect as well as other effects. In other words, the molecular structure of the fluorine-containing polymer or the fluorine sol gel includes the molecular structure of such a compound in the form of a block or a graft.

An anti-dust agent and an anti-static agent such as a known cationic surfactant or a known polyoxyalkylene compound may be added appropriately for the purpose of providing an anti-dust effect and an anti-static effect. The structural unit of such an anti-dust agent and that of such an anti-static agent may be included in the silicon compound or the fluorine compound as part of its functional feature. When they are added as additives, the content ratio of the additives is preferably within a range of 0.01 mass % to 20 mass %, more preferably within a range of 0.05 mass % to 10 mass %, most preferably within a range of 0.1 mass % to 5 mass %, of the solid component of the low refractive index layer. While examples of preferable compounds non-limitatively include Megaface F-150 (tradename) available from Dainippon Ink & Chemicals and SH-3748 (tradename) available from Dow Corning Toray.

-Solvent for Low Refractive Index Layer-

The solvent to be used for the coating composition for forming the low refractive index layer may be selected from various solvent from the viewpoint that it can dissolve or disperse the components, that it can form a uniform surface in the coating process and the drying process, that it can provide a liquid retaining effect and that it has a moderate saturation vapor pressure. From the viewpoint of drying load, the solvent preferably contains a component solvent showing a boiling point 100° C. or less in an environment of atmospheric pressure and room temperature as main component. More preferably, it contains a component solvent showing a boiling point 100° C. or more to a small extent for the purpose of regulating the drying rate.

Examples of solvents showing a boiling point 100° C. or less include hydrocarbons such as hexane (boiling point 68.7° C.), heptane (98.4° C.), cyclohexane (80.7° C.) and benzene (80.1° C.), halogenated hydrocarbons such as dichloromethane (39.8° C.), chloroform (61.2° C.), carbon tetrachloride (76.8° C.) 1,2-dichloroethane (83.5° C.) and trichloroethylene (87.2° C.), ethers such as diethylether (34.6° C.), diisopropylether (68.5° C.), dipropylether (90.5° C.), and tetrahydrofuran (66° C.), esters such as ethyl formate (54.2° C.), methyl acetate (57.8° C.), ethyl acetate (77.1° C.) and isopropyl acetate (89° C.), ketones such as acetone (56.1° C.) and 2-butanone (same as methyl ethyl ketone, 79.6° C.), alcohols such as methanol (64.5° C.), ethanol (78.3° C.), 2-propanol (82.4° C.) and 1-propanol (97.2° C.), cyano compounds such as acetonitrile (81.6° C.) and propionitrile (97.4° C.) and carbon disulfide (46.2° C.), of which ketones and esters are preferable and ketone are more preferable. Among ketones, 2-butanone is particularly preferable.

Examples of solvents showing a boiling point 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.) and dimethylsulfoxide (189° C.). Of these, cyclohexane and 2-methyl-4-pentanone are preferable.

<Anti-Glare Layer>

The anti-glare layer is formed for the purpose of providing the film with an anti-glare effect by surface scattering and a hard coat effect for improving the abrasion resistance of the film. Therefore, for the purpose of the present invention, such a layer can be used as a variety of hard coat layer.

Known techniques that can be used for forming an anti-glare layer include a method of forming a mat-like film having microscopic asperities on the surface as laminate as described in JP-A No. 6-16851, a method of forming an anti-glare layer by curing contraction of ionizing radiation curable resin by means of a difference in the dose of ionizing radiation as described in JP-A No. 2000-206317, a method of gelling and solidifying light transmitting fine particles and light transmitting resin to produce asperities on the surface of a film formed by application as a result of a reduction of the mass ratio of the solvent relative to the light transmitting resin due to drying as described in JP-A No. 2000-338310, a method of providing the surface of a film with asperities by externally applying pressure as described in JP-A No. 2000-275404 and a method of forming asperities on the surface of a film by utilizing the phenomenon that phase separation takes place in a process where the solvent evaporates from a mixture solution of a plurality of polymers as described in JP-A No. 2005-195819. Any of these methods can be used.

A preferable form of anti-glare layer that can be used for the purpose of the present invention contains a binder that can provide a hard coat effect, light transmitting particles for providing an anti-glare effect and a solvent as indispensable ingredients and has asperities formed on the surface by the projections of the light transmitting particles themselves or the projections formed by an aggregate of a plurality of particles.

The anti-glare layer having an anti-glare effect preferably can provides both an anti-glare effect and a hard coat effect.

-Ultraviolet Absorber-

At least one of the transparent base film, the coat layer, the adhesion facilitating layer and the hard coat layer contains two or more ultraviolet absorbers expressed by the general formula (6) shown below.

In the general formula (6), $R^1$, $R^2$, $R^3$, $R^4$ and $R^5$ independently represent a hydrogen atom or a univalent organic group, of which at least one of $R^1$, $R^2$ and $R^3$ represents non-substituted branched or straight chain alkyl group having a total number of carbon atoms of 4 to 20, and $R^1$, $R^2$ and $R^3$ differ from each other.

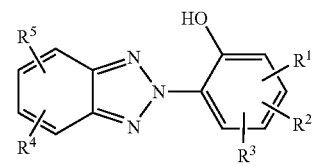

general formula (6)

More preferably, a cellulose acylate film whose mean value (to be also referred to as mean log P hereinafter) of octanol/water partition coefficient (to be also referred to as log P hereinafter) as expressed by the formula (c) shown below and the degree of acylation DS satisfy the relationship of the formula (d) shown below is employed as transparent base film.

In the formula (c) below, $W_n$ represents the mass fraction of the n-th ultraviolet absorber and $(\log P)_n$ represents "log P" of the n-th ultraviolet absorber.

$$\text{mean } \log P = \sum_n W_n (\log P)_n \qquad \text{formula (c)}$$

$$5.0 \times DS - 6.7 \leq \text{mean } \log P \times \leq 5.0 \times DS - 5.1 \qquad \text{formula (d)}$$

The mean value of log P of the ultraviolet absorber is preferably (5.0×DS−6.7) or more and (5.0×DS−5.1) or less, more preferably (5.0×DS−6.5) or more and (5.0×DS−5.2) or less.

The surface condition is degraded when the mean value of log P is too large, whereas the effect of retaining the ultraviolet absorber falls in a high temperature and high humidity condition.

The compound expressed by the general formula (6) shows an absorption maximum in a wavelength range of 330 nm to 360 nm.

-Log P value-

The octanol/water partition coefficient (log P value) can be measured by means of a technique of Shake flask method as defined in JIS Z7260-107 (2000).

The octanol/water partition coefficient can be estimated by means of a computational/chemical technique or an empirical technique instead of an actual measurement process.

Computation techniques that can preferably be used include Crippen's fragmentation method (J. Chem. Inf. Comput. Sci., 27, 21 (1987)), Viswanadhan's fragmentation method (J. Chem. Inf. Comput. Sci., 29, 163 (1989)) and Broto's fragmentation method (Eur. J. Med. Chem.-Chim. Theor., 19, 71 (1984)), of which Crippen's fragmentation method (J. Chem. Inf. Comput. Sci., 27, 21 (1987)) is most preferable.

If the log P value of a compound varies depending on the measurement method or the computation method, Crippen's fragmentation method is preferably employed to determine if the compound can be used within the scope of the present invention.

The molecular weight of the ultraviolet absorber is preferably 250 to 1,000, more preferably 260 to 800, further preferably 270 to 800, and most preferably 300 to 800 from the viewpoint of volatility.

The ultraviolet absorber may have a specific monomer structure or an oligomer or polymer structure produced by bonding a plurality of such monomer units.

The ultraviolet absorber preferably does not volatalize in the doping/flow-casing and drying processes for preparing a celulose acylate film.

-Adding Ratio of Ultraviolet Absorber-

The ratio by which the ultraviolet absorber is added is preferably 0.01 mass % to 10 mass %, more preferably 0.1 mass % to 5 mass %, most preferably 0.2 mass % to 3 mass % relative to the cellulose acylate.

-Method of Adding Ultraviolet Absorber-

As for the time of adding the ultraviolet absorber, it may be added in any stage of the dope preparing process. It may be added in the last stage of the dope preparing process.

Now, the ultraviolet absorber expressed by the general formula (6) will be described below in greater detail.

In the general formula (6), $R^1$, $R^2$, $R^3$, $R^4$ and $R^5$ independently represent a hydrogen atom or a univalent organic group, of which at least one of $R^1$, $R^2$ and $R^3$ represents non-substituted branched or straight chain alkyl group having a total number of carbon atoms of 4 to 20, and $R^1$, $R^2$ and $R^3$ differ from each other.

Substituents that can be used for the ultraviolet absorber include alkyl groups (having preferably 1 to 20 carbon atoms, more preferably 1 to 12 carbon atoms, and most preferably 1 to 8 carbon atoms such as a methyl group, an ethyl group, an iso-propyl group, a tert-butyl group, an n-octyl group, a n-decyl group, an n-hexadecyl group, a cyclopropyl group, a cylopentyl group and hexahexyl group), alkenyl groups (having preferably 2 to 20 carbon atoms, more preferably 2 to 12 carbon atoms, and most preferably 2 to 8 carbon atoms such as a vinyl group, an aryl group, a 2-butenyl group and a 3-pentenyl group), alkynyl groups (having preferably 2 to 20 carbon atoms, more preferably 2 to 12 carbon atoms, and most preferably 2 to 8 carbon atoms such as a propargyl group and a pentynyl group), aryl groups (having preferably 6 to 30 carbon atoms, more preferably 6 to 20 carbon atoms, and most preferably 6 to 12 carbon atoms such as a phenyl group, a p-methylphenyl group and a naphthyl group) and substituted or non-substituted amino groups (having preferably 0 to 20 carbon atoms, more preferably 0 to 10 carbon atoms, and most preferably 0 to 6 carbon atoms such as an amino group, a methylamino group, a dimethylamino group, a diethylamino group and a dibenzylamino group).

Other examples of substituents include alkoxy groups (having preferably 1 to 20 carbon atoms, more preferably 1 to 12 carbon atoms, and most preferably 1 to 8 carbon atoms such as a methoxy group, an ethoxy group and a butoxy group), aryloxy groups (having preferably 6 to 20 carbon atoms, more preferably 6 to 16 carbon atoms, and most preferably 6 to 12 carbon atoms such as a phenyloxy group and a 2-naphthyloxy group), acyl groups (having preferably 1 to 20 carbon atoms, more preferably 1 to 16 carbon atoms, and most preferably 1 to 12 carbon atoms such as an acetyl group, a benzoyl group, a formyl group and a pivaloyl group), alkoxycarbonyl groups (having preferably 2 to 20 carbon atoms, more preferably 2 to 16 carbon atoms, and most preferably 2 to 12 carbon atoms such as a methoxycarbonyl group and an ethoxycarbonyl group), aryloxycarbonyl groups (having preferably 7 to 20 carbon atoms, more preferably 7 to 16 carbon atoms, and most preferably 7 to 10 carbon atoms such as a phenyloxycarbonyl group), acyloxy groups (having preferably 2 to 20 carbon atoms, more preferably 2 to 16 carbon atoms, and most preferably 2 to 10 carbon atoms such as an acetoxy group and a benzoyloxy group), acylamino group (having preferably 2 to 20 carbon atoms, more preferably 2 to 16 carbon atoms, and most preferably 2 to 10 carbon atoms such as an acetylamino group and a benzoylamino group), alkoxcarbonylamino groups (having preferably 2 to 20 carbon atoms, more preferably 2 to 16 carbon atoms, and most preferably 2 to 12 carbon atoms such as a methoxycarbonylamino group), aryloxycarbonylamino groups (having preferably 7 to 20 carbon atoms, more preferably 7 to 16 carbon atoms, and most preferably 7 to 12 carbon atoms such as a phenyloxycarbonylamino group), sulfonylamino groups (having preferably 1 to 20 carbon atoms, more preferably 1 to 16 carbon atoms, and most preferably 1 to 12 carbon atoms such as a methanesulfonylamino group and a benzenesulfonylamino group), sulfamoyl groups (having preferably 0 to 20 carbon atoms, more preferably 0 to 16 carbon atoms, and most preferably 0 to 12 carbon atoms such as a sulfamoyl group, a methylsulfamoyl group, a dimethylsulfamoyl group and a phenylsulfamoyl group), carbamoyl groups (having preferably 1 to 20 carbon atoms, more preferably 1 to 16 carbon atoms, and most preferably 1 to 12 carbon atoms such as a carbamoyl group, a methylcarbamoyl group, diethylcarbamoyl group and a phenyl carbamoyl group), alkylthio groups (having preferably 1 to 20 carbon atoms, more preferably 1 to 16 carbon atoms, and most preferably 1 to 12 carbon atoms such as a methylthio group and an ethylthio group), arylthio groups (having preferably 6 to 20 carbon atoms, more preferably 6 to 16 carbon atoms, and most preferably 6 to 12 carbon atoms such as a phenylthio group), sulfonyl groups (having preferably 1 to 20 carbon atoms, more preferably 1 to 16 carbon atoms, and most preferably 1 to 12 carbon atoms such as a mesyl group and a tosyl group), sulfinyl groups (having preferably 1 to 20 carbon atoms, more preferably 1 to 16 carbon atoms, and most preferably 1 to 12 carbon atoms such as a methanesulfinyl group and a benzenesulfinyl group), ureide groups (having preferably 1 to 20 carbon atoms, more preferably 1 to 16 carbon atoms, and most preferably 1 to 12 carbon atoms such as an ureide group, a methylureide group and a phenylureide group), amide phosphate group (having preferably 1 to 20 carbon atoms, more preferably 1 to 16 carbon atoms, and most preferably 1 to 12 carbon atoms such as a diethylphosphoramide group and a phenylphosphoramide group), hydroxy groups, mercapto groups, halogen atoms (such as a fluorine atom, a chlorine atom, a bromine atom and an iodine atom), cyano groups, sulfo groups, carboxyl groups, nitro groups, hydroxamic acid groups, sulfino groups, hydrazine groups, imino groups, heterocyclic groups (having preferably 1 to 30 carbon atoms, more preferably 1 to 12 carbon atoms and containing one or more hetero atoms such as nitrogen atoms, oxygen atoms, and/or sulfur atoms, such as an imidazolyl group, a pyridyl group, a quinolyl group, a furyl group, a piperidyl group, a morpholino group, a benzoxazolyl group, a benzimidazolyl group, and a benzthiazolyl group) and silyl groups (having preferably 3 to 40 carbon atoms, more preferably 3 to 30 carbon atoms, and most preferably 3 to 24 carbon atoms such as a trimethylsilyl group and a triphenylsilyl group). Any of these substituents may be further substituted.

When there are two or more substituents, they may be the same or different from each other and, if possible, they may be linked to form a ring. Note, however, that at least one of $R^1$, $R^2$ and $R^3$ represents non-substituted branched or straight chain alkyl group having a total number of carbon atoms of 4 to 20, and $R^1$, $R^2$ and $R^3$ differ from each other.

Each of $R^1$ and $R^3$ is preferably a hydrogen atom, an alkyl group, an alkenyl group, an alkinyl group, an aryl group, a substituted or non-substituted amino group, an alkoxy group, an aryloxy group, a hydroxy group or a halogen atom, more preferably a hydrogen atom, an alkyl group, an aryl group, an alkoxy group, an aryloxy group or a halogen atom, particularly more preferably a hydrogen atom or an alkyl group having 1 to 12 carbon atoms, and most preferably an alkyl group having 1 to 12 carbon atoms (preferably having 4 to 12 carbon atoms).

$R^2$ is preferably a hydrogen atom, an alkyl group, an alkenyl group, an alkinyl group, an aryl group, a substituted or non-substituted amino group, an alkoxy group, an aryloxy group, a hydroxy group or a halogen atom, more preferably a hydrogen atom, an alkyl group, an aryl group, an alkoxy group, an aryloxy group or a halogen atom, particularly more preferably a hydrogen atom or an alkyl group having 1 to 12 carbon atoms, particularly far more preferably 9 hydrogen atom or a methyl group, and most preferably a hydrogen atom.

Each of $R^4$ and $R^5$ is preferably a hydrogen atom, an alkyl group, an alkenyl group, an alkinyl group, an aryl group, a substituted or non-substituted amino group, an alkoxy group, an aryloxy group, a hydroxy group or a halogen atom, more preferably a hydrogen atom, an alkyl group, an aryl group, an alkyloxy group, an aryloxy group or a halogen atom, particularly more preferably a hydrogen atom or a halogen atom, and most preferably a hydrogen atom or a chlorine atom.

The following is a non-exclusive list of specific examples of compounds expressed by the general formula (6).

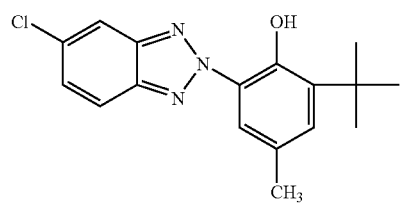

UV-1

-continued

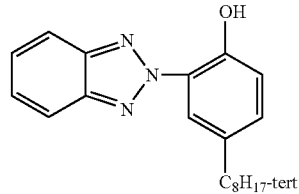

UV-2

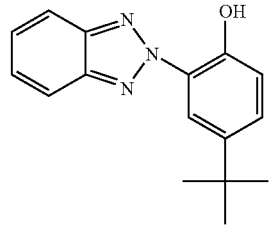

UV-3

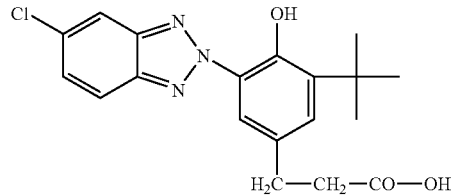

UV-4

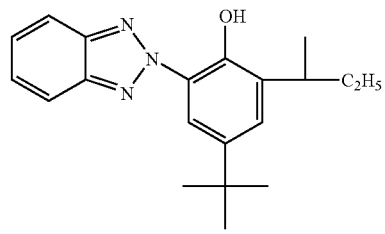

UV-5

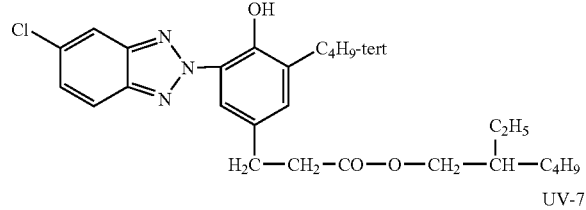

UV-6

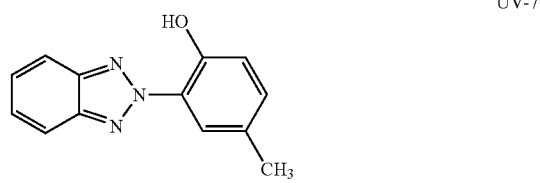

UV-7

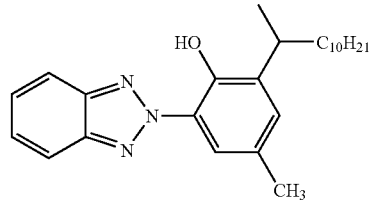

UV-8

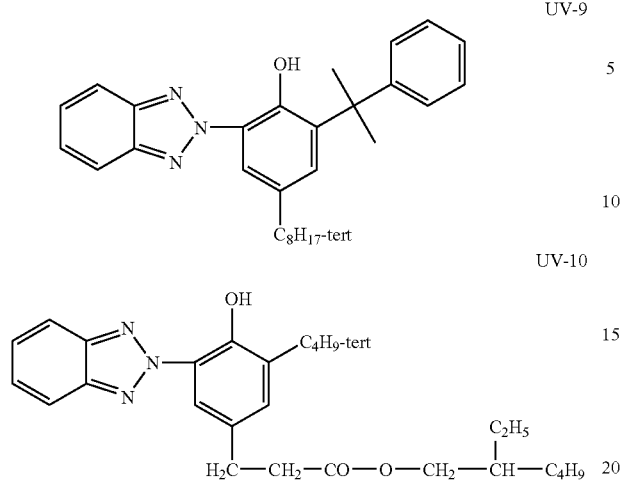

<Formation of Layers>>

For the purpose of the present invention, the coat layer, the hard coat layer, the low refractive index layer and the other layers are formed by sequentially applying the respective coating solutions on a transparent base film, heating and drying them and, if necessary, subsequently irradiating light and/or heating to cure the monomers and the curable resins of the layers. As a result, the layers are produced.

Any technique may be used to apply the solutions of the layers onto the base film without being subjected to any particular limitations. Techniques that can be used for the applying them include, dip coating, air knife coating, curtain coating, roller coating, wire bar coating, gravure coating, extrusion coating (die coating) (see U.S. Pat. No. 2,681,294), micro gravure coating and other known techniques. Among them, the micro gravure coating and the die coating are preferable. In order to supply with high productivity, the die coating is preferably used.

Each of the applied solutions are preferably dried under conditions where the concentration of the organic solvent in the applied solution is preferably 5 mass % or less, more preferably, 2 mass % or less, most preferably, 1 mass % or less, after the drying. While the drying conditions are subjected to the thermal strength of the base, the transfer rate, the duration of the drying process and so on, the content ratio of the organic solvent is preferably as low as possible from the viewpoint of the hardness of the coat and prevention of adhesion. When the coating solution does not contain any organic solvent, the drying process may be omitted and ultraviolet rays may be irradiated onto the applied solution immediately after the purpose.

The coat layer may be subjected to heat treatment in order to raise the crystallinity. The preferable heat treatment temperature is 40° C. to 130° C. and the duration of the heat treatment may be determined appropriately according to the required crystallinity, although it is normally about 5 minutes to 48 hours.

Additionally, if desired, the transparent base film may be subjected to a surface treatment by means of an oxidation method or an undulating method on one or both of the surfaces of the transparent base film in order to improve the tight adhesion between the transparent base film and the coat layer. The oxidation method may involve a corona discharge process, a glow discharge process, a chromic acid process (wet process), a flame process, a hot air process, an ozone/ultraviolet irradiation process or the like.

<<Undercoat Layer>>

An undercoat layer is formed between the transparent base film and the coat layer. More specifically, an undercoat layer is arranged on one or both of the opposite side of the coat layer that has a multilayer structure. The undercoat layer may have a single layer structure or a multilayer structure. For the purpose of the present invention, an undercoat layer having a double layer structure as described below is preferably arranged between the transparent base film and the coat layer.

[Composition of Undercoat Layer]

1st layer: an antistatic layer containing water-dispersible or water-soluble synthetic resin, a carbodiimide compound and electro-conductive metal oxide particles as indispensable ingredients.

second layer: a surface layer containing water-dispersible or water-soluble synthetic resin and a cross-linking agent as indispensable ingredients.

An anti-static layer and a surface layer are arranged on the transparent base film in the mentioned order to form an undercoat layer. The anti-static layer is provided with electro-conductivity to such an extent that the haze of the low charge base film obtained by arranging the anti-static layer on the transparent base film is 3% or less and the surface electric resistance of the surface layer formed thereon is found within a range of $1\times10^6$ to $1\times10^{11}\Omega$. Failures attributable to the adhering dust that is produced in the manufacturing process where the plastic support is handled can be suppressed by providing the anti-static layer.

<Second Protective Film>

The second protective film that is provided for the purpose of the present invention is arranged so as to be located between the polarization film and the liquid crystal cell as an element constituting the polarizing plate. It is sufficient for the second protective film to operate as protective film for the polarizing plate and preferably also have a desired phase difference in order to operate as optical compensation film that is free from optical adverse effects. Any of various popular thermoplastic polymer films may be used for the second protective film.

<<Function as Optical Compensation Film>>

For the purpose of the present invention, the second protective film is adapted to protect at least one of the surfaces of the polarizer of the polarizing plate and preferably also function as optical compensation film showing a desired phase difference characteristic.

The in-plane phase difference value (Re value) and the thickness direction phase difference (Rth value) of an optical compensation film are expressed by the formulas (e) and (f) shown below respectively.

$$Re = (nx - ny) \times d \qquad \text{formula (e)}$$

$$Rth = ((nx + ny)/2 - nz) \times d \qquad \text{formula (f)}$$

In the above formulas (e) and (f), nx, ny and nz are three-dimensional refractive indexes of the film, or the refractive indexes in the x-axis direction, the y-axis direction respectively in-plane of the film and the z-axis direction perpendicular to the film, and d is the film thickness (nm).

In the above formulas, nx, ny and nz are indexes showing the optical anisotropy of the film. More specifically, they are defined as follows for a film to be used for the purpose of the present invention.

nx: maximum refractive index in-plane of the film.
ny: refractive index in the direction perpendicular to the direction showing the maximum refractive index in-plane of the film.
nz: refractive index in the normal direction of the film.

For the purpose of the present invention, the optical anisotropy is positive when the refractive index is maximum in the stretching direction if the polymer film is mono-axially stretched or in the stretching direction in which the degree of alignment is raised if the polymer film is biaxially stretched. In other words, the optical anisotropy is positive when the refractive index is maximum in the direction of alignment of the polymer main chain from the viewpoint of chemical structure. The optical anisotropy is negative when the refractive index is minimum in the stretching direction.

For the purpose of the present invention, the optical anisotropy of the polymer film is regarded as refractive index ellipsoid and the three-dimensional refractive index is determined by a known method using a refractive index ellipsoid for determining the three-dimensional refractive index.

Since the three-dimensional refractive index is dependent on the wavelength of the light source to be used, it is preferably defined in terms of the light source wavelength. For the purpose of the present invention, the three-dimensional refractive index is determined by using a light source wavelength of 550 nm unless specified otherwise.

<<Method of Manufacturing Second Protective Film as Optical Compensation Film>>

In many cases, the second protective film is subjected to a stretching process in order to provide the obtained film with a phase difference characteristic that matches the purpose.

Stretching methods that can be used for the purpose of the present invention include a roll vertical monoaxial stretching method that utilizes the difference of the rates of revolutions of rolls, a tenter horizontal monoaxial stretching method of holding the transversal ends of the film by means of pins or clips and transversally extending the held part, a tenter diagonal monoaxial stretching method that utilizes the difference of the moving speeds and/or the difference of the distances passed over by the held parts of the film, a special Z-axis stretching method of applying tensile stress in the thickness direction and the continuous stretching method such as a special Z-axis stretching method of applying in-plane compression stress.

Other stretching methods that can be used for the purpose of the present invention include a sequential biaxial stretching method of repeating monoaxial stretching, a simultaneous biaxial stretching method of transversally extending the tenter showing a speed difference in the film flowing direction and a multistage stretching method of repeating such stretching several times.

While several continuous stretching methods are listed above for obtaining a film provided with a phase difference, methods that can be used for stretching a polymer film are not limited to them. While continuous stretching is preferable from the viewpoint of productivity, the stretching method to be used for the purpose of the present invention is by no means limited to a continuous stretching method.

As another method of providing the second protective film with a phase difference, an optically anisotropic layer may be arranged on the surface of the film. While such an optically anisotropic layer is not subjected to any particular limitations, it may be formed by forming an alignment layer on the surface of the thermoplastic polymer film directly or by way of an undercoat layer and orienting and solidifying a liquid crystal compound thereon. Alternatively, an alignment layer alone may be made as an optically anisotropic layer.

The optically anisotropic layer may be arranged either on the surface where a polarizer is bonded or on the surface where no polarizer is bonded, although it is preferably arranged on the surface where no polarizer is bonded.

[Alignment Layer]

The alignment layer is arranged on the thermoplastic polymer film adjacent to the optically anisotropic layer, which will be described in greater detail hereinafter, in order to align molecules of the liquid crystal compound in the optically anisotropic layer.

Specific examples of materials that can be used for forming the alignment layer nonlimitatively include polyimides, polyamideimides, polyamides, polyetherimides, polyetheretherketones, polyetherketons, polyketonesufides, polyethersulfones, polysulfones, polyphenylenesulfides, polyphenyleneoxides, polyethyleneterephthalate, polybutyleneterephthalate, polyethylenenaphthalate, polyacetals, polycarbonates, polyarylates, acrylic resin, polyvinylalcohols, polypropyrene, polyvinylpyrrolidone, cellulose plastics, epoxy resins and phenol resins.

While any known alignment process may be employed for the purpose of the present invention, a treatment method such as rubbing treatment that is popular for LCD liquid crystal alignment process can be utilized and a known photo-alignment alignment layer may be employed.

[Optically Anisotropic Layer]

While the thickness of the optically anisotropic layer varies depending on the magnitude of the birefringence and the state of alignment of the liquid crystal compound of the optically anisotropic layer from the viewpoint of improving the view angle characteristic of the liquid crystal display device, it is preferably about 0.1 µm to 10 µm, more preferably 0.2 µm to 5 µm.

While a plurality of optically anisotropic layers may be arranged for a single thermoplastic polymer film, a single optically anisotropic layer is preferably arranged from the viewpoint of productivity.

-Liquid Crystal Compound-

Any liquid crystal compound can be used for the purpose of the present invention so long as it can be oriented. Examples of liquid crystal compounds that can be used include discotic compounds and rod-shaped liquid crystal compounds. A mixture of several different liquid crystal compounds may also be used for the purpose of the present invention so long as it can fix the orientation by way of a process utilizing a chemical reaction or a temperature difference.

When preparing a solution containing a liquid crystal compound and an organic solvent and applying and drying the solution to produce an optically anisotropic layer, it is possible to carry out an alignment process for the liquid crystal compound below the liquid crystal transition temperature without heating it above that temperature.

In the case of applying a solution containing a liquid crystal compound, the solvent is removed by drying after the application to produce a liquid crystal layer having a uniform thickness. The orientation of the liquid crystal of the liquid crystal layer can be fixed under the effect of thermal or photo energy or a chemical reaction with a combination of thermal energy and photo energy.

When the liquid crystal compound is a polymer liquid crystal, it is not necessary to fix the orientation of the liquid crystal by using the curing reaction of the above chemical reaction.

For example, the orientation of the polymer liquid crystal can be fixed by heat-treating the liquid crystal at a temperature higher than the glass transition temperature thereof and emitting heat from the liquid crystal to cool it below the glass transition temperature.

When the glass transition temperature of the polymer liquid crystal is higher than the thermally resistive temperature of the thermoplastic polymer film, the alignment film is arranged on the thermoplastic polymer film and polymer liquid crystal is applied thereto before the polymer liquid crystal is heated above its glass transition temperature for alignment.

Alternatively, an optical anisotropic substance can be prepared after orienting a polymer liquid crystal and fixing the orientation on a different support and transferring it onto the thermoplastic polymer film by means of an adhesive agent.

While methods of stretching and arranging a optically anisotropic player to provide a phase difference characteristic that matches the application are listed above, any of them may be combined for use.

Particularly, when it is desired to provide the in-plane phase difference and the thickness direction phase difference with different wavelength dependencies, optically anisotropic layers may be arranged on respective thermoplastic poly films having different phase difference dependencies.

For example, there may be cases where an optically anisotropic layer having a characteristic that the phase difference is more remarkable for a shorter wavelength is arranged on a thermoplastic polymer film having a characteristic that the phase difference is less remarkable for a shorter wavelength. When a poorly productive stretching process is required as in the case of special Z-axis stretching, there may be cases where an optically anisotropic layer is arranged on a thermoplastic polymer film that is subjected to a highly productive stretching process to achieve the target phase difference characteristic as a whole. An optically anisotropic layer whose phase difference is negative in the thickness direction may be arranged on a thermoplastic polymer film that is subjected to a monoaxial stretching process and shows a positive optical anisotropy as in the case of an IPS type liquid crystal, circular polarizing plate or the like. A monoaxial optically anisotropic layer whose phase difference is position in the thickness direction may be arranged on a thermoplastic polymer film that is subjected to a monoaxial stretching process and shows a negative optical anisotropy. An optically anisotropic layer having an in-plane optical axis and a positive phase difference may be arranged on a thermoplastic polymer film that is subjected to a biaxial stretching process and shows a negative optical anisotropy.

<<Adhesiveness of Second Protective Film>>

A layer is preferably formed on the second protective film made of a thermoplastic polymer film and/or the second protective film may be subjected to a surface treatment in order to improve the adhesion to the polarizer.

Surface treatment processes that can be used for the second protective film include a saponification process, a corona discharge process, an ultraviolet irradiation process and an adhesion facilitating layer laminating process. It is desirable to make the surface condition such that the water drop contact angle on the film surface is preferably 65° or less, more preferably 60° or less, most preferably 40° or less.

<Method of Preparing Polarizing Plate>

A protective film for a polarizing plate (first protective film) is bonded to at least one of the opposite surfaces of a polarizer to form a polarizing plate. It is desirable that a second protective film showing a water vapor transmission rate that is preferably 700 $g/m^2 \cdot day$ to 3,000 $g/m^2 \cdot day$, more preferably 1,000 $g/m^2 \cdot day$ to 1,700 $g/m^2 \cdot day$, is bonded to the other surface of the polarizer. Normally, a TAC (cellulose triacetate) film is suitably used as the second protective film.

While an ordinary cellulose acetate film may be used as the second protective film, a cellulose acetate film manufactured by way of a solution film forming process and subjected to transversal stretching to a stretching magnitude of 10% to 100% in the form of a rolled film may alternatively be used.

A polarizing plate according to the present invention that is provided at one of the opposite surfaces thereof with a protective film for a polarizing plate according to the present invention may be provided at the other surface thereof with a protective film that is an optical compensation film having an optically anisotropic layer made of a liquid crystal type compound.

Alternatively, a polarizing plate according to the present invention that is provided at one of the opposite surfaces thereof with a protective film for a polarizing plate according to the present invention may be provided at the other surface thereof with a protective film whose in-plane retardation Re and thickness direction retardation Rth is 0 nm to 10 nm and −20 nm to 20 nm respectively (see, for example, JP-A No. 2005-301227, paragraph [0095]).

The polarizer may be made from an iodine based polarization film, a dye based polarization film using a dichroic dye or a polyene based polarization film. An iodine based polarization film and a dye based polarization film are normally manufactured by using a polyvinyl alcohol based film.

Of the two protective films arranged on the polarizer, the protective film for a polarizing plate (second protective film) other than the protective film for a polarizing plate (first protective film) according to the present invention is preferably an optical compensation film having an optical compensation layer containing an optically anisotropic layer.

An optical compensation film (phase difference film) can improve the view angle characteristic of a liquid crystal display screen.

While any known optical compensation film may be used for the purpose of the present invention, an optical compensation film described in JP-A No. 2001-100042 is preferable from the viewpoint of expanding the view angle.

When a protective film for a polarizing plate according to the present invention is used with a liquid crystal display device, it is preferably arranged at the viewing side that is opposite to the liquid crystal cell side.

(Liquid Crystal Display Device)

A protective film for a polarizing plate and a polarizing plate according to the present invention can advantageously be used in an image display device such as a liquid crystal display device. They are preferably arranged as the uppermost layer of the display.

A liquid crystal display device has a liquid crystal cell and a pair of polarizing plates arranged at the opposite sides thereof, while the liquid crystal cell holds liquid crystal between a pair of electrode substrates. Additionally, an optically anisotropic layer may be arranged between the liquid crystal cell and one of the polarizing plates or a pair of optically anisotropic layers may be arranged between the liquid crystal cell and the pair of polarizing plates.

The liquid crystal cell preferably adopts TN (twisted nematic) mode, VA (vertically aligned) mode, OCB (optically compensated bend) mode, IPS (in-plane switching) mode, or ECB (electrically controlled birefringence) mode.

<TN Mode>

In a liquid crystal cell in TN mode, the rod-shaped liquid crystal molecules are substantially horizontally oriented and also torsionally oriented with an angle of 60° to 120° when no voltage is applied thereto.

Liquid crystal cells in TN mode are utilized particularly popularly in color TFT liquid crystal display device and described in many documents.

<VA Mode>

In a liquid crystal cell in VA mode, the rod-shaped liquid crystal molecules are substantially vertically oriented when no voltage is applied thereto.

Liquid crystal cells in VA mode include (1) liquid crystal cells in a VA mode in the narrow sense of the words (as described in JP-A No. 02-176625) where the rod-shaped liquid crystal molecules are substantially vertically oriented when no voltage is applied thereto and substantially horizontally oriented when a voltage is applied thereto, (2) liquid crystal cells (in an MVA mode) where the VA mode is turned to a multi-domain for the purpose of expanding the view angle (as described in SID97, Digest of Tech. Papers (preprints) 28 (1997) 845), (3) liquid crystal cells in a mode where the rod-shaped liquid crystal molecules are substantially vertically oriented when no voltage is applied thereto and torsionally multi-domain-oriented when a voltage is applied thereto (n-ASM mode) (as described in Japanese Liquid Crystal Society Sympodium, preprints 58 to 59 (1998) and (4) liquid crystal cells of a SURVAIVAL mode (as published in LCD International 98).

<OCB Mode>

Liquid crystal cells in OCB mode are those in a bend alignment mode where the rod-shaped liquid crystal molecules in an upper part and those in a lower part are oriented (symmetrically) substantially in opposite directions as disclosed in U.S. Pat. Nos. 4,583,825 and 5,410,422. Liquid crystal cells in bend alignment mode have a self optical compensation feature because the rod-shaped liquid crystal molecules in an upper part and those in a lower part are oriented symmetrically. Therefore, this liquid crystal mode is referred to as OCB (optically compensatory bend) liquid crystal mode. Liquid crystal display device in a bend alignment mode provide an advantage of a fast response speed.

<IPS Mode>

A transverse electric field is applied to nematic liquid crystal for switching in liquid crystal cells in IPS mode. Liquid crystal cells in IPS mode are described in detail in Proc. IDRC (Asia Display '95), p. 577-580 and p. 707-710.

<ECB Mode>

In liquid crystal cells in ECB mode, the rod-shaped liquid crystal molecules are substantially horizontally oriented when no voltage is applied thereto. The ECB mode is one of the liquid crystal display mode having the simplest structure. It is described in detail in JP-A No. 05-203946.

<Touch Panel>

A protective film according to the present invention can be applied to a touch panel as described in JP-A Nos. 05-127822 and 2002-48913.

<Organic EL Device>

A protective film according to the present invention can be used as protective film of a substrate (transparent base film) of an organic EL device.

When a protective film according to the present invention is used for an organic EL device, the contents described in JP-A Nos. 11-335661, 11-335368, 2001-192651, 2001-192652, 2001-192653, 2001-335776, 2001-247859, 2001-181616, 2001-181617, 2002-181816, 2002-181617 and 2002-056976 can be applied. A protective film according to the present invention is preferably used by referring to the contents of JP-A Nos. 2001-148291, 2001-221916 and 2001-231443.

Thus, the present invention can provide a protective film for a polarizing plate in a highly productive manner.

Additionally, the present invention can provide a polarizing plate showing a small drying load in the manufacturing process.

Still additionally, the present invention can provide a liquid crystal display device that can maintain a high display image quality for a long period of time both in a high humidity environment and in a low humidity environment.

EXAMPLES

Now, the present invention will be described further by way of Examples, which however shall not be construed as limiting the scope of the present invention.

<Preparation of Coating Solution a-1 for Coat Layer>

The following composition was put into a mixing tank and stirred to dissolve the ingredients and prepare coating solution a-1 for a coat layer.

[Composition of Coating Solution a-1 for Coat Layer]

| | |
|---|---|
| R204 (chlorine-containing polymer, Saran Resin R204, available from Asahi Kasei Life & Living Corporation) | 12 parts by mass |
| tetrahydrofuran (stabilizer BHT content: 250 PPM) | 44 parts by mass |
| MEK (methyl ethyl ketone) | 10 parts by mass |
| toluene | 10 parts by mass |

<Preparation of Coating Solution a-2 for Coat Layer>

Water and MEB-3 were mixed and, after adding PVA103, the mixture was stirred at 95° C. for 2 hours. Subsequently, the temperature was lowered to 40° C. and MeOH was added and the coating solution was filtered by means of a polypropylene-made filter having a pore size of 100 μm to prepare coating solution a-2 for a coat layer. The composition of the coating solution a-2 for a coat layer is shown below.

[Composition of Coating Solution a-2 for Coat Layer]

| | |
|---|---|
| vinyl alcohol polymer PVA103 (available from Kuraray) | 5 parts by mass |
| submarine high-pressure dispersed MICA MEB-3 (average particle size = 1 μm to 3 μm, solid content ratio = 8 mass %, Co-op Chemical) | 3.1 parts by mass |
| water | 60 parts by mass |
| MeOH | 10 parts by mass |

<Preparation of Coating Solution a-3 for Coat Layer>

Water and MEB-3 were mixed and, after adding HR-3010, the mixture was stirred at 95° C. for 2 hours. Subsequently, the coating solution was filtered by means of a polypropylene-made filter having a pore size of 100 μm to prepare coating solution a-3 for a coat layer. The composition of the coating solution a-3 for a coat layer is shown below.

[Composition of Coating Solution a-3 for Coat Layer]

| | |
|---|---|
| vinyl alcohol polymer HR-3010 (available from Kuraray) | 5 parts by mass |
| submarine high pressure dispersant MICA MEB-3 (solid content ratio = 8 mass %, Co-op Chemical) | 3.1 parts by mass |
| water | 70 parts by mass |

<Preparation of Coating Solution a-4 for Coat Layer>

Water and PVA103 were mixed and the mixture was stirred at 95° C. for 2 hours. Subsequently, the coating solution was filtered by means of a polypropylene-made filter having a pore size of 100 μm to prepare coating solution a-4 for a coat layer. The composition of the coating solution a-4 for a coat layer is shown below.

[Composition of Coating Solution a-4 for Coat Layer]

| | |
|---|---|
| vinyl alcohol polymer PVA103 (available from Kuraray) | 5 parts by mass |
| water | 70 parts by mass |

<Preparation of Coating Solution a-5 for Coat Layer>

Water and MEB-3 were mixed and, after adding PVA103, the mixture was stirred at 95° C. for 2 hours. Subsequently, the temperature was lowered to 40° C. and MeOH was added and the coating solution was filtered by means of a polypropylene-made filter having a pore size of 100 μm. Then, glyoxal was added immediately before applying the solution to prepare coating solution a-5 for a coat layer. The composition of the coating solution a-5 for a coat layer is shown below.

[Composition of Coating Solution a-5 for Coat Layer]

| | |
|---|---|
| vinyl alcohol polymer PVA103 (available from Kuraray) | 5 parts by mass |
| submarine high-pressure dispersed MICA MEB-3 (solid content ratio = 8 mass %, available from Co-op Chemical) | 3.1 parts by mass |
| glyoxal | 0.5 parts by mass |
| water | 60 parts by mass |
| MeOH | 10 parts by mass |

<Preparation of Coating Solution a-6 for Coat Layer>

The following composition was put into a mixing tank and stirred to dissolve the ingredients and prepare coating solution a-6 for a coat layer.

[Composition of Coating Solution a-6 for Coat Layer]

| | |
|---|---|
| isopropyl alcohol | 19 parts by mass |
| water | 47 parts by mass |
| tetraethoxysilane | 25 parts by mass |
| 0.1N HCl | 1.3 parts by mass |
| PVA (4%) | 106 parts by mass |
| γ-acryloxypropyltrimethoxysilane | 2.2 parts by mass |
| N,N-dimethylbenzylamine | 0.002 parts by mass |

<Preparation of Coating Solution a-7 for Coat Layer>

The following composition was put into a mixing tank and stirred to dissolve the ingredients and prepare coating solution a-7 for a coat layer.

[Composition of Coating Solution a-7 for Coat Layer]

| | |
|---|---|
| pure water | 47 g |
| ethanol | 19 g |
| tetraethoxysilane | 28 g |
| 0.1N HCl | 1.3 g |
| γ-acryloxypropyltrimethoxysilane | 1.52 g |
| γ-aminopropyltrimethoxysilane | 1.52 g |

<Preparation of Coating Solution a-8 for Coat Layer>

The following composition was put into a mixing tank and stirred to dissolve the ingredients and prepare coating solution a-8 for a coat layer.

[Composition of Coating Solution a-8 for Coat Layer]

| | |
|---|---|
| vinyl alcohol polymer PVA103 (available from Kuraray) | 5 parts by mass |
| Sumecton SA (average particle radius = 0.02 μm, available from Kunimine Industries) | 0.25 parts by mass |
| water | 60 parts by mass |
| MeOH | 10 parts by mass |

<Preparation of Coating Solution b-1 for Adhesion Facilitating Layer>

Water and PVA$_2$O$_3$ were mixed and the mixture was stirred at 95° C. for 2 hours. After cooling, saran latex was mixed to prepare coating solution b-1 for an adhesion facilitating layer. The composition of coating solution b-1 for an adhesion facilitating layer is shown below.

[Composition of Coating Solution b-1 for Adhesion Facilitating Layer]

| | |
|---|---|
| vinyl alcohol polymer PVA203 (available from Kuraray) | 0.19 parts by mass |
| saran latex L536B (solid content ratio = 50%)(Asahi Kasei Corporation) | 3.6 parts by mass |
| water | 44.7 parts by mass |

<Preparation of Coating Solution for Hard Coat Layer>

[Preparation of Sol Solution 1]

187 g (0.80 mol) of acryloxyoxypropyltrimethoxysilane, 27.2 g (0.20 mol) of methyltrimethoxysilane, 320 g (10 mol) of methanol and 0.06 g (0.001 mol) of KF were put into a 1,000 ml reaction vessel equipped with a thermometer, a nitrogen feed pipe and a dropping funnel and 15.1 g (0.86 mol) of water was dropped slowly at room temperature, while the mixture was being stirred. After the end of the dropping, the mixture was stirred at room temperature for 3 hours. Subsequently, the mixture was heated and stirred for 2 hours while the methanol was being refluxed. Thereafter, the low boiling point fraction was removed under reduced pressure and the mixture was filtered to obtain 120 g of sol solution 1.

The obtained substance was subjected to GPC to consequently find out that the mass average molecule weight was 1,500 and the component having a molecular weight of 1,000 to 20,000 was 30% in the oligomer.

From a $^1$H-NMR measurement, it was found the obtained substance has a structure expressed by the general formula shown below.

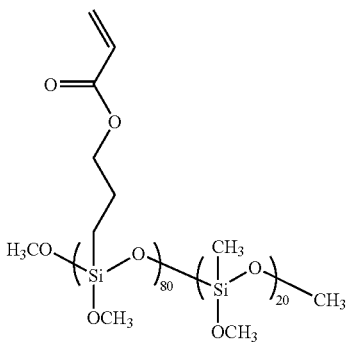

Note: the ratio 80:20 is molar ratio

As a result of a $^{29}$Si—NMR measurement, it was found that the condensation ratio α was 0.56. As a result of the analysis, it was found that a straight chain structure part takes a major part of the silane coupling agent sol.

As a result of a gas chromatography analysis, it was found that the residual ratio of the starting material acryloxypropyltrimethoxysilane was 5% or less.

(1) Preparation of Coating Solution of Hard Coat Layer

The following composition was put into a mixing tank and stirred to dissolve the ingredients. Subsequently, the mixture was filtered by means of a polypropylene-made filter having a pore size of 30 μm to prepare coating solution for a hard coat layer.

[Composition of Coating Solution for Hard Coat Layer]

| | |
|---|---|
| PET-30 | 40.0 g |
| DPHA | 10.0 g |
| IRGACURE 184 | 2.0 g |
| SX-350 (30%) | 2.0 g |
| cross-linked acryl-styrene particles (30%) | 13.0 g |
| FP-13 | 0.06 g |
| sol solution 1 | 11.0 g |
| toluene | 38.5 g |

The compounds used for preparing the coating solution for a hard coat layer are listed below.

PET-30: a mixture of pentaerythritoltriacrylate and pentaerythritoltetraacrylate [available from Nippon Kayaku]

IRGACURE 184: polymerization initiator [available from Ciba specialty Chemicals]

IRGACURE 907: polymerization initiator [available from Ciba specialty Chemicals]

SX-350: cross-linked polystyrene particles with average particle size of 3.5 μm [refractive index: 1.60, available from Soken Chemical & Engineering, 30% toluene dispersion liquid, used after dispersing for 20 minutes by means of a Polytron dispersion mill at 10,000 rpm]. cross-linked acryl-styrene particles: average particle size 3.5 μm [refractive index: 1.55, available from Soken Chemical & Engineering, 30% toluene dispersion liquid, used after dispersing for 20 minutes by means of a Polytron dispersion mill at 10,000 rpm]

<Preparation of Coating Solution for Low Refractive Index Layer>

13 g of a thermo-cross-linking fluorine polymer containing polysiloxane and hydroxylic groups and showing a refractive index of 1.44 (JTA113, solid content concentration 6%: tradename, available from JSR Corporation), 1.3 g of colloidal silica dispersion liquid MEK-ST-L (tradename, average particle size 45 nm, solid content concentration 30%, available from Nissan Chemical Industries), 0.65 g of the sol solution, 4.4 g of methyl ethyl ketone, 1.2 g of cyclohexanone were put together, stirred and then filtered by means of a polypropylene-made filter having a pore size of 1 μm to prepare a coating solution for a low refractive index layer. The refractive index of the layer formed by the coating solution was 1.45.

Example 1

<Preparation of Protective Film for Polarizing Plate>

Coating solution a-1 for a coat layer was applied onto a transparent base film, which was a triacetylcellulose film (TAC-T80UZ: tradename, available from Fuji Film), so as to produce a layer having a thickness of 1 μm after drying under a condition of a transfer rate of 30 m/min and dried at 100° C. for 2 minutes. The produced film was then rolled up.

Subsequently, the coat layer A-1 formed on the transparent base film was subjected to a saponification process in a 1 mol/L alkali solution at 50° C. and coating solution b-1 for an adhesion facilitating layer was applied to the coat layer A-1 so as to produce a layer having a thickness of 0.1 μm after drying and actually dried at 100° C. for 3 minutes to form adhesion facilitating layer B-1. The produced film was then rolled up.

Thereafter, the coating solution a-2 for a coat layer was applied onto the adhesion facilitating layer B-1 so as to produce a layer having a thickness of 6 μm after drying and actually dried at 100° C. for 3 minutes to form coat layer A-2. The produced film was then rolled up.

<<Formation of Hard Coat Layer>>

The roll of the protective film for a polarizing plate carrying a coat layer arranged thereon was unrolled and the coating solution for a hard coat layer was directly extruded and applied by means of a coater having a throttle die onto the surface of the transparent base film that was opposite to the surface where the coating solution a-1 for a coat layer had been applied under a condition of a transfer rate of 30 m/min and dried at 30° C. for 15 seconds and then at 90° C. for 20 seconds. Thereafter, the applied layer was cured by irradiation with ultraviolet light at a dose of 90 mJ/cm$^2$ by means of a 160 W/cm air cooling metal halide lamp (available from Eyegraphics), while being purged by nitrogen gas, to produce an anti-glare layer having a thickness of 6 μm. The produced film was then rolled up.

<<Formation of Low Refractive Index Layer>>

The roll of the protective film for a polarizing plate carrying a hard coat layer arranged thereon was unrolled and the coating solution for a low refractive index layer was directly extruded and applied by means of a coater having a throttle die onto the surface of the protective film for a polarizing plate on a backup roll where the hard coat layer had been formed.

Then, the applied coating solution was dried at 120° C. for 150 seconds and then at 140° C. for 8 minutes. Thereafter, the applied layer was cured by irradiation with ultraviolet light at a dose of 300 mJ/cm$^2$ by means of a 240 W/cm air cooling metal halide lamp (available from Eyegraphics) in an atmosphere showing an oxygen concentration of 0.1%, while being purged by nitrogen gas, to produce a low refractive index layer having a thickness of 100 nm. The produced film was then rolled up. Thus, the protective film for a polarizing plate of Example 1 having the coat layer A-1, the adhesion facilitating layer and the coat layer A-2 formed in the above-described order on one of the opposite surface of the transparent base film and the low refractive index layer and the hard coat layer on the other surface of the transparent base film was prepared. Table 1-1 shows configurations of the protective films for a polarizing plate.

<<Evaluation of Water Vapor Transmission Rate>>

The methods described in "Physical Properties of Polymer II" (Polymer Experimental Lecture 4; Kyoritsu Shuppan), pp. 285-294: Measurement of Vapor Permeability (mass method, thermometer method, vapor pressure method, adsorption rate method) can be applied to the measurement of the water vapor transmission rate of the prepared protective film for a polarizing plate.

The water vapor transmission rate was computationally determined according to JIS Z-0208 except the humidity regulating conditions were altered to 60° C., 95% RH. Table 2 shows the computationally determined water vapor transmission rate. During the measurement, an operation of taking out the cup put into a constant-temperature constant-humidity vessel, measuring the weight and putting it back at appropriate time intervals was repeated and the mass increase per unit time was determined between two consecutive measurements until the mass increase ratio settled down to a constant level 5% or less.

A blank cup containing no hygroscopic agent was weighed to eliminate the influence of moisture absorption by the sample and the water vapor transmission rate was corrected by using the weighed value.

The prepared protective film for a polarizing plate showed a water vapor transmission rate ($WVTR_{95}$) of 200 g/m²·day at 60° C., 95% relative humidity and a water vapor transmission rate ($WVTR_{40}$) of 6 g/m²·day at 60° C., 40% relative humidity and the value obtained by dividing the difference between the water vapor transmission rate ($WVTR_{95}$) at 60° C., 95% relative humidity and the water vapor transmission rate ($WVTR_{40}$) at 60° C., 40% relative humidity by the water vapor transmission rate at 60° C., 60% relative humidity, or ($WVTR_{95}$-$WVTR_{40}$)/$WVTR_{60}$, was 4.9.

Example 2

<Preparation of Protective Film for Polarizing Plate>

The protective film for a polarizing plate of Example 2 was prepared as in Example 1 except that the surface of the transparent base film opposite to the first coat layer A-1 was subjected to a saponification process at 50° C., using a 1 mol/L alkali solution and a second coat layer A-2 was formed on the saponified surface, while a low refractive index layer and a hard coat layer were formed on the first coat layer A-1. Table 1-1 shows configurations of the protective films for a polarizing plate.

The prepared protective film for a polarizing plate showed a $WVTR_{40}$ of 7 g/m²·day, a $WVTR_{95}$ of 210 g/m²·day and a ($WVTR_{95}$-$WVTR_{40}$)/$WVTR_{40}$ of 4.8.

Example 3

<Preparation of Protective Film for Polarizing Plate>

<<Preparation of Transparent Base Film>>

9,000 g of methyl methacrylate (MMA), 1,000 g of methyl-2-(hydroxymethyl)acrylate (MHMA), 10,000 g of 4-methyl-2-pentanone(methyl isobutyl ketone) (MIBK) and 5 g of n-dodecylmercaptan were put into a 30 L reaction vessel equipped with an agitator, a temperature sensor, a cooling pipe and a nitrogen feed pipe and the temperature of the mixture was raised to 105° C. while feeding nitrogen. As nitrogen is refluxed, 5.0 g of tert-butylperoxyisopropylcarbonate (Kayacarbon Bic-7: tradename, available from KYAKU AKZO Corporation) was added as initiator, while a mixture solution of 10.0 g of tert-butylperoxyisopropylcarbonate and 230 g of MIBK was dropped over 4 hours under a reflux condition (about 105° C. to 120° C.) to polymerize the solution. Then, the polymer was aged for 4 hours.

Then, 30 g of a stearyl phosphate/distearyl phosphate mixture (Phoslex A-18: tradename, available form Sakai Chemical Industry) was added to the obtained polymer solution and the mixture was subjected to a ring closure/condensation reaction over 5 hours under a reflux condition (about 90° C. to 120° C.).

The polymer solution obtained as a result of the ring closure/condensation reaction was then introduced into a vent type screw biaxial extruder having a rear vent and four fore vents and showing a barrel temperature of 260° C., a number of revolutions per unit time of 100 rpm and a decompression of 13.3 hPa to 400 hPa (10 mmHg to 300 mmHg) at a processing rate of 2.0 kg/hour as reduced to resin to realize a ring closure/condensation reaction and devolatilization in the extruder. Thus, transparent pellets were obtained by extrusion.

The obtained pellets were molten and extruded from a 150 mm-wide coat hanger type T die by means of a biaxial extruder having a 200 mm-diameter screw to prepare an about 80 μm-thick lactone-ring-containing transparent base film. Table 1-1 shows the configuration of the protective film for a polarizing plate.

<<Formation of Coat Layer>>

The prepared transparent base film was subjected to a corona discharge treatment at 727 J/m² and the coating solution a-3 for a coat layer was applied to the corona-treated surface so as to produce a layer having a thickness of 3 μm after drying. Thus, the protective film for a polarizing plate of Example 3 having a coat layer A-3 formed on the transparent base film was prepared.

The prepared protective film for a polarizing plate showed a $WVTR_{40}$ of 12 g/m²·day, a $WVTR_{95}$ of 230 g/m²·day and a ($WVTR_{95}$-$WVTR_{40}$)/$WVTR_{60}$ of 2.7.

Example 4

<Preparation of Protective Film for Polarizing Plate>

<<Preparation of Transparent Base Film>>

100 parts by mass of polycarbonate resin (viscosity average molecular weight: 40,000, bisphenol A), 1.0 part by mass of 2-(2'-hydroxy-3',5'-di-t-butylphenyl)-benzotriazole, 430 parts by mass of methylene chloride and 90 parts by mass of methanol were put into a hermetically sealed vessel and completely molten at sustained temperature of 80° C. under high pressure, white being stirred, to obtain a dope composition.

The dope composition A was filtered, cooled to a constant temperature level 33° C., flow-cast onto a stainless band and dried at 33° C. for 5 minutes.

Then, the flow-cast composition was peeled off from the stainless band and the drying process was terminated, while being transferred by means of a large number of rolls, to obtain a 60 μm-thick polycarbonate film as a transparent base film. Table 1-1 shows the configuration of the protective film for a polarizing plate.

<<Formation of Coat Layer>>

Thereafter, the surface of the polycarbonate film was subjected to a corona treatment and the coating solution a-3 for a coat layer was applied onto the corona-treated surface so as to produce a layer having a thickness of 5 μm after drying. Thus, the protective film for a polarizing plate of Example 4 having a coat layer A-3 formed on the transparent base film was prepared.

The prepared protective film for a polarizing plate showed a $WVTR_{40}$ of 8 g/m$^2$·day, a $WVTR_{95}$ of 150 g/m$^2$·day and a $(WVTR_{95}-WVTR_{40})/WVTR_{60}$ of 3.4.

Example 5

<Preparation of Protective Film for Polarizing Plate>

<<Preparation of Transparent Base Film>

A polyester chip material was dried in a Henschel mixer and a paddle drier to a moisture content ratio 50 ppm or less and subsequently molten in an extruder whose heater temperature was set to 280° C. to 300° C. The molten polyester resin was ejected onto a chiller roll where static electricity was applied from a die section to obtain an amorphous base. The amorphous base was stretched to a stretching ratio of 3.3 in the base flowing direction and subsequently to a stretching ratio of 3.9 in the base transversing direction to prepare a 100 μm-thick polyester film.

<<Formation of Coat Layer>>

The surface of the polyester film was subjected to a corona treatment and the coating solution a-3 for a coat layer was applied to the corona-treated surface so as to produce a layer having a thickness of 5 μm after drying. Thus, the protective film for a polarizing plate of Example 5 having a coat layer A-3 formed on the transparent base film was prepared.

The prepared protective film for a polarizing plate showed a $WVTR_{40}$ of 8 g/m$^2$·day, a $WVTR_{95}$ of 120 g/m$^2$·day and a $(WVTR_{95}-WVTR_{40})/WVTR_{60}$ of 2.8.

Example 6

<Preparation of Protective Film for Polarizing Plate>

The surface of a 70 μm-thick polystyrene film was subjected to a corona treatment and the coating solution a-3 for a coat layer was applied to the corona-treated surface so as to produce a layer having a thickness of 5 μm after drying. Thus, the protective film for a polarizing plate of Example 6 having a coat layer A-3 formed on the transparent base film was prepared.

The prepared protective film for a polarizing plate showed a $WVTR_{40}$ of 12 g/m$^2$·day, a $WVTR_{95}$ of 130 g/m$^2$ day and a $(WVTR_{95}-WVTR_{40})/WVTR_{60}$ of 2.9.

Example 7

<Preparation of Protective Film for Polarizing Plate>

The protective film for a polarizing plate of Example 7 having a coat layer A-1, an adhesion facilitating layer and a coat layer A-4 formed on a transparent base film in the above-described order was prepared as in Example 1 except that the coating solution a-4 for a coat layer was applied so as to produce a layer having a thickness of 5 μm after drying instead of the coating solution a-2 for a coat layer of Example 1. Table 1-1 shows the configuration of the protective film for a polarizing plate.

The prepared protective film for a polarizing plate showed a $WVTR_{40}$ of 23 g/m$^2$·day, a $WVTR_{95}$ of 200 g/m$^2$·day and a $(WVTR_{95}-WVTR_{40})/WVTR_{60}$ of 2.4.

Example 8

<Preparation of Protective Film for Polarizing Plate>

The protective film for a polarizing plate of Example 8 having a coat layer A-1, an adhesion facilitating layer and a coat layer A-5 formed on one of the surfaces of a transparent base film in the above described order and a low refractive index layer and a hard coat layer on the other surface was prepared as in Example 1 except that the coating solution a-5 for a coat layer was applied so as to produce a layer having a thickness of 5 μm after drying instead of the coating solution a-2 of Example 1. Table 1-1 shows the configuration of the protective film for a polarizing plate.

The prepared protective film for a polarizing plate showed a $WVTR_{40}$ of 12 g/m$^2$·day, a $WVTR_{95}$ of 180 g/m$^2$·day and a $(WVTR_{95}-WVTR_{40})/WVTR_{60}$ of 4.4.

Example 9

<Preparation of Protective Film for Polarizing Plate>

Coating solution a-6 for a coat layer was applied onto a transparent base film, which was a triacetylcellulose film (TAC-T80UZ: tradename, available from Fuji Film), so as to produce a layer having a thickness of 0.5 μm after drying under a condition of a transfer rate of 30 m/min and dried at 100° C. for 3 minutes. The produced film was then rolled up.

Subsequently, coating solution a-2 for a coat layer was applied to the coat layer A-6 so as to produce a layer having a thickness of 5 μm after drying and actually dried at 100° C. for 3 minutes to form coat layer A-2. The produced film was then rolled up.

In this way, the protective film for a polarizing plate of Example 9 having a coat layer A-6 and another coat layer A-2 formed on a transparent base film in the above-described order was prepared. Table 1-1 shows the configuration of the protective film for a polarizing plate.

The prepared protective film for a polarizing plate showed a $WVTR_{40}$ of 9 g/m$^2$·day, a $WVTR_{95}$ of 280 g/m$^2$·day and a $(WVTR_{95}-WVTR_{40})/WVTR_{60}$ of 7.1.

Example 10

<Preparation of Protective Film for Polarizing Plate>

The protective film for a polarizing plate of Example 10 was prepared as in Example 1 except that the film thickness of the second coat layer A-1 on the transparent base film was altered to 15 μm. Table 1-1 shows the configuration of the protective film for a polarizing plate.

The prepared protective film for a polarizing plate showed a $WVTR_{40}$ of 7 g/m$^2$·day, a $WVTR_{95}$ of 85 g/m$^2$·day and a $(WVTR_{95}-WVTR_{40})/WVTR_{60}$ of 2.3.

Example 11

<Preparation of Protective Film for Polarizing Plate>

The protective film for a polarizing plate of Example 11 was prepared as in Example 1 except that the coating solution for the second coat layer on the transparent base film was switched to a-8. Table 1-1 shows the configuration of the protective film for a polarizing plate.

The prepared protective film for a polarizing plate showed a $WVTR_{40}$ of 22 g/m²·day, a $WVTR_{95}$ of 180 g/m²·day and a $(WVTR_{95}-WVTR_{40})/WVTR_{60}$ of 3.1.

Example 12

<Preparation of Protective Film for Polarizing Plate>

The protective film for a polarizing plate of Example 12 was prepared as in Example 1 except that the film thickness of the first coat layer on the transparent base film was altered to 0.2 μm. Table 1-1 shows the configuratioin of the protective film for a polarizing plate.

The prepared protective film for a polarizing plate showed a $WVTR_{40}$ of 8 g/m²·day, a $WVTR_{95}$ of 280 g/m²·day and a $(WVTR_{95}-WVTR_{40})/WVTR_{60}$ of 5.6.

Example 13

<Preparation of Protective Film for Polarizing Plate>

The protective film for a polarizing plate of Example 13 was prepared as in Example 1 except that neither the hard coat layer nor the low refractive index layer was coated. The prepared protective film for a polarizing plate showed a $WVTR_{40}$ of 8 g/m²·day, a $WVTR_{95}$ of 180 g/m²·day and a $(WVTR_{95}-WVTR_{40})/WVTR_{60}$ of 3.1.

Example 14

<Preparation of Protective Film for Polarizing Plate>

The protective film for a polarizing plate of Example 14 was prepared as in Example 1 except that the low refractive index layer was arranged but no hard coat layer was coated. The prepared protective film for a polarizing plate showed a $WVTR_{40}$ of 8 g/m²·day, a $WVTR_{95}$ of 180 g/m²·day and a $(WVTR_{95}-WVTR_{40})/WVTR_{60}$ of 3.1.

Comparative Example 1

<Preparation of Protective Film for Polarizing Plate>

A triacetylcellulose film (TAC-T80UZ: tradename, available from Fuji Film) was used as the protective film for a polarizing plate of Comparative Example 1 without arranging any coat layer. Table 1-2 shows the configuration of the protective film for a polarizing plate.

The prepared protective film for a polarizing plate showed a $WVTR_{40}$ of 375 g/m²·day, a $WVTR_{95}$ of 1,200 g/m²·day and a $(WVTR_{95}-WVTR_{40})/WVTR_{60}$ of 1.3.

Comparative Example 2

<Preparation of Protective Film for Polarizing Plate>

One of the surfaces of a transparent base film, which was a triacetylcellulose film (TAC-T80UZ: tradename, available from Fuji Film), was subjected to a saponification process, using a 1 mol/L alkali solution, at 50° C. and coating solution a-2 for a coat layer was applied to the treated surface so as to produce a layer having a thickness of 3 μm after drying. Then, the coating solution was dried at 100° C. for 2 minutes to form a coat layer A-2.

Subsequently, the protective film for a polarizing plate of Comparative Example 2 was prepared as in Example 1 by forming a low refractive index layer and a hard coat layer on the other surface of the transparent base film, which was rolled up, so as to make the transparent base film carry a coat layer A-2 formed on the former surface and a low refractive index layer and a hard coat layer formed on the other surface. Table 1-2 shows the configuratioin of the protective film for a polarizing plate.

The prepared protective film for a polarizing plate showed a $WVTR_{40}$ of 24 g/m²·day, a $WVTR_{95}$ of 600 g/m²·day and a $(WVTR_{95}-WVTR_{40})/WVTR_{60}$ of 5.8.

Comparative Example 3

<Preparation of Protective Film for Polarizing Plate>

Pellets of ZEONOR 1420 (tradename, hydride of a norbornene ring-opened polymer, available from Zeon Corporation, Tg: 140° C.) were used.

The pellets were molten and extruded by means of a monoaxial extrusion molder (available from Japan Steel Works) showing a cylinder inner diameter of 50 mm and a screw L/D of 28 at a barrel temperature of 260° C. and then a 650 mm-wide sheet of molten resin was extruded from a coat hanger die at a die temperature of 260° C. Then, the sheet was sequentially made to tightly adhere to the first cooling drum (diameter: 200 mm, temperature TI: 135° C., circumferential speed $R_1$: 12.50 m/sec), immediately thereafter to the second cooling drum (diameter: 350 mm, temperature $T_2$: 125° C., circumferential speed $R_2$: 14.46 m/sec) and immediately thereafter to the third cooling drum (diameter: 350 mm, temperature $T_3$: 80° C., circumferential speed $R_3$: 14.40 m/sec) and transferred so that sequentially the sheet was cooled and its front and rear surfaces were smoothed as the sheet was transferred from a cooling drum to another. As a result, a 550 mm-wide (with a neck-in of 50 mm from left and right) thermoplastic resin film was obtained. After passing through a regulation drum, the opposite edges were cut off by 30 mm each by means of a cutter and taken up to form a roll by a take-up roller and obtain a rolled optical film.

The contact time ti of the sheet-shaped thermoplastic resin with the first cooling drum was 3.1 seconds, the resin temperature $T_1$ when it left the first cooling drum was 132° C. and $t_1 \times (T_1 - Tg)$ was −12(sec/deg).

In this way, a 60 μm-thick norbornene resin film was extruded and molded as protective film for a polarizing plate. Table 1-2 shows the configuratioin of the protective film for a polarizing plate.

The prepared protective film for a polarizing plate showed a $WVTR_{40}$ of 4 g/m²·day, a $WVTR_{95}$ of 22 g/m²·day and a $(WVTR_{95}-WVTR_{40})/WVTR_{60}$ of 1.1.

Comparative Example 4

A norbornene resin film was prepared as in Comparative Example 3 except that the film thickness was altered to 50 μm. Subsequently, coating solution a-7 for a coat layer was applied onto the prepared norbornene resin film so as to produce a layer having a thickness of 1 μm after drying under a condition of a transfer rate of 30 m/min and dried at 100° C. for 3 minutes. The produced film was then rolled up. Table 1-2 shows the configuratioin of the protective film for a polarizing plate.

The prepared protective film for a polarizing plate showed a $WVTR_{40}$ of 3 g/m²·day, a $WVTR_{95}$ of 19 g/m²·day and a $(WVTR_{95}-WVTR_{40})/WVTR_{60}$ of 2.1.

Comparative Example 5

One of the surfaces of a transparent base film, which was a triacetylcellulose film (TAC-T80UZ: tradename, available from Fuji Film), was subjected to a saponification process, using a 1 mol/L, alkali solution, at 50° C. and coating solution a-7 for a coat layer was applied to the treated surface so as to produce a layer having a thickness of 2 µm after drying. Then, the coating solution was dried at 100° C. for 2 minutes to form a coat layer (A-7). Table 1-2 shows the configuratioin of the protective film for a polarizing plate.

The prepared protective film for a polarizing plate showed a $WVTR_{40}$ of 31 g/m$^2$·day, a $WVTR_{95}$ of 300 g/m$^2$·day and a $(WVTR_{95}-WVTR_{40})/WVTR_{60}$ of 2.5.

Comparative Example 6

The protective film for a polarizing plate of Comparative Example 6 having a coat layer A-1, an adhesion facilitating layer and a coat layer A-7 formed on one of the surfaces of a transparent base film in the above-described order and a low refractive index layer and a hard coat layer on the other surface was prepared as in Example 1 except that the coating solution a-7 for a coat layer was applied so as to produce a layer having a thickness of 2 µm after drying instead of the coating solution a-2 of Example 1. Table 1-2 shows the configuratioin of the protective film for a polarizing plate.

The prepared protective film for a polarizing plate showed a $WVTR_{40}$ of 30 g/m$^2$·day, a $WVTR_{95}$ of 300 g/m$^2$·day and a $(WVTR_{95}-WVTR_{40})/WVTR_{60}$ of 1.8.

Comparative Example 7

<Preparation of Protective Film for Polarizing Plate>

One of the surfaces of a transparent base film, which was a triacetylcellulose film (TAC-T80UZ: tradename, available from Fuji Film), was subjected to a saponification process, using a 1 mol/L alkali solution, at 50° C. and coating solution a-4 for a coat layer was applied to the treated surface so as to produce a layer having a thickness of 3 µm after drying. Then, the coating solution was dried at 100° C. for 2 minutes to form a coat layer A-4 and the film was rolled up to prepare the protective film for a polarizing plate of Comparative Example 7. Table 1-2 shows the configuratioin of the protective film for a polarizing plate.

The prepared protective film for a polarizing plate showed a $WVTR_{40}$ of 45 g/m$^2$·day, a $WVTR_{95}$ of 800 g/m$^2$·day and a $(WVTR_{95}-WVTR_{40})/WVTR_{60}$ of 4.7.

Comparative Example 8

<Preparation of Protective Film for Polarizing Plate>

Coating solution a-1 for a coat layer was applied onto one or the surfaces of a transparent base film, which was a triacetylcellulose film (TAC-T80UZ: tradename, available from Fuji Film) so as to produce a layer having a thickness of 1.5 µm after drying. Then, the coating solution was dried at 100° C. for 2 minutes to form a coat layer A-1 and the film was rolled up to prepare the protective film for a polarizing plate of Comparative Example 8. Table 1-2 shows the configuration of the protective film for a polarizing plate.

The prepared protective film for a polarizing plate showed a $WVTR_{40}$ of 72 g/m$^2$·day, a $WVTR_{95}$ of 290 g/m$^2$·day and a $(WVTR_{95}-WVTR_{40})/WVTR_{60}$ of 1.1.

(Comparative Example 9)

Preparation of Protective Film for Polarizing Plate

A transparent base film same as the one prepared in Example 3 was used as the protective film for a polarizing plate of Comparative Example 9. Table 1-2 shows the configuration of the protective film for a polarizing plate.

The prepared protective film for a polarizing plate showed a $WVTR_{40}$ of 84 g/m$^2$·day, a $WVTR_{95}$ of 260 g/m$^2$·day and a $(WVTR_{95}-WVTR_{40})/WVTR_{60}$ of 1.2.

Example 15

<Preparation of Polarizer>

A 120 µm-thick polyvinyl alcohol film was immersed in an aqueous solution containing iodine by 1 part by mass, potassium iodide by 2 parts by mass and boric acid by 4 parts by mass and stretched to make it 4 times longer at 50° C. and prepare a polarizer.

<Saponification of Second Protective Film>

A WV film (available from Fuji Film) was immersed in a 1.5 mol/L sodium hydroxide aqueous solution at 55° C. for 120 seconds as the second protective film having an optically anisotropic layer applied thereto and subsequently washed with water and dried.

<Preparation of Polarizing Plate>

The polarizing plate of Example 15 was prepared by using the protective film for a polarizing plate of Example 1 as the first protective film, bonding the prepared polarizer onto the surface thereof where no coat layer was applied and also onto the surface of the second protective film where no optically anisotropic layer was applied, using a 5% aqueous solution of complete saponification type polyvinyl alcohol as adhesive, and subsequently drying the adhesive at 70° C.

<Evaluation of Processing Suitability of Polarizing Plate>

When preparing the polarizing plate of Example 15, it was evaluated for processing suitability by referring to the evaluation criteria listed below, seeing the load required for the drying, or if the protective film for a polarizing plate was peeled off from the polarizer after the drying or not.

Evaluation results are shown in Table 3

[Evaluation Criteria]

A: The protective film for a polarizing plate does not peel off after drying at 70° C. for 10 minutes.

B: The protective film for a polarizing plate easily peels off after drying at 70° C. for 10 minutes.

<Evaluation of Humidity/Heat Resistance of Polarizing Plate>

The humidity/heat resistance of the polarizing plate prepared in Example 15 was evaluated by seeing the contraction ratio of the polarizing plate.

The contraction ratio of the polarizing plate in the direction orthogonal to the stretching direction after 50 hour-dry heating at 60° C. and the contraction ratio of the polarizing plate in the direction orthogonal to the stretching direction when the humidity was regulated to 60% RH at 25° C. for 24 hours after 50 hour-dry heating at 60° C. were measured. The humidity/heat resistance of the polarizing plate was evaluated by referring to the evaluation criteria listed below.

A: The contraction ratio of the polarizing plate was 0.3% or less and practically feasible when exposed to a heat resistance or humidity/heat resistance requiring environment.

B: The contraction ratio of the polarizing plate was 0.3% or more and practically not feasible when exposed to a heat resistance or humidity/heat resistance requiring environment.

Examples 16 to 28

<preparation of Polarizing Plate>
The polarizing plates of Examples 16 to 28 were prepared as in Example 15 except the first protective film of Example 15 was modified as shown in Table 3.

The polarizing plates of Examples 16 to 28 were evaluated as in Example 15. Table 3 shows the results of evaluation.

Comparative Examples 10 to 18

<Preparation of Polarizing Plate>
The polarizing plates of Comparative Examples 10 to 18 were prepared as in Example 15 except that the first protective film of Example 15 was modified as shown in Table 3.

The polarizing plates of Comparative Examples 10 to 18 were evaluated as in Example 15. Table 3 shows the results of evaluation.

Besides the above described polarizing plates, polarizing plates without WV films of Examples 1 to 14 and Comparative Examples 1 to 9 were prepared in a manner as described above except that TAC (TD80: tradename, available from Fuji Film) was used in place of the UV film.

As seen from Table 3, the polarizing plates of Examples 15 to 28 showed an excellent processing suitability and were highly efficient in the manufacturing process for applying them to liquid crystal display device.

On the other hand, the polarizing plates of Comparative Examples 10 to 18 showed a heavy drying load when they were processed to prove that they were disadvantageous from the viewpoint of manufacturing.

Example 29

<Preparation of Liquid Crystal Display Device>
<<Preparation of TN Type Liquid Crystal Display Device>>
The liquid crystal display device of Example 29 was prepared by peeling off the polarizing plate arranged in a liquid crystal display device having a TN type liquid crystal cell (MRT-191S: tradename, available from Mitsubishi Electric) and bonding by means of an adhesive the polarizing plate of Example 15 as replacement with the protective film according to the present invention located at the outside (viewing side) and the transmission axis of the polarizing plate made to agree with that of the peeled off polarizing plate.

<<Preparation of VA Type Liquid Crystal Display Device and IPS Type Liquid Crystal Display Device>>
A polarizing plate having no WV film was used when a polarizing plate according to the present invention was applied to a VA type liquid crystal display device and an IPS type liquid crystal display device.

[Preparation of VA Type Liquid Crystal Display Device]
The polarizing plate arranged in a VA type liquid crystal display device (LC-26GD3: tradename, available from Sharp) was peeled off with the phase difference film left in place and the polarizing plate of Example 15 was bonded as replacement with its transmission axis made to agree with that of the peeled off polarizing plate.

[Preparation of IPS Type Liquid Crystal Display Device]
The polarizing plate arranged in an IPS type liquid crystal display device (Th-26LX300: tradename, available from Matsushita Electric) was peeled off with the phase difference film left in place and the polarizing plate of Example 15 was bonded as replacement with its transmission axis made to agree with that of the peeled off polarizing plate.

<Evaluation of Light Leakage after High Humidity and Low Humidity Treatments (Evaluation of Peripheral Unevenness>
The TN type liquid crystal display device, the VA type liquid crystal display device and the IPS type liquid crystal display device as described above were left in an environment of 25° C., 60% RH for 1 hour after a treatment at 65° C., 10% RH for 50 hours and made to display black so as to be evaluated for light leakage from the square front side by a plurality of viewers by referring to the evaluation criteria listed below. Table 4-1 shows the results of evaluation.

The luminance distribution was measured for each of the liquid crystal display device by means of a luminance meter to see the extent of light leakage. The difference of luminance was measured between the panel center and the middle point of one of the long edges of the polarizing plate at the time of displaying black.

Additionally, each of the liquid crystal display devices was evaluated by referring to the evaluation criteria shown below after treating it at 60° C., 90% RH for 50 hours and subsequently leaving it in an environment of 25° C., 60% RH for 24 hours. Table 4-1 shows the results of evaluation.

Furthermore, each of the liquid crystal display device was left on continuously for 3 days in an environment of 25° C., 60% RH, and the light leakage of the apparatus was evaluated after the 3 days in the same way. Table 4-1 also shows the results of evaluation.

[Evaluation Criteria]
AA: No light leakage is observed at all.
A: While light leakage is observed to some extent, the difference of luminance from the center is less than 0.3 cd/cm$^2$ and does not provide any problem for practical use.
B: Light leakage is observed to some extent and the difference of luminance from the center is 0.3 cd/cm$^2$ or more and 1 cd/cm$^2$ or less and provides some problem for practical use.
C: Light leakage is observed to some extent and the difference of luminance from the center is more than 1 cd/cm$^2$ and provides some problem for practical use.

Examples 30 to 42

<Preparation of Liquid Crystal Display Device>
The liquid crystal display devices of Examples 30 to 42 were prepared as in Example 29 except that the first polarizing plate of Example 29 was modified in a manner as shown in Table 4-1 for each apparatus.

The liquid crystal display devices of Examples 30 to 42 were evaluated as in Example 29. Table 4-1 shows the results of evaluation.

Comparative Examples 19 to 27

<Preparation of Liquid Crystal Display Device>
The liquid crystal display devices of Comparative Examples 19 to 27 were prepared as in Example 29 except that the first polarizing plate of Example 29 was modified in a manner as shown in Table 4-2 for each apparatus.

The liquid crystal display device of Comparative Examples 19 to 27 were evaluated as in Example 29. Table 4-2 shows the results of evaluation.

As seen from Tables 4-1 and 4-2, the liquid crystal display device of Examples 29 to 42 proved a high productivity and showed advantageous performances in practical use, suppressing the peripheral unevenness that arises in a high humidity condition and also in a low humidity condition in various modes.

On the other hand, the liquid crystal display device of Comparative Examples 19 to 27 proved a low productivity and were disadvantageous in practical use, showing light leakage in various environments.

TABLE 1-1

| | Configuration | transparent base film | solution of of 1st coat layer | thickness of 1st coat layer (μμm) | solution of of 2nd coat layer | thickness of 2nd coat layer (μμm) | hard coat layer | low refractive index layer |
|---|---|---|---|---|---|---|---|---|
| Example 1 | (A-2), (B-1), (A-1) (transparent base film) (hard coat layer) (low refractive index layer) | TAC | a-1 | 1 | a-2 | 6 | positive | positive |
| Example 2 | (low refractive index layer) (hard coat layer) (A-1) (transparent base film) (A-2) | TAC | a-1 | 1 | a-2 | 6 | positive | positive |
| Example 3 | (A-3) (transparent base film + corona) | resin containing lactone ring | a-3 | 3 | — | — | negative | negative |
| Example 4 | (A-3) (transparent base film + corona) | polycarbonate | a-3 | 3 | — | — | negative | negative |
| Example 5 | (A-3) (transparent base film + corona) | polyester based resin | a-3 | 3 | — | — | negative | negative |
| Example 6 | (A-3) (transparent base film + corona) | polystylene based resin | a-3 | 3 | — | — | negative | negative |
| Example 7 | (A-4) (B-1) (A-1) (transparent base film) | TAC | a-1 | 1 | a-4 | 5 | positive | positive |
| Example 8 | (A-5), (B-1), (A-1) (transparent base film) (hard coat layer) (low refractive index layer) | TAC | a-1 | 1 | a-5 | 5 | positive | positive |
| Example 9 | (A-2) (A-6) (transparent base film) | TAC | a-6 | 0.5 | a-2 | 5 | positive | positive |
| Example 10 | (A-2), (B-1), (A-1) (transparent base film) (hard coat layer) (low refractive index layer) | TAC | a-1 | 1 | a-2 | 15 | positive | positive |
| Example 11 | (A-8), (B-1), (A-1) (transparent base film) (hard coat layer) (low refractive index layer) | TAC | a-1 | 1 | a-8 | 6 | positive | positive |
| Example 12 | (A-2), (B-1), (A-1) (transparent base film) (hard coat layer) (low refractive index layer) | TAC | a-1 | 0.2 | a-2 | 6 | positive | positive |
| Example 13 | (A-2), (B-1), (A-1) (transparent base film) (hard coat layer) (low refractive index layer) | TAC | a-1 | 1 | a-2 | 6 | negative | negative |
| Example 14 | (A-2), (B-1), (A-1) (transparent base film) (hard coat layer) (low refractive index layer) | TAC | a-1 | 1 | a-2 | 6 | negative | positive |

TABLE 1-2

| | configuration | Transparent base film | solution of of 1st coat layer | thickness of 1st coat layer (μm) | solution of of 2nd coat layer | thickness of 2nd coat layer (μm) | hard coat layer | low refractive index layer |
|---|---|---|---|---|---|---|---|---|
| Comparative Example 1 | (transparent base film) | TAC | — | — | — | — | negative | negative |
| Comparative Example 2 | (A-2) (transparent base film) (hard coat layer) (low refractive index layer) | TAC | a-2 | 3 | — | — | negative | negative |
| Comparative Example 3 | (transparent base film) | norbornene | — | — | — | — | negative | negative |
| Comparative Example 4 | (A-7) (transparent base film) | norbornene | a-7 | 1 | — | — | negative | negative |
| Comparative Example 5 | (A-7) (transparent base film) | TAC | a-7 | 2 | — | — | negative | negative |
| Comparative Example 6 | (A-7) (transparent base film) | TAC | a-1 | 1 | a-7 | 2 | negative | negative |
| Comparative Example 7 | (A-4) (transparent base film) | TAC | a-4 | 3 | — | — | negative | negative |
| Comparative Example 8 | (A-1) (transparent base film) | TAC | a-1 | 1.5 | — | — | negative | negative |
| Comparative Example 9 | (transparent base film) | resin containing lactone ring | — | — | — | — | negative | negative |

TABLE 2

| | Evaluation of protective film | | | Pencil hardness |
|---|---|---|---|---|
| | WVTR$_{40}$ (g/m$^2$ · day) | WVTR$_{95}$ (g/m$^2$ · day) | (WVTR$_{95}$ − WVTR$_{40}$/WVTR$_{60}$ | |
| Example 1 | 6 | 200 | 4.9 | 3H |
| Example 2 | 7 | 210 | 4.8 | 3H |
| Example 3 | 12 | 230 | 2.7 | ≦H |
| Example 4 | 8 | 150 | 3.4 | ≦H |
| Example 5 | 8 | 120 | 2.8 | ≦H |
| Example 6 | 12 | 130 | 2.9 | ≦H |
| Example 7 | 23 | 200 | 2.4 | 3H |
| Example 8 | 12 | 180 | 4.4 | 3H |
| Example 9 | 9 | 280 | 7.1 | 3H |
| Example 10 | 7 | 85 | 2.3 | 3H |
| Example 11 | 22 | 180 | 3.1 | 3H |
| Example 12 | 8 | 280 | 5.6 | ≦H |
| Example 13 | 8 | 180 | 3.1 | ≦H |
| Example 14 | 8 | 180 | 3.1 | ≦H |
| Comp. Ex. 1 | 375 | 1200 | 1.3 | ≦H |
| Comp. Ex. 2 | 24 | 600 | 5.8 | ≦H |
| Comp. Ex. 3 | 4 | 22 | 1.1 | ≦H |
| Comp. Ex. 4 | 3 | 19 | 2.1 | ≦H |
| Comp. Ex. 5 | 31 | 300 | 2.5 | ≦H |
| Comp. Ex. 6 | 30 | 300 | 1.8 | ≦H |
| Comp. Ex. 7 | 45 | 800 | 4.7 | ≦H |
| Comp. Ex. 8 | 72 | 290 | 1.1 | ≦H |
| Comp. Ex. 9 | 84 | 260 | 1.2 | ≦H |

TABLE 3

| | 1st protective film | Polarizing plate peeling | Polarizing plate contraction ratio |
|---|---|---|---|
| Example 15 | Example 1 | A | A |
| Example 16 | Example 2 | A | A |
| Example 17 | Example 3 | A | A |
| Example 18 | Example 4 | A | A |
| Example 19 | Example 5 | A | A |
| Example 20 | Example 6 | A | A |
| Example 21 | Example 7 | A | A |
| Example 22 | Example 8 | A | A |
| Example 23 | Example 9 | A | A |
| Example 24 | Example 10 | A | A |
| Example 25 | Example 11 | A | A |
| Example 26 | Example 12 | A | A |
| Example 27 | Example 13 | A | A |
| Example 28 | Example 14 | A | A |
| Comp. Ex. 10 | Comp. Ex. 1 | A | B |
| Comp. Ex. 11 | Comp. Ex. 2 | A | B |
| Comp. Ex. 12 | Comp. Ex. 3 | B | — |
| Comp. Ex. 13 | Comp. Ex. 4 | B | — |
| Comp. Ex. 14 | Comp. Ex. 5 | A | B |
| Comp. Ex. 15 | Comp. Ex. 6 | A | B |
| Comp. Ex. 16 | Comp. Ex. 7 | A | B |
| Comp. Ex. 17 | Comp. Ex. 8 | A | B |
| Comp. Ex. 18 | Comp. Ex. 9 | A | B |

TABLE 4-1

| Polarizing plate | liquid crystal cell mode | 65° C., 10% RH, 50 hrs ↓ 25° C., 60% RH, after 1 hr | 60° C., 90% RH, 50 hrs ↓ 25° C., 60% RH, after 24 hrs |
|---|---|---|---|
| Example. 29 | Example. 15 | TN mode | AA | AA |
| | | VA mode | AA | AA |
| | | IPS mode | AA | AA |
| Example 30 | Example 16 | TN mode | A | A |
| | | VA mode | A | AA |
| | | IPS mode | A | A |
| Example 31 | Example 17 | TN mode | AA | AA |
| | | VA mode | AA | AA |
| | | IPS mode | AA | AA |
| Example 32 | Example 18 | TN mode | AA | AA |
| | | VA mode | AA | AA |
| | | IPS mode | AA | AA |
| Example 33 | Example 19 | TN mode | AA | AA |
| | | VA mode | AA | AA |
| | | IPS mode | AA | AA |
| Example 34 | Example 20 | TN mode | A | AA |
| | | VA mode | A | AA |
| | | IPS mode | A | AA |
| Example 35 | Example 21 | TN mode | A | AA |
| | | VA mode | A | AA |
| | | IPS mode | A | AA |
| Example 36 | Example 22 | TN mode | A | AA |
| | | VA mode | A | AA |
| | | IPS mode | A | AA |
| Example 37 | Example 23 | TN mode | A | A |
| | | VA mode | A | AA |
| | | IPS mode | A | A |
| Example 38 | Example 24 | TN mode | AA | AA |
| | | VA mode | AA | AA |
| | | IPS mode | AA | AA |
| Example 39 | Example 25 | TN mode | A | AA |
| | | VA mode | A | AA |
| | | IPS mode | A | AA |
| Example 40 | Example 26 | TN mode | AA | AA |
| | | VA mode | AA | AA |
| | | IPS mode | AA | AA |
| Example 41 | Example 27 | TN mode | AA | AA |
| | | VA mode | AA | AA |
| | | IPS mode | AA | AA |

TABLE 4-1-continued

| | Polarizing plate | liquid crystal cell mode | 65° C., 10% RH, 50 hrs ↓ 25° C., 60% RH, after 1 hr | 60° C., 90% RH, 50 hrs ↓ 25° C., 60% RH, after 24 hrs |
|---|---|---|---|---|
| Example 42 | Example 28 | TN mode | AA | AA |
| | | VA mode | AA | AA |
| | | IPS mode | AA | AA |

TABLE 4-2

| | polarizing plate | liquid crystal cell mode | 65° C., 10% RH, 50 hrs ↓ 25° C., 60% RH, after 1 hr | 60° C., 90% RH, 50 hrs ↓ 25° C., 60% RH, after 24 hrs |
|---|---|---|---|---|
| Comparative Example 19 | Comparative Example 10 | TN mode | C | C |
| | | VA mode | C | C |
| | | IPS mode | A | C |
| Comparative Example 20 | Comparative Example 11 | TN mode | B | C |
| | | VA mode | B | C |
| | | IPS mode | A | C |
| Comparative Example 21 | Comparative Example 12 | TN mode | — | — |
| | | VA mode | — | — |
| | | IPS mode | — | — |
| Comparative Example 22 | Comparative Example 13 | TN mode | — | — |
| | | VA mode | — | — |
| | | IPS mode | — | — |
| Comparative Example 23 | Comparative Example 14 | TN mode | C | C |
| | | VA mode | C | B |
| | | IPS mode | A | C |
| Comparative Example 24 | Comparative Example 15 | TN mode | C | C |
| | | VA mode | C | B |
| | | IPS mode | A | C |
| Comparative Example 25 | Comparative Example 16 | TN mode | C | C |
| | | VA mode | C | C |
| | | IPS mode | A | C |
| Comparative Example 26 | Comparative Example 17 | TN mode | C | C |
| | | VA mode | C | B |
| | | IPS mode | A | C |
| Comparative Example 27 | Comparative Example 18 | TN mode | C | C |
| | | VA mode | C | B |
| | | IPS mode | A | C |

A protective film for a polarizing plate according to the present invention operates excellently in terms of abrasion resistance and anti-dust effect and shows a low reflectance, while it can reduce the reflection caused by the light scattering effect of the surface. In short, a protective film for a polarizing plate according to the present invention performs well when applied to the surface of a polarizing plate or the display screen of a liquid crystal display device.

A polarizing plate according to the present invention shows excellent characteristics in terms of processing productivity of the polarizing plate.

A liquid crystal display device according to the present invention shows advantageous performances in practical use, suppressing the peripheral unevenness that arises in a high humidity condition and also in a low humidity condition in various modes.

Thus, a protective film according to the present invention operates excellently in terms of abrasion resistance and anti-dust effect and shows a low reflectance, while it can reduce the reflection caused by the light scattering effect of the surface. Thus, a protective film according to the present invention performs well when applied to the surface of a polarizing plate or a liquid crystal display device formed by using such a polarizing plate.

Since a polarizing plate according to the present invention shows excellent characteristics in terms of processing productivity of the polarizing plate, it can suitably be used in a liquid crystal display device.

Finally, since a liquid crystal display device according to the present invention shows excellent characteristics in terms of productivity, and advantageous performances, suppressing the unevenness due to light leakage and reducing light leakage that arises in a high humidity condition and also in a low humidity condition, it can find applications including portable phones, monitors of personal computers, television sets and liquid crystal projectors.

What is claimed is:

1. A protective film for a polarizing plate showing a water vapor transmission rate ($WVTR_{40}$) of 30 g/m²·day or less at 60° C. and a relative humidity of 40%, a water vapor transmission rate ($WVTR_{95}$) of 80 g/m²·day or more and 300 g/m²·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, 2.0 or more.

2. The protective film for a polarizing plate according to claim 1, wherein the water vapor transmission rate ($WVTR_{40}$) is 10 g/m²·day or less at 60° C. and a relative humidity of 40%.

3. The protective film for a polarizing plate according to claim 1, wherein the protective film comprises a transparent support containing at least a lactone-ring-containing resin, a polyester resin, a polycarbonate resin or a polystyrene resin, and a coat layer containing a vinyl alcohol resin.

4. The protective film for a polarizing plate according to claim 3, wherein the thickness of the first coat layer is 1 μm to 10 μm.

5. The protective film for a polarizing plate according to claim 3, wherein the first coat layer contains a layered inorganic compound having an average particle radius of 0.1 μm to 10 μm.

6. The protective film for a polarizing plate according to claim 1, wherein the protective film comprises a transparent support containing a cellulose acylate resin, a first coat layer containing a vinyl alcohol resin, and at least one second coat layer containing a resin different from the resin contained in the first coat layer.

7. The protective film for a polarizing plate according to claim 6, wherein the second coat layer contains a resin having repetitive units derived from a chlorine-containing vinyl monomer.

8. The protective film for a polarizing plate according to claim 6, wherein the thickness of the second coat layer is 0.3 μm to 5 μm.

9. The protective film for a polarizing plate according to claim 1, wherein the protective film further comprises at least one of a hard coat layer operating at least as hard coat, and an anti-reflection layer.

10. A polarizing plate comprising:
a polarizer; and
a protective film for a polarizing plate arranged at least at a side of the polarizer,
wherein the protective film for a polarizing plate shows a water vapor transmission rate ($WVTR_{40}$) of 30 g/m²·day or less at 60° C. and a relative humidity of 40%, a water vapor transmission rate ($WVTR_{95}$) of 80 g/m²·day or more and 300 g/m²·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, 2.0 or more.

11. A liquid crystal display device comprising:
a liquid crystal cell;
a polarizer; and
a protective film for a polarizing plate arranged at least at a side of the polarizer,
wherein the protective film for a polarizing plate shows a water vapor transmission rate ($WVTR_{40}$) of 30 g/m²·day or less at 60° C. and a relative humidity of 40%, a water vapor transmission rate ($WVTR_{95}$) of 80 g/m²·day or more and 300 g/m²·day or less at 60° C. and a relative humidity of 95% and a value obtained by dividing the difference between $WVTR_{95}$ and $WVTR_{40}$ by the water vapor transmission rate ($WVTR_{60}$) at 60° C. and a relative humidity of 60%, or ($WVTR_{95}$-$WVTR_{40}$)/$WVTR_{60}$, 2.0 or more.

* * * * *